(12) United States Patent
Tamura et al.

(10) Patent No.: US 7,925,098 B2
(45) Date of Patent: Apr. 12, 2011

(54) IMAGE ENCODING APPARATUS AND METHOD WITH BOTH LOSSY AND LOSSLESS MEANS

(75) Inventors: Hirokazu Tamura, Chofu (JP); Naoki Ito, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1079 days.

(21) Appl. No.: 11/680,378

(22) Filed: Feb. 28, 2007

(65) Prior Publication Data

US 2007/0206867 A1  Sep. 6, 2007

(30) Foreign Application Priority Data

Mar. 2, 2006  (JP) ................................. 2006-056897
Mar. 2, 2006  (JP) ................................. 2006-056900
Mar. 2, 2006  (JP) ................................. 2006-056901

(51) Int. Cl.
*G06K 9/36* (2006.01)
(52) U.S. Cl. ........ 382/232; 382/305; 358/403; 358/462; 345/555
(58) Field of Classification Search ............. 382/232, 382/305; 358/403, 462; 345/555
See application file for complete search history.

(56) References Cited

U.S. PATENT DOCUMENTS

| 6,370,278 | B1 | 4/2002 | Waguri .......................... 382/266 |
| 7,106,911 | B2 | 9/2006 | Ohta et al. |
| 7,194,140 | B2 | 3/2007 | Ito et al. |
| 7,227,998 | B2 | 6/2007 | Nakayama et al. |
| 7,257,264 | B2 | 8/2007 | Nakayama et al. |
| 7,343,291 | B2 * | 3/2008 | Thumpudi et al. ............ 704/500 |
| 7,424,162 | B2 * | 9/2008 | Kitamura ....................... 382/239 |
| 7,680,345 | B2 * | 3/2010 | Ito et al. ......................... 382/232 |
| 2001/0024518 | A1 | 9/2001 | Yaguchi ......................... 382/170 |
| 2003/0228063 | A1 * | 12/2003 | Nakayama et al. ........... 382/251 |
| 2006/0023957 | A1 | 2/2006 | Ito |
| 2006/0045362 | A1 | 3/2006 | Ito et al. |
| 2006/0050974 | A1 | 3/2006 | Tamura et al. ................. 382/232 |
| 2006/0050975 | A1 | 3/2006 | Ito et al. |
| 2006/0056713 | A1 | 3/2006 | Ito et al. |
| 2006/0104528 | A1 | 5/2006 | Tamura et al. |
| 2008/0037882 | A1 | 2/2008 | Tamura et al. ................. 382/232 |
| 2009/0046777 | A1 | 2/2009 | Kitamura .................. 375/240.02 |

FOREIGN PATENT DOCUMENTS

| JP | 07-123273 | 5/1995 |
| JP | 8-328528 A | 12/1996 |
| JP | 11-164153 | 6/1999 |

(Continued)

*Primary Examiner* — Vikkram Bali
*Assistant Examiner* — Eueng-Nan Yeh
(74) *Attorney, Agent, or Firm* — Fitzpatrick, Cella, Harper & Scinto

(57) ABSTRACT

This invention is to generate encoded data within a target amount. A first encoding unit generates lossy encoded data of each pixel block by using a quantization matrix $Q_i$ specified by a parameter i. A second encoding unit generates lossless encoded data of each pixel block. Let Lx be the lossless encoded data length, and Ly be the lossy encoded data length. A control unit determines, using a nonlinear boundary function $f_{i,j}()$ specified by the parameters i and j, whether condition: $Ly < f_{i,j}(Lx)$ is satisfied and stores the determination result as history information in a history memory unit. One of the two encoded data is stored in a memory based on the determination result. If the encoded data amount stored in the memory has exceeded the target amount, the control unit updates at least one of the encoding parameters i and j on the basis of the history information.

12 Claims, 43 Drawing Sheets

FOREIGN PATENT DOCUMENTS

| | | |
|---|---|---|
| JP | 2001-045301 | 2/2001 |
| JP | 2002-369198 A | 12/2002 |
| JP | 2003-008903 | 1/2003 |
| JP | 2003-101798 A | 4/2003 |
| JP | 2003-125206 | 4/2003 |
| JP | 2004-215093 | 7/2004 |
| WO | WO 03/084243 | * 10/2003 |

* cited by examiner

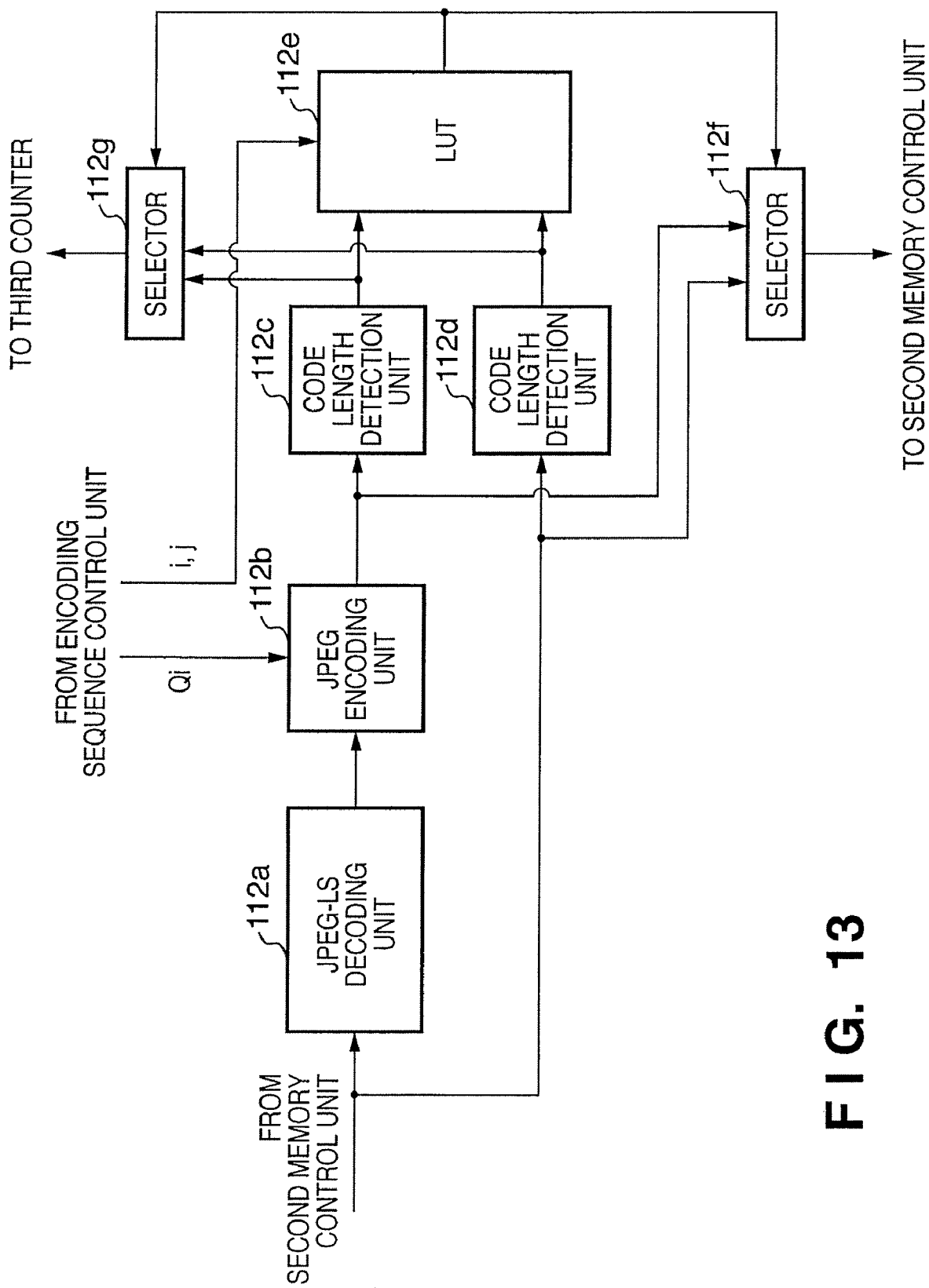
F I G. 13

F I G. 28

| PIXEL BLOCK No. | Lx | Ly | SELECTION SIGNAL S |
|---|---|---|---|
| | | i=a,j=b | |
| 1 | Lx(1) | Ly(1) | S(1) |
| 2 | Lx(2) | Ly(2) | S(2) |
| 3 | Lx(3) | Ly(3) | S(3) |
| 4 | Lx(4) | Ly(4) | S(4) |
| ‥ | ‥ | ‥ | ‥ |
| ‥ | ‥ | ‥ | ‥ |
| k | Lx(k) | Ly(k) | S(k) |
| k+1 | ― | ― | ― |
| ‥ | ‥ | ‥ | ‥ |
| ‥ | ‥ | ‥ | ‥ |
| Nmax | ― | ― | ― |
| | MLS | MJP | |

↑ DATA AMOUNT HAS EXCEEDED TARGET DATA AMOUNT

FIG. 29

| | | ACTUAL VALUE | | PREDICTED VALUE | | | | | |
|---|---|---|---|---|---|---|---|---|---|
| | | i=a;j=b | | i=a+1;j=b | | i=a;j=b+1 | | i=a+1;j=b+1 | |
| PIXEL BLOCK No. | Lx | Ly | SELECTION SIGNAL S | PREDICTED Ly' | S' | PREDICTED Ly'' | S'' | PREDICTED Ly''' | S''' |
| 1 | Lx(1) | Ly(1) | 1 | Ly'(1) | 1 | Ly''(1) | 0 | Ly'''(1) | 1 |
| 2 | Lx(2) | Ly(2) | 1 | Ly'(2) | 1 | Ly''(2) | 1 | Ly'''(2) | 0 |
| 3 | Lx(3) | Ly(3) | 1 | Ly'(3) | 0 | Ly''(3) | 0 | Ly'''(3) | 0 |
| 4 | Lx(4) | Ly(4) | 0 | Ly'(4) | 1 | Ly''(4) | 1 | Ly'''(4) | 1 |
| .. | .. | .. | .. | .. | .. | .. | .. | .. | .. |
| .. | .. | .. | .. | .. | .. | .. | .. | .. | .. |
| k | Lx(100) | Ly(100) | 1 | Ly'(100) | 1 | Ly''(100) | 1 | Ly'''(100) | 0 |
| k+1 | – | – | – | – | – | – | – | – | – |
| .. | – | – | – | – | – | – | – | – | – |
| .. | – | – | – | – | – | – | – | – | – |
| Nmax | – | – | – | – | – | – | – | – | – |
| 121a | MLS | MJP | | | | | | | |

121b

DATA AMOUNT HAS EXCEEDED TARGET DATA AMOUNT

FIG. 39

| PIXEL BLOCK No. | Lx | Ly | SELECTION SIGNAL S | IMAGE DETERMINATION SIGNAL H |
|---|---|---|---|---|
| 1 | Lx(1) | Ly(1) | S(1) | H(1) |
| 2 | Lx(2) | Ly(2) | S(2) | H(2) |
| 3 | Lx(3) | Ly(3) | S(3) | H(3) |
| 4 | Lx(4) | Ly(4) | S(4) | H(4) |
| .. | .. | .. | .. | .. |
| .. | .. | .. | .. | .. |
| k | Lx(k) | Ly(k) | S(k) | H(k) |
| k+1 | – | – | – | – |
| .. | – | – | – | – |
| .. | – | – | – | – |
| Nmax | – | – | – | – | i=a; j=b

← DATA AMOUNT HAS EXCEEDED TARGET DATA AMOUNT (at k+1)

MLS / MJP

| PIXEL BLOCK No. | Lx | Ly | i=a;j=b ACTUAL VALUE S | H | i=a+1;j=b Ly' PREDICTED VALUE | S' | i=a;j=b+1 Ly'' | S'' | i=a+1;j=b+1 Ly''' | S''' |
|---|---|---|---|---|---|---|---|---|---|---|
| 1 | Lx(1) | Ly(1) | S(1) | H(1) | Ly'(1) | S'(1) | Ly''(1) | S''(1) | Ly'''(1) | S'''(1) |
| 2 | Lx(2) | Ly(2) | S(2) | H(2) | Ly'(2) | S'(2) | Ly''(2) | S''(2) | Ly'''(2) | S'''(2) |
| 3 | Lx(3) | Ly(3) | S(3) | H(3) | Ly'(3) | S'(3) | Ly''(3) | S''(3) | Ly'''(3) | S'''(3) |
| 4 | Lx(4) | Ly(4) | S(4) | H(4) | Ly'(4) | S'(4) | Ly''(4) | S''(4) | Ly'''(4) | S'''(4) |
| .. | .. | .. | .. | .. | .. | .. | .. | .. | .. | .. |
| .. | .. | .. | .. | .. | .. | .. | .. | .. | .. | .. |
| k | Lx(k) | Ly(k) | S(k) | H(k) | Ly'(k) | S'(k) | Ly''(k) | S''(k) | Ly'''(k) | S'''(k) |
| .. | .. | .. | .. | .. | .. | .. | .. | .. | .. | .. |
| .. | .. | .. | .. | .. | .. | .. | .. | .. | .. | .. |
| .. | .. | .. | .. | .. | .. | .. | .. | .. | .. | .. |
| Nmax | – | – | – | – | – | – | – | – | – | – |
|  | MLS | MJP |  |  |  |  |  |  |  |  |

DATA AMOUNT HAS EXCEEDED TARGET DATA AMOUNT (↑ at row k)

IMAGE ENCODING APPARATUS AND METHOD WITH BOTH LOSSY AND LOSSLESS MEANS

BACKGROUND OF THE INVENTION

1. Field of the Invention

The present invention relates to an image data compression-coding technique.

2. Description of the Related Art

To compress a still image, conventionally, JPEG schemes using discrete cosine transform or schemes using Wavelet transform are often used. An encoding scheme of this type is a variable length encoding scheme which changes the code amount depending on the encoding target image.

The JPEG scheme as an international standard can define only one set of quantization matrices for an image of one page. Hence, when a document is scanned, and its image data is encoded, the resultant encoded data amount may exceed the expected target code amount.

If the code amount has exceeded the expected amount, commonly, the quantization matrices are changed to change the compression ratio, and the document is re-read. There is also a method of estimating the code amount by prescanning and resetting quantization parameters to adjust the code amount.

As a known code amount control scheme with prescanning, for example, precompressed data is stored in an internal buffer memory and decompressed. After changing the compression parameters, the data is fully compressed and output to an external storage device. The compression ratio of the full compression needs to be slightly higher than that of precompression.

Another scheme is also known in which, for example, the allowable code amount of each pixel block is obtained. To decrease the code amount, a coefficient is obtained by level-shifting a DCT coefficient n times and Huffman-coded. The shift amount n is decided on the basis of the allowable code amount.

A method of effectively generating encoded data within a predetermined size by single image input is also usable (e.g., Japanese Patent Laid-Open No. 2003-8903). In this technique, two memories to store encoded data are prepared, and generated encoded data is stored in both memories. When the amount of stored encoded data has reached target data amount, a large quantization step to obtain a high compression ratio is set. Simultaneously, one memory (first memory) is cleared. This raises the compression ratio for encoding after reaching the target data amount. The other memory (second memory) stores encoded data before the generated code amount reaches the target data amount. Hence, the data is re-encoded by using a higher quantization step, and the re-encoded result is stored in the first memory. This process is repeated every time the data amount reaches the target data amount.

Not only these lossy schemes but also lossless encoding schemes are also usable. A lossless encoding scheme is used for a non-natural image such as a character image or line image, and a lossy encoding scheme issued for a natural image part. In this method, the attribute of each image part is determined in advance. The encoding scheme is switched on the basis of the determination result (e.g., Japanese Patent Laid-Open No. 7-123273).

However, the lossy process cannot guarantee a high image quality for all kinds of images. If the data amount has exceeded the target code amount, the compression ratio of the entire image is uniformly raised by using a larger quantization step. This degrades the image at a high probability. Especially compression-coding of an image containing both a character/line image and a natural image poses many problems. This is because raising the quantization step rarely affects the quality of a natural image but makes the edge of a character/line image unclear.

From this viewpoint, each image area is preferably encoded by a scheme specific to it. That is, lossless encoding is executed for a character/line image, whereas lossy encoding is executed for a natural image. However, to implement this method, it is necessary to execute an attribute determination process of each area as a preprocess. The determination requires a high accuracy. Hence, the process executed by the apparatus inevitably becomes complex, resulting in a high cost.

Ideally, the whole area of one page is losslessly encoded. In lossless encoding, compressed image data can completely be reconstructed to document image data in principle. In lossless encoding, however, the compression ratio is nonadjustable, unlike lossy encoding. Hence, if the encoded data amount obtained by lossless encoding exceeds the target code amount, it is difficult to take a further measure.

Alternatively, lossless encoding is executed in the first scanning, and if the result has exceeded the target code amount, lossy encoding may be executed. In lossy encoding, however, only one quantization step is used for the whole area of one page, as described above. Hence, the image quality of a character/line image area in a document image unavoidably degrades depending on the employed quantization matrix.

SUMMARY OF THE INVENTION

The present invention has been made in consideration of the above-described problems, and has as its object to provide a technique of generating encoded data containing both loss-less encoded data and lossy encoded data and also making the generated encoded data amount equal to or smaller than an allowable code amount as a target.

It is another object of the present invention to provide a technique of switching lossless encoding and lossy encoding in correspondence with an image attribute without using any special image area determination technique especially for images with different attributes, including a character/line image, computer graphics, and a natural image, or an image containing all of them.

It is still another object of the present invention to provide a technique of quickly generating encoded data with minimum image degradation and an allowable code amount or less on the basis of image data containing both lossless encoded data and lossy encoded data.

It is still another object of the present invention to provide an image compression technique of adaptively switching lossless encoding and lossy encoding for a natural image or a character/line image or an image containing both of them without using any special image area determination technique, and preventing any sense of discomfort in a character/line part of a decoding result.

In order to achieve the above objects, an image encoding apparatus of the present invention has the following arrangement.

An image encoding apparatus for receiving image data as a pixel block containing a plurality of pixels and encoding each pixel block comprises:

first encoding means for generating lossy encoded data of the pixel block by using a quantization matrix $Q_i$ specified by a first parameter i;

second encoding means for generating lossless encoded data of the pixel block;

code length detection means for detecting a code length Ly of the lossy encoded data obtained by the first encoding means and a code length Lx of the lossless encoded data obtained by the second encoding means;

selection means for selecting one of the lossy encoded data and the lossless encoded data as encoded data of the pixel block of interest to be stored in an output memory by determining the code amounts Lx and Ly detected by the code length detection means by using a boundary function $f_{i,j}(\ )$ having a nonlinear boundary line specified by the first parameter i and a second parameter j;

history information storage means for storing history information of a selection process by the selection means; and control means for monitoring an encoded data amount stored in the output memory and, if the encoded data has exceeded a target amount, updating at least one of the first parameter i and second parameter j defining the boundary function $f_{i,j}(\ )$ on the basis of the history information stored in the history information storage means, wherein the selection means selects the lossy encoded data when condition: $Ly<f_{i,j}(Lx)$ is satisfied, and otherwise, selects the lossless encoded data, and when the lossless encoded data length is plotted along a horizontal axis, and the lossy encoded data length is plotted along a vertical axis, the nonlinear boundary function $f_{i,j}(\ )$ shifts the nonlinear boundary line in a vertical direction in accordance with the first parameter i and in a horizontal direction in accordance with the second parameter j.

According to the present invention, it is possible to generate encoded data having a target allowable code amount or less and containing both lossless encoded data and lossy encoded data.

It is also possible to switch lossless encoding and lossy encoding in correspondence with an image attribute without using any special image area determination technique especially for images with different attributes, including a character/line image, computer graphics, and a natural image, or an image containing all of them.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a block diagram of a re-encoding unit according to the fifth embodiment;

FIG. 28 is a view showing the structure of data stored in an encoding history recording unit 121 according to the first embodiment;

FIG. 29 is a view showing the structure of data stored in an encoding history recording unit 121 according to the second embodiment;

FIG. 39 is a view showing the structure of data stored in an encoding history recording unit 151 according to the sixth embodiment;

FIG. 40 is a view showing the structure of data stored in an encoding history recording unit 151 according to the seventh embodiment;

DESCRIPTION OF THE EMBODIMENTS

The embodiments of the present invention will be described below in detail with reference to the accompanying drawings.

<Description of Outline of Apparatus>

Figure 22:
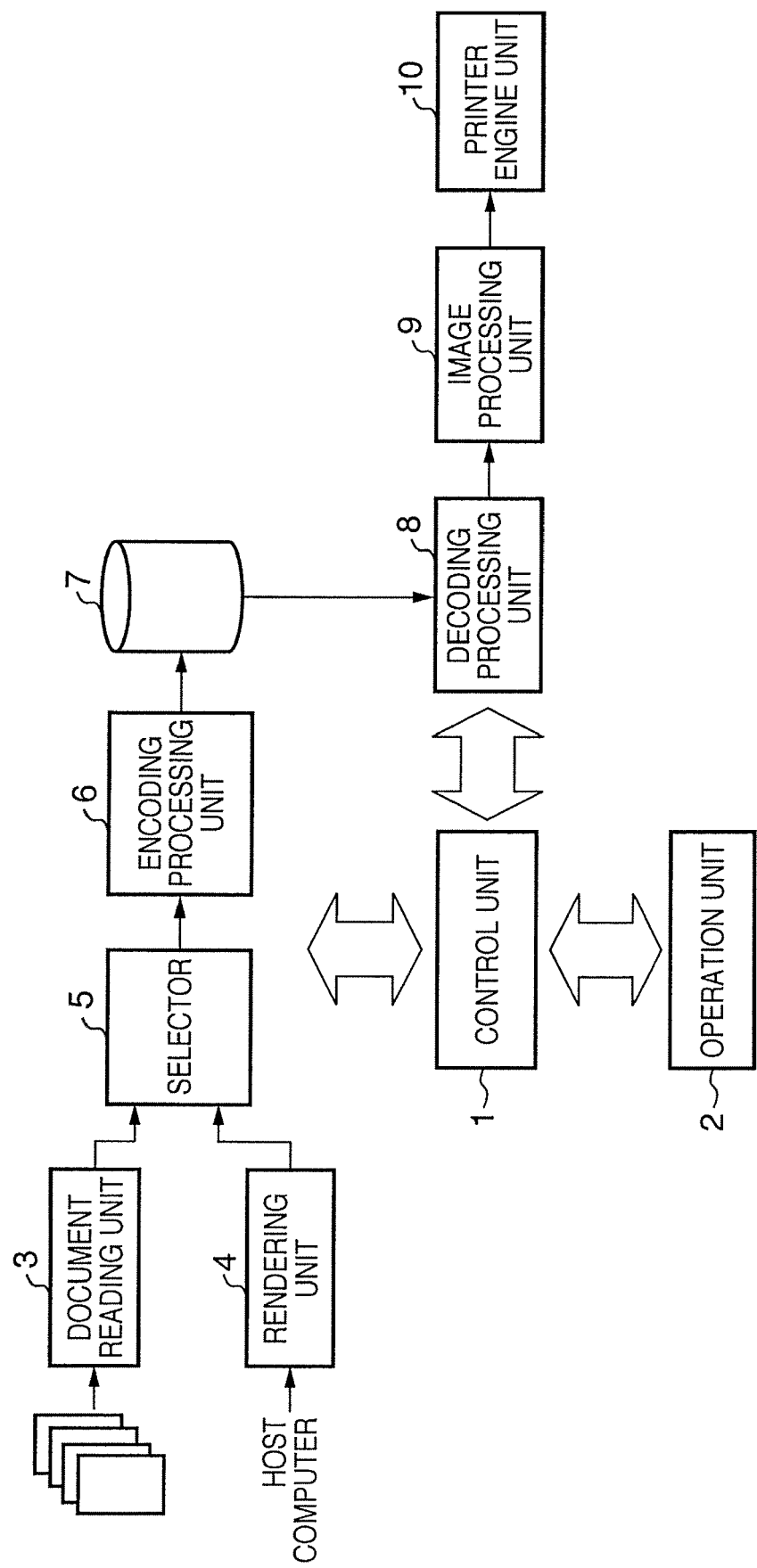
FIG. 22 is a block diagram of a copying machine to which an embodiment is applied.

FIG. 22 is a block diagram of a copying machine to which an embodiment is applied.

Referring to FIG. 22, a control unit 1 including a CPU, ROM, and RAM controls the entire apparatus. An operation unit 2 includes an LCD and various kinds of switches and buttons. A document reading unit (image scanner unit) 3 has an ADF (Auto Document Feeder) and outputs a read image as 8-bit (256 tones) digital data for each of R, G, and B color components. A rendering unit 4 renders a print image on the basis of PDL print data received from a client terminal via an interface (including a network interface) (not shown). A selector 5 selects and outputs a bitmap image output from the document reading unit 3 or rendering unit 4.

An encoding processing unit 6 is a characteristic part of this embodiment. The encoding processing unit 6 that encodes image data will be described later in detail.

A secondary storage device (hard disk device in this embodiment) 7 sequentially stores encoded data of one page output from the encoding processing unit 6.

A decoding processing unit 8 reads out compression-coded image data from the secondary storage device 7 in the order of storage (in the order of pages) and decodes the readout data. An image processing unit 9 receives a decoded image from the decoding processing unit 8, executes conversion from the RGB color space to a YMC color space serving as a print color space and a UCR (Under Color Removal) process, and corrects the image data.

Reference numeral 10 denotes a printer engine unit. The print mechanism of the printer engine unit is a laser beam printer engine. However, the printer engine can be of any type, including one that discharges ink.

In the above-described arrangement, for example, assume that the user selects a copy mode by operating the operation unit 2, sets a document on (the ADF of) the document reading unit 3, and presses a copy start key. In this case, document image data read by the document reading unit 3 is transferred to the encoding processing unit 6 via the selector 5 in the raster order, compressed-coded, and stored in the secondary storage device 7.

If print data is received from an external device, the selector 5 selects the rendering unit 4 so that an image based on print data generated by the rendering unit 4 is compression-coded and stored in the secondary storage device 7.

The decoding processing unit 8 reads out compression-coded data from the secondary storage device 7 and decodes it in accordance with the print speed of the printer engine unit 10. The image processing unit 9 generates print image data containing YMCK components from the decoded image data. The resultant data is output to the printer engine unit 10 and printed.

As described above, the compression-coded data storage process in the secondary storage device 7 and the read process for decoding and printing are asynchronous. That is, the secondary storage device 7 functions as a buffer which exists between the image compression process and the decoding process. The document reading/encoding process does not depend on the decoding/print process. For this reason, it is possible to read a number of document pages at a high speed and quickly start the document reading process of the next job.

The overall arrangement of the apparatus according to the embodiment has been described above. The encoding processing unit 6 as a characteristic part of the apparatus will be described next.

<Description of Encoding Unit>

Figure 1:
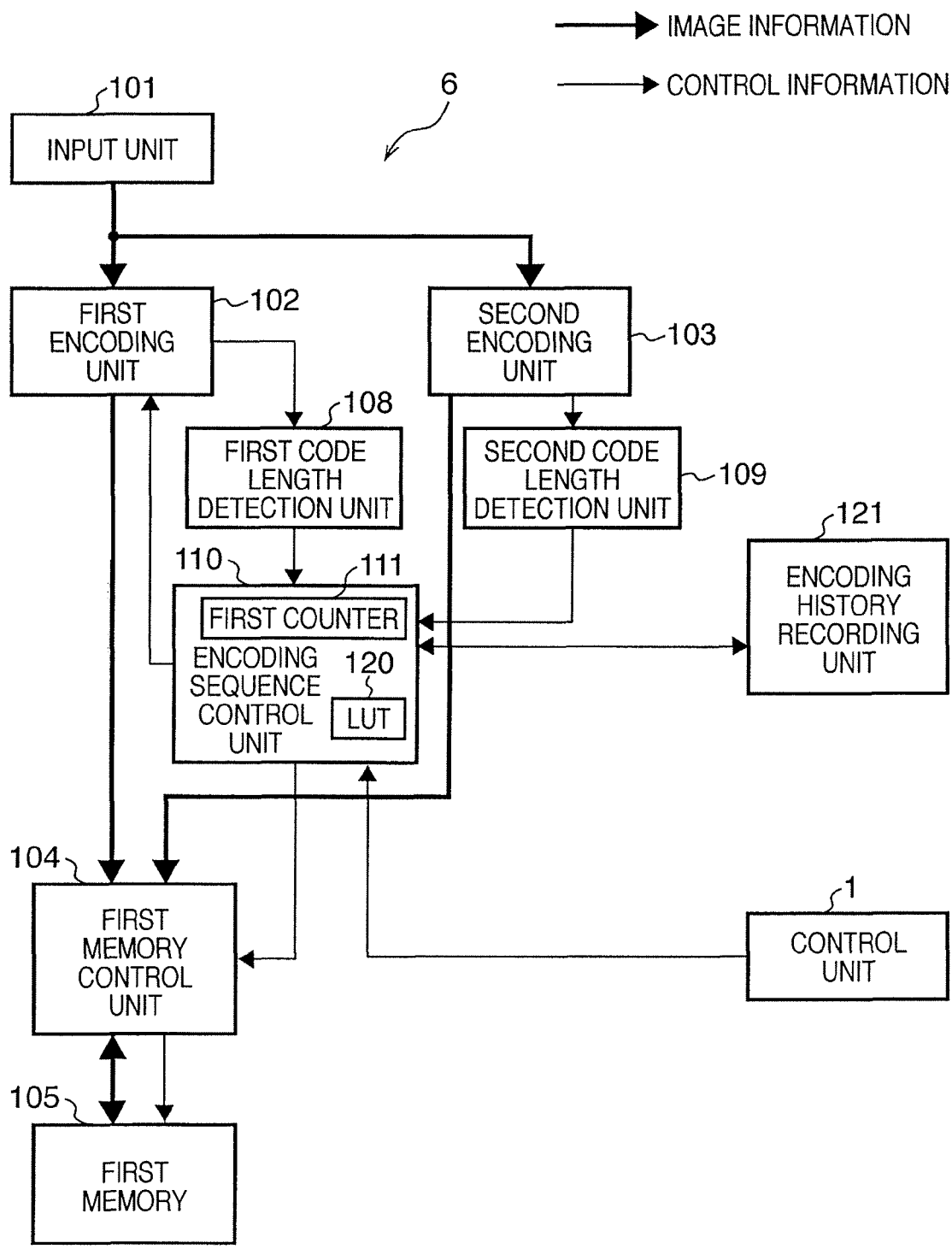
FIG. 1 is a block diagram of an encoding processing unit according to the first to fourth embodiments.

FIG. 1 is a block diagram of the encoding processing unit 6 according to the embodiment.

An input unit 101 incorporating a line buffer memory for a plurality of lines receives image data from the document reading unit 3 or rendering unit 4 via the selector 5 in the raster order, as described above. The input unit 101 stores the image data in the internal line buffer and outputs N×M pixel blocks (8×8 pixel blocks in this embodiment).

A first encoding unit 102 is a lossy encoding unit which compression-codes each pixel block received from the input unit 101 in accordance with parameters affecting the compression ratio and outputs the result (encoded data). The encoded data has, at the top, an identification bit (e.g., "0") indicating that the data is encoded by the first encoding unit 102.

An example will be described in which the image encoding unit 102 of this embodiment uses JPEG encoding (lossy encoding). More specifically, image data corresponding to an 8×8 pixel block undergoes orthogonal transform (DCT) transform, quantization using a quantization step to be described later, and Huffman encoding. The generated code amount changes depending on the quantization step. An encoding sequence control unit 110 sets the quantization step. JPEG encoding is known as a technique suitable for a natural image.

Figure 21:
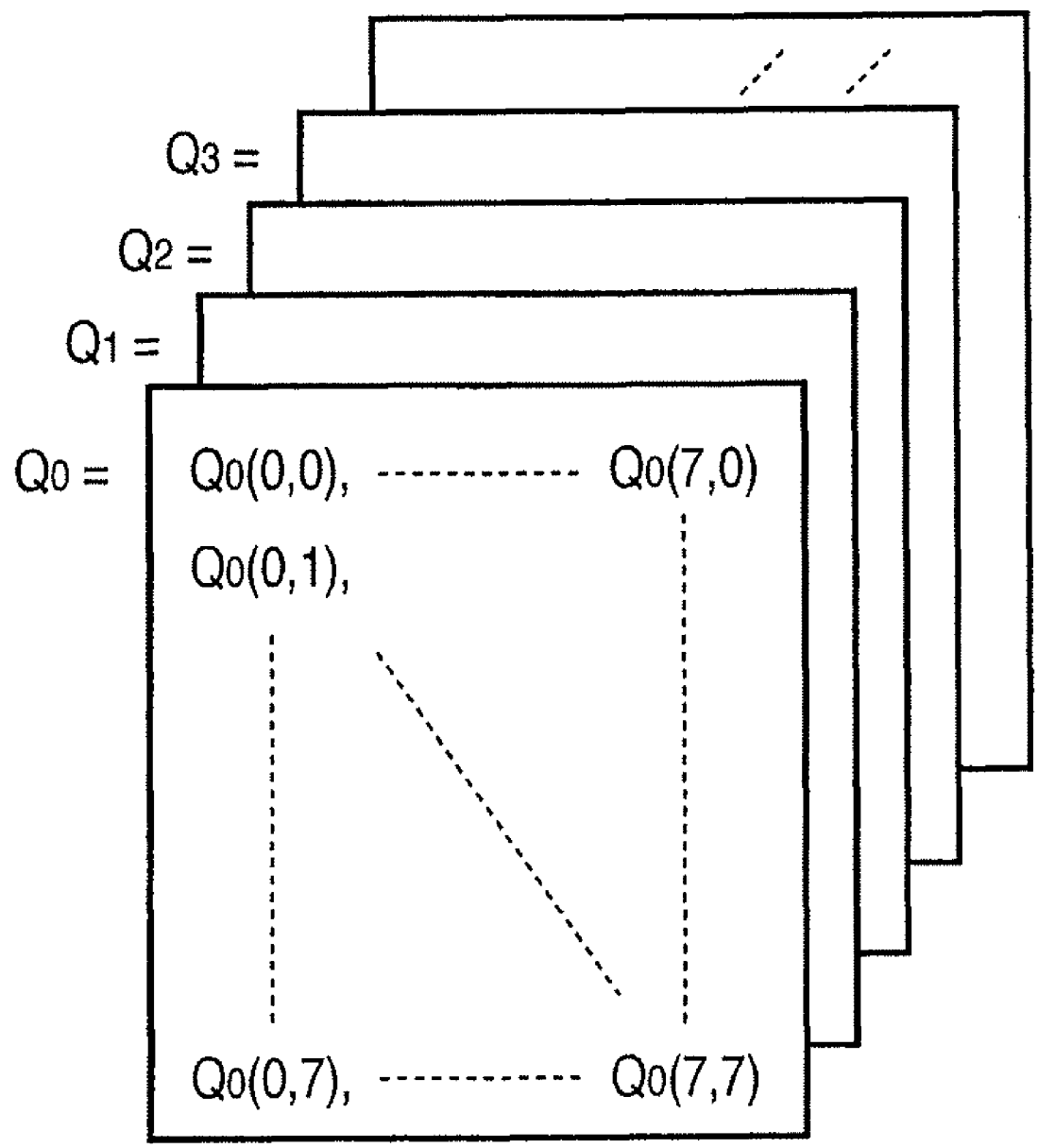
FIG. 21 is a view showing quantization matrix tables used in the embodiment.

FIG. 21 shows quantization matrix tables $Q_0, Q_1, Q_2, \ldots$ (stored and held in the encoding sequence control unit 110) used to quantize a frequency coefficient after DCT. Values $Q_i(0,0)$ to $Q_i(7,7)$ ($i=0, 1, 2, \ldots$) in the quantization matrix tables indicate quantization step values. A relationship $Q_0 < Q_1 < Q_2 \ldots$ almost holds between the quantization step values. The larger the quantization step value is, the narrower the range the frequency coefficient value after quantization can take is, and the higher the compression ratio is.

A second encoding unit 103 is a lossless encoding unit, unlike the first encoding unit 102. In lossless encoding, a decoding result matches the image before encoding.

Although the image quality does not degrade in principle, there are no parameters to reliably increase the compression ratio. In this embodiment, the second encoding unit 103 uses JPEG-LS. JPEG-LS uses an algorithm different from that of lossy encoding JPEG employed by the first encoding unit regardless of the prefix "JPEG". JPEG-LS encoding is a technique suitable for a character/line image and computer graphics. For images of these types, JPEG-LS can generate encoded data in an amount much smaller than not only a quantization step value "1" (actually lossless) given to JPEG but also a relatively small quantization step value such as "2" or "3".

The second encoding unit 103 encodes the same pixel block at almost the same timing as the first encoding unit 102 and outputs encoded data. In outputting encoded data, the second encoding unit 103 adds, to the top of the encoded data, an identification bit (e.g., "1") indicating that the data is encoded by the second encoding unit 103.

If the identification bit is "0", the decoding processing unit 8 determines that the encoded data of the pixel block is lossy encoded data and executes decoding. If the identification bit is "1", the decoding processing unit 8 determines that the encoded data of the pixel block is lossless encoded data and executes decoding.

A first code length detection unit 108 detects the encoded data length (including one bit serving as the identification bit) of the pixel block output from the first encoding unit 102 and outputs the result to the encoding sequence control unit 110. A second code length detection unit 109 detects the encoded data length (including one bit serving as the identification bit) of the pixel block output from the second encoding unit 103 and outputs the result to the encoding sequence control unit 110.

The encoding sequence control unit 110 controls the encoding processing unit 6 of this embodiment. As one of its processes, the encoding sequence control unit 110 decides encoded data to be stored in a first memory 105 by using the signals from the first code length detection unit 108 and second code length detection unit 109 and an internal LUT (LookUp Table) 120 (the selection principle will be described later). The encoding sequence control unit 110 outputs a selection signal to a first memory control unit 104 to cause it to select the decided encoded data.

The encoding sequence control unit 110 also records, in an encoding history recording unit 121, information representing which data has been selected, lossy encoded data or lossless encoded data, and information representing the lossy or lossless encoded data length in correspondence with each pixel block (this will be described later in detail).

The encoding sequence control unit 110 comprises a first counter 111 which cumulatively counts the code length data of encoded data to be stored in the first memory 105. The first counter 111 is cleared to 0 upon starting encoding one page. Hence, the counter 111 holds information representing the total encoded data amount stored in the first memory 105.

The encoding sequence control unit 110 compares the value (the encoded data amount stored in the first memory 105) of the counter 111 with a target code amount Th (determined depending on the size of an input image). Upon detecting that the value of the counter 111 has exceeded (or reached) the target code amount Th, the encoding sequence control unit 110 outputs a control signal to the memory control unit 104 to discard data stored in the memory 105. At this time, the encoding sequence control unit 110 clears the counter 111 to 0. Then, the encoding sequence control unit 110 requests the control unit 1 (FIG. 22) to re-input the image and re-scan the document image.

Re-scanning is done to reduce the encoded data amount to be stored in the first memory 105. To do this, the encoding sequence control unit 110 changes the selection criteria in the first encoding unit 102 or LUT 120. That is, the encoding sequence control unit 110 updates environmental settings (encoding parameters) to suppress the generated encoded data amount as compared to at least that of the previous time. The update process will be described later in detail.

If encoding of one page finishes before the value of the counter 111 exceeds the target code amount Th, the encoded data is output to the secondary storage device 7 as a file. Note that the encoded data of one page contains both lossless and lossy encoded data. If image data of the next page exists (or the next document page exists), the document is conveyed to the reading surface (generally, platen glass) to read it, and reading and encoding start.

The process contents of the encoding processing unit 6 according to the embodiment have roughly been described above.

<Description of Environmental Settings>

Environmental settings to make the encoding sequence control unit 110 of the embodiment decide which should be stored in the first memory 105, lossy or lossless encoded data of each pixel block, will be described next.

As describe above, in this embodiment, the first encoding unit 102 uses JPEG as lossy encoding, and the second encoding unit 103 uses JPEG-LS as lossless encoding. JPEG is an encoding technique suitable for a natural image, as is known. The compression ratio for a character/line image is not high. On the other hand, JPEG-LS is suitable for a character/line image (including a color image) and an image of, e.g., a simple bar graph. In this lossless encoding, the image quality does not degrade in principle. However, JPEG-LS cannot use a high compression ratio for a natural image. That is, the two encoding techniques compensate for each other.

Figure 20:
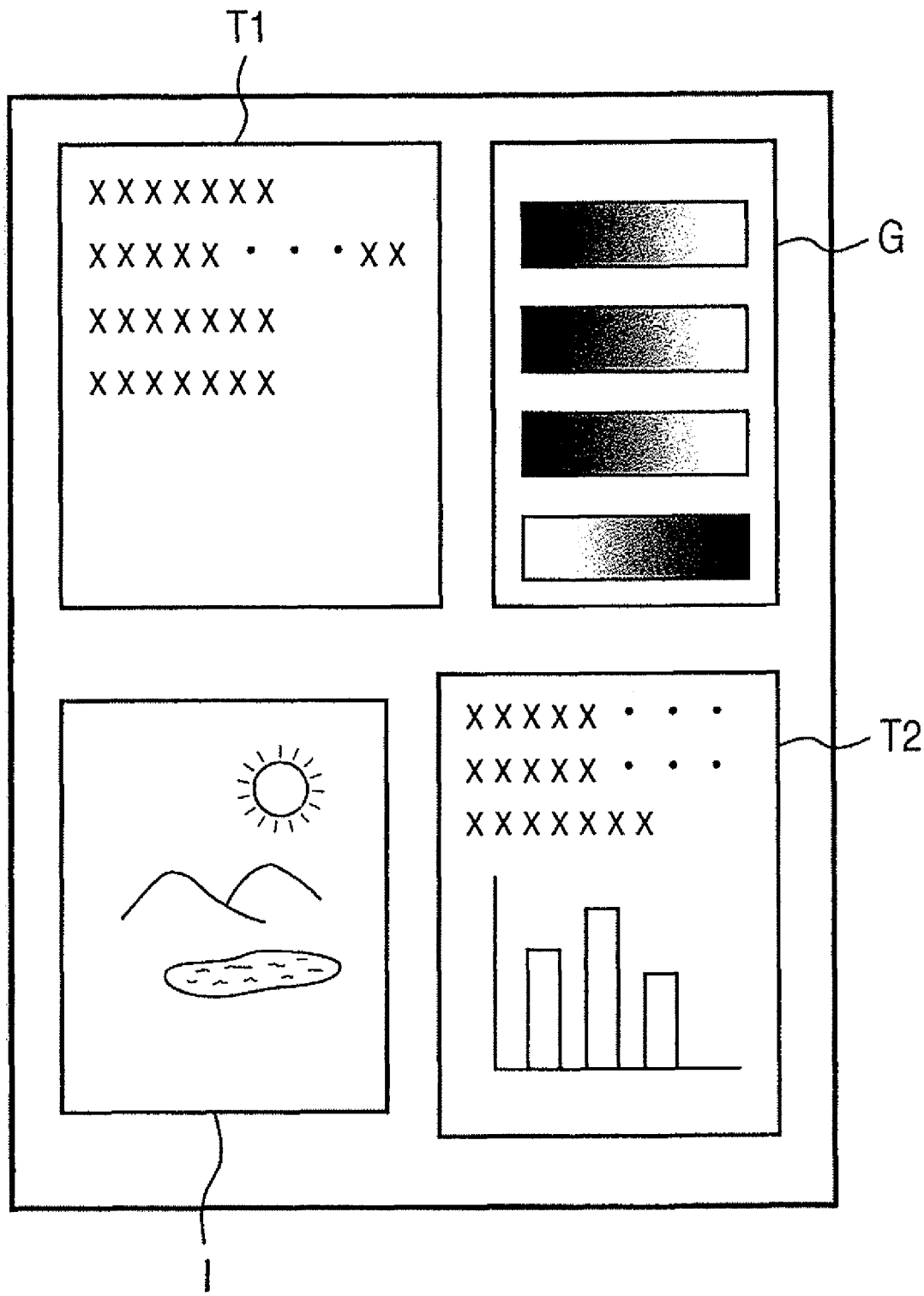
FIG. 20 is a view showing a sample document image.

Reading of a document which contains character/line image areas $T_1$ and $T_2$, a gradation (image with smoothly changing gray level) area G by computer graphics, and a natural image area I, as shown in FIG. 20, will be examined.

Only character/line images with sharp edges are present in the character/line image area $T_1$. Only character/line images with slightly blurred edges are present in the character/line image area $T_2$. The character/line image area $T_2$ corresponds to an image area that has undergone anti-aliasing to smoothen the edge of a character or graphic pattern or digital resolution conversion. The character/line image area $T_2$ can simply be considered as an image area where a pseudo image is generated after copy is repeated many times.

Figure 18:
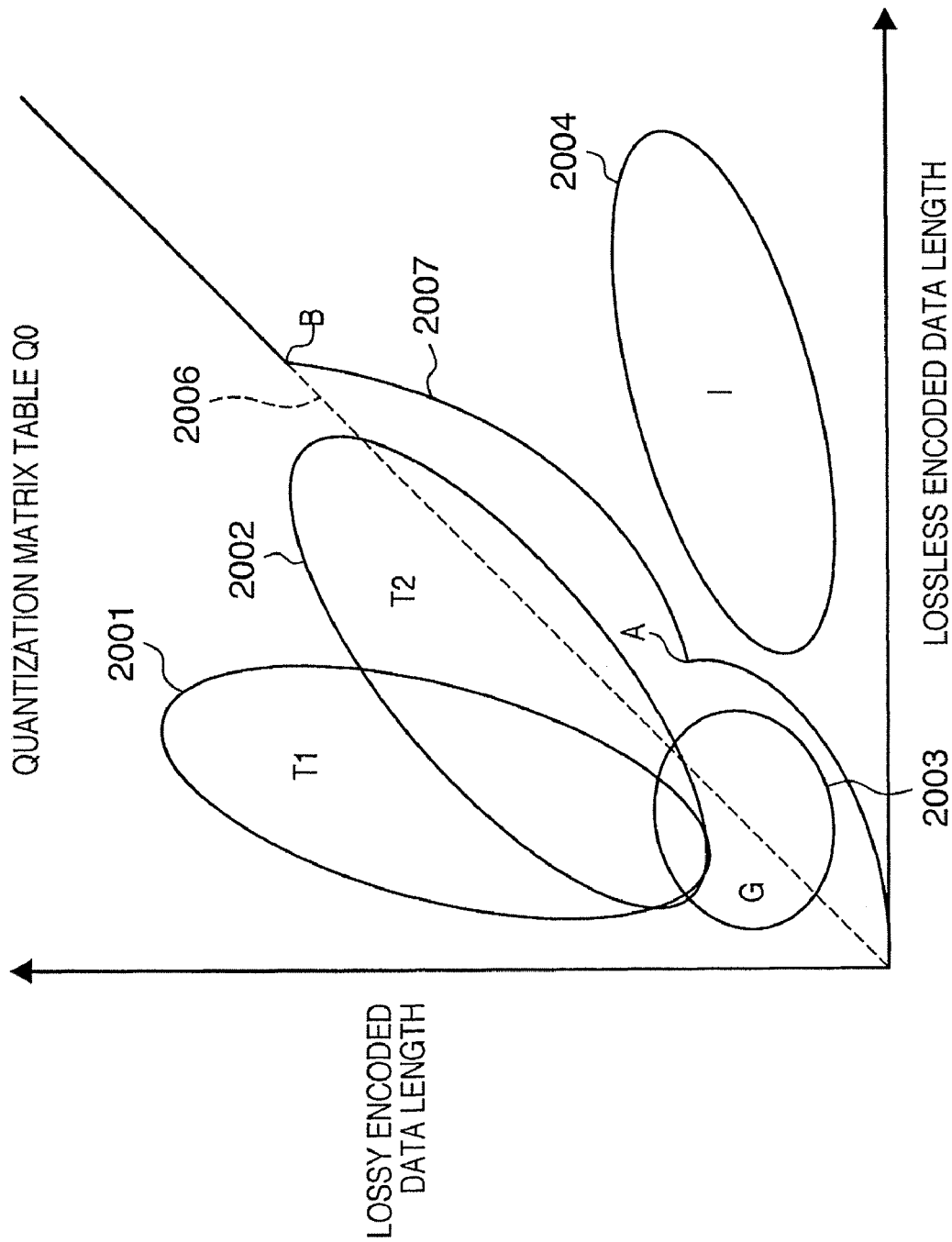
FIG. 18 is a view for explaining a boundary condition for selecting one of lossless encoded data and lossy encoded data according to the embodiment.

Assume that quantization matrix $Q_0$ (maximum image quality and minimum compression ratio) is set as an initial parameter for the first encoding unit 102 that executes lossy encoding, and the document in FIG. 20 is read. Let Lx be the code length of encoded data obtained by lossless-encoding each 8×8 pixel block, and Ly be the code length of encoded data obtained by lossy-encoding the same pixel block. FIG. 18 shows a result obtained by plotting points P(Lx,Ly) having Lx and Ly as coordinates as many as the pixel blocks contained in one page.

Elliptical distribution areas 2001 to 2004 in FIG. 18 almost indicate the distribution areas of plotted points of the areas $T_1$, $T_2$, G, and I. A few points are plotted outside the ellipses. These points are neglected as irregular points. A broken line 2006 in FIG. 18 indicates a relationship Ly=Lx.

From the viewpoint of encoded data compression efficiency, encoded data to be stored in the first memory 105 is decided under the following conditions.

1. When Ly<Lx, the first memory 105 stores lossy encoded data from the first encoding unit 102.
2. When Ly≧Lx, the first memory 105 stores lossless encoded data from the second encoding unit 103.

In this case, the first memory 105 can minimize the total encoded data amount of one page.

However, under the boundary condition Ly=Lx, the computer gradation area G is divided by the boundary line 2006. That is, lossy encoded data and lossless encoded data mix in pixel blocks. More specifically, the computer gradation area G alternately contains pixel blocks of lossless encoded data and those of lossy encoded data at a very high possibility. If this data is decoded, block noise readily occurs and makes the boundary between adjacent pixel blocks discontinuous due to the different encoding schemes. This is disadvantageous in terms of image quality.

In this embodiment, a nonlinear boundary condition indicated by a solid line 2007 in FIG. 18 is set. More specifically, a curve projecting downward (concave from the upper side) is set such that it passes through the intermediate position between the distribution area 2003 of the computer gradation area G and the distribution area 2004 of the natural image area I while going around outside the distribution area 2003. The curve passes between the distribution area 2002 of the character/line image area $T_2$ and the distribution area 2004 of the natural image area I.

In FIG. 18, the curve part (nonlinear part) of the boundary line 2007 passes outside the computer gradation area G and the character/line image area $T_2$ that has undergone anti-aliasing. However, the curve does not always pass outside the computer gradation area G and the character/line image area $T_2$ that has undergone anti-aliasing and is preferably obtained by using more samples. In either case, the boundary line 2007 of this embodiment allows to employ lossless encoded data at a high probability for a part with a relatively small code amount, as compared to the simple linear boundary condition 2006, so that the above-described problem can be prevented. The part where the boundary line is nonlinear corresponds to an area where the code lengths of both encoding schemes are short. Hence, the influence on the encoded data amount of the entire image can be reduced.

The boundary condition represented by the solid line 2007 is expressed by Ly=f(Lx).
1. When Ly<f(Lx), the first memory 105 stores lossy encoded data from the first encoding unit 102.
2. When Ly≧f(Lx), the first memory 105 stores lossless encoded data from the second encoding unit 103.

As a result, the computer gradation area contains the encoded data of different encoding schemes at a low probability. This prevents the above-described problem.

The solid line 2007 in FIG. 18 expresses, by using a curve, the section represented by the origin, a point A (≈the maximum value of the lossless encoded data length in the computer gradation area+α), and a point B (the maximum value of the character/line image area $T_2$ that has undergone anti-aliasing and satisfies Ls<Ly+α). The broken line 2006 and solid line 2007 are superimposed in a region where the code lengths are larger than the point B. As a result, when both the lossless encoded data length and the lossy encoded data length are long, encoded data with a short data length is selected. This suppresses any increase in the encoded data amount stored in the first memory 105.

A measure taken when the value of the first counter 111 has exceeded the target code amount Th will be described below. From scanning of the second time, the encoded data amount must be smaller than the encoded data amount of the previous time. The present inventors came up with two approaches. Each approach will be described.

<First Approach>

In the first approach, when quantization matrix $Q_{i-1}$ was used in the previous encoding, a quantization matrix $Q_i$ of a higher level is used in the current scanning and encoding. In addition, the boundary condition is changed. This will be described below in detail.

Figure 19:
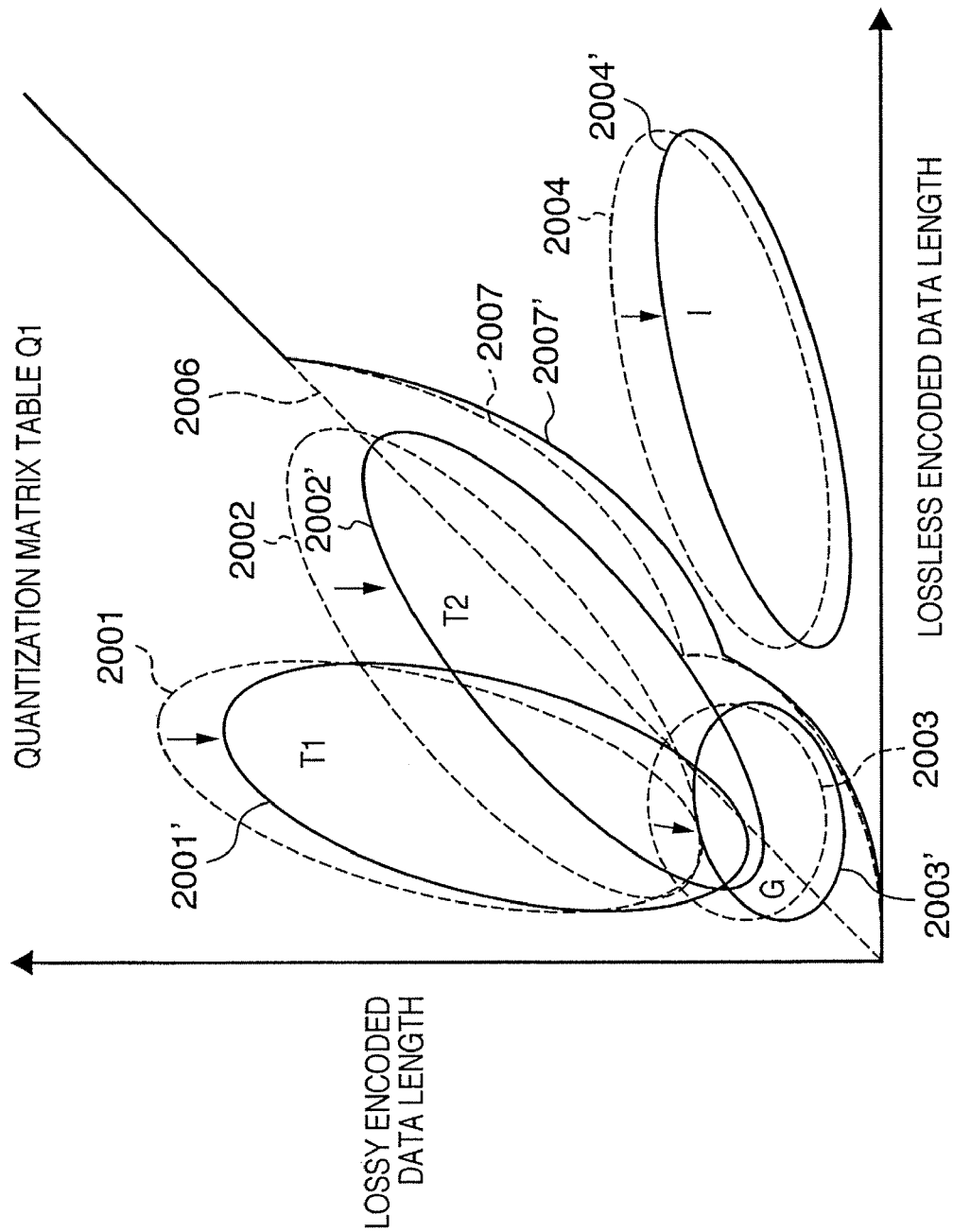
FIG. 19 is a view showing a state wherein the boundary condition changes in accordance with a change in the quantization matrix.

In FIG. 18, the quantization matrix $Q_0$ set in the first encoding unit 102 is used. FIG. 19 shows the plotted distribution areas of the image areas when the quantization matrix $Q_1$ higher than the quantization matrix $Q_0$ by one level is used.

Since the code length Lx of lossless encoded data does not vary, the distribution areas 2001 to 2004 in FIG. 18 generally shift downward along the vertical axis to distribution areas 2001' to 2004' in FIG. 19. Accordingly, the curve part of the boundary line 2007 in FIG. 18 also generally shifts downward to a boundary line 2007' in FIG. 19.

Let $Q_i$ be the quantization matrix used by the first encoding unit 102. The boundary condition is defined as $f_i()$. A variable i takes values "0", "1", "2", "3", . . . , as shown in FIG. 21. As the variable i becomes large, the curve part of the boundary line indicated by the boundary condition $f_i$ shifts downward.

That is, the process of the encoding sequence control unit 110 is as follows.
1. When Ly<$f_i$(Lx), the first memory 105 stores lossy encoded data from the first encoding unit 102.
2. When Ly≧$f_i$(Lx), the first memory 105 stores lossless encoded data from the second encoding unit 103.

If the quantization matrix used at least in the previous encoding was $Q_{i-1}$, the quantization matrix $Q_i$ is used in the current process. This allows to decrease the encoded data amount stored in the first memory 105 as compared to that in the previous encoding.

<Second Approach>

Figure 23:
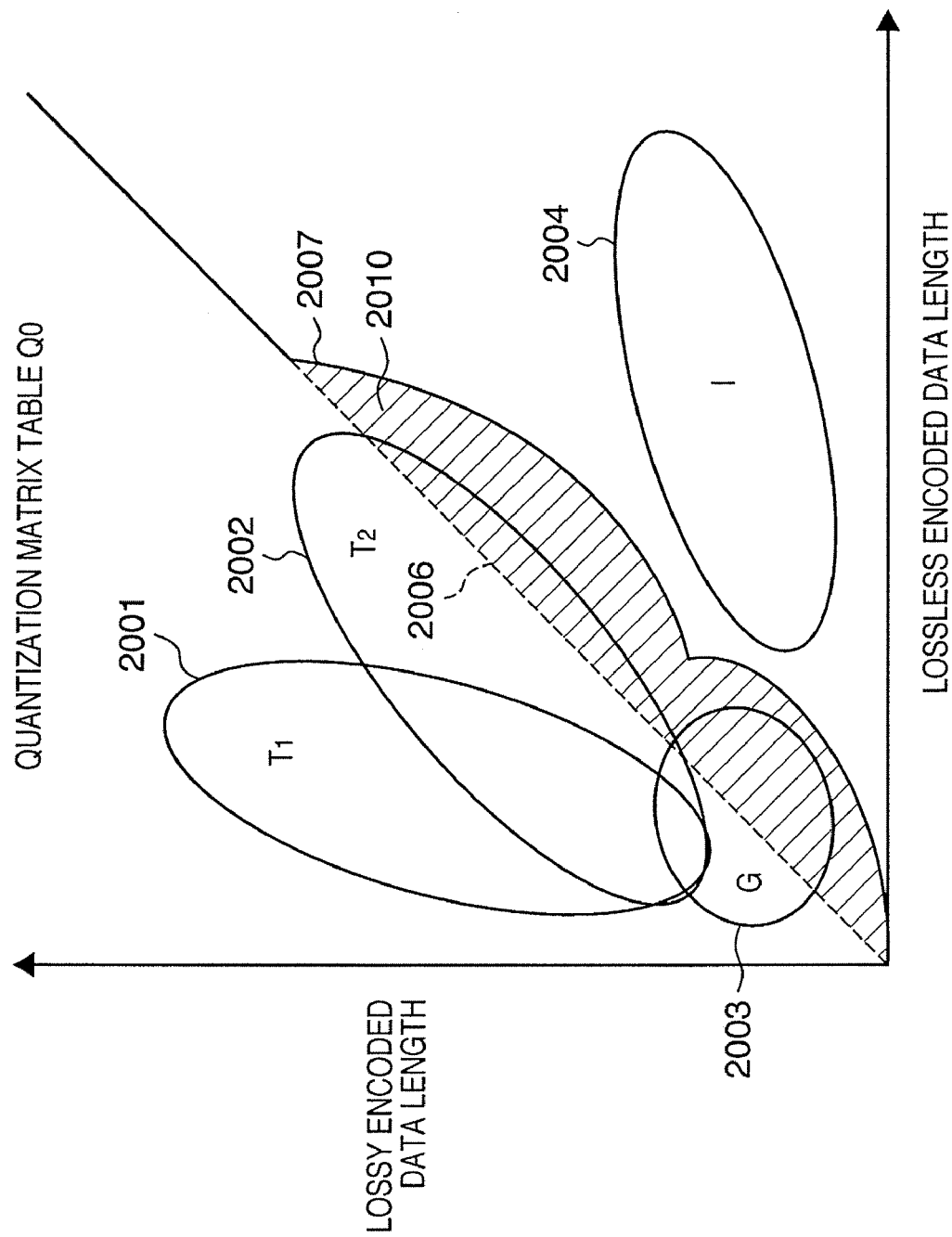
FIG. 23 is a view showing an area where lossless encoded data is selected even when the lossless encoded data length is longer than the lossy encoded data length according to the embodiment.

A hatched area 2010 in FIG. 23 explicitly indicates the area sandwiched between the boundary lines 2006 and 2007 in FIG. 19.

Let Lx be the code length of lossless encoded data obtained from a pixel block and Ly be the code length of lossy encoded data obtained from the pixel block. If the coordinates (Lx,Ly) exist in the area 2010, the first memory 105 stores the lossless encoded data in an amount larger than the lossy encoded data.

It is therefore possible to reduce the encoded data amount stored in the first memory 105 by only reducing the area of the area 2010 without changing the quantization matrix $Q_i$.

Figure 24:
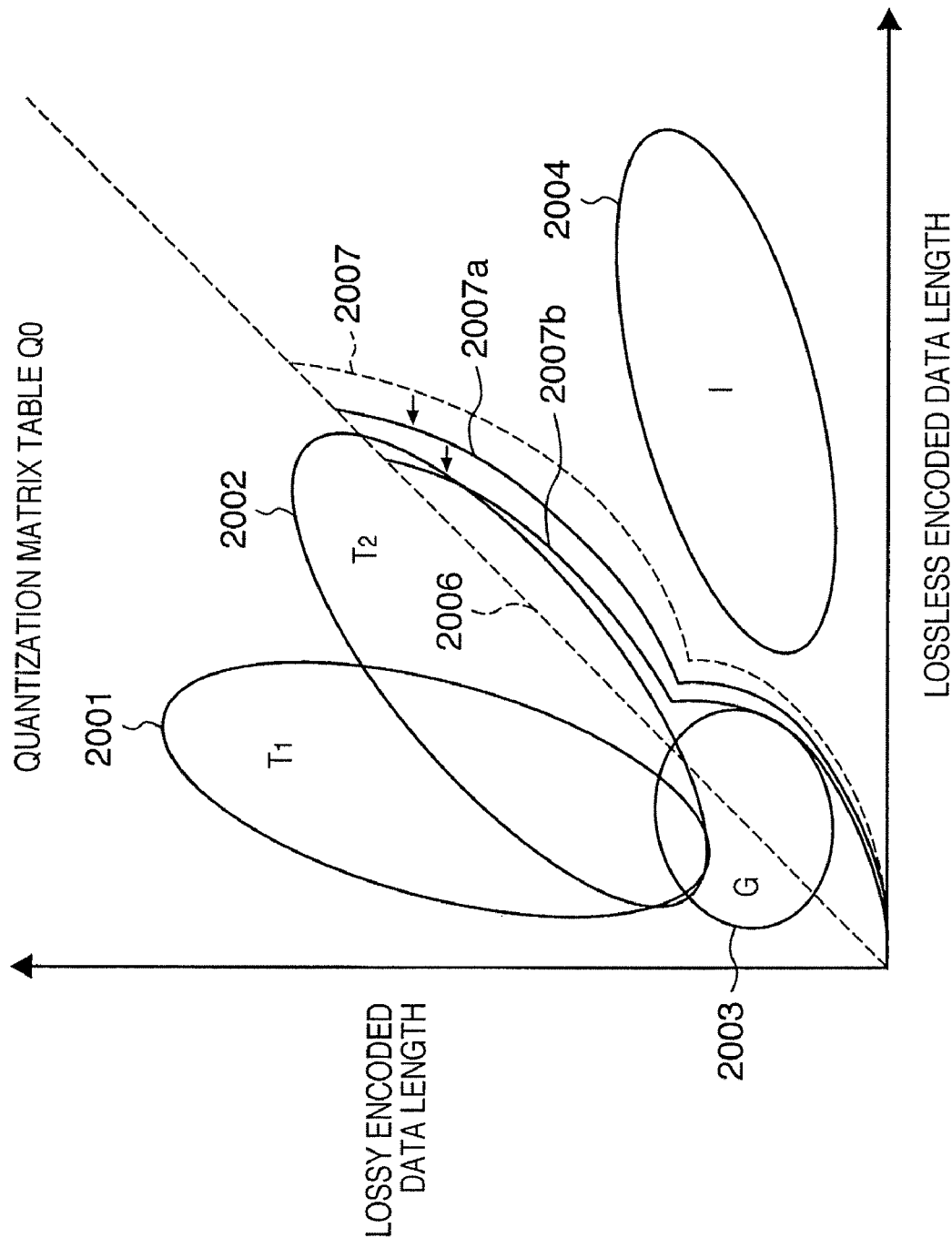
FIG. 24 is a view showing an example of left shift of a boundary condition function.

To do this, the boundary line 2007 shifts leftward to a boundary line 2007a, as shown in FIG. 24, in scanning of the second time. If the encoded data amount generated at this time has exceeded the target code amount Th, a boundary line 2007b further shifted leftward is employed.

Referring to FIG. 24, the boundary line 2007b passes inside the area 2002. The area 2007b corresponds to an unclear character/line image that has undergone anti-aliasing. A character/line image in a normal document corresponds not to the area 2002 but to the area 2001. Hence, the influence of image quality degradation by encoding is small. However, it is preferable to prevent the boundary line from entering the area 2003 (image by computer graphics). The reason has been described above. In the present invention, however, the boundary line need not always pass outside the area 2003. This is because even when the boundary line slightly enters the area 2003, the possibility of image quality degradation is lower than that upon employing the linear boundary line 2006.

The boundary lines 2007a and 2007b are expressed as lines obtained by shifting the boundary line 2007 leftward. Instead of simply shifting the boundary line 2007, its horizontal scaling factor may be changed, as in the first approach.

As described above, it is possible to reduce the encoded data amount by general shifting the boundary line 2007 leftward without changing the quantization matrix.

<Description of Encoding Environment Setting Principle>

In the second approach, the boundary lines $2007a$, $2007b$, ... are defined by shifting the initial boundary line 2007 of the quantization matrix $Q_0$ leftward while satisfying $Ly \geq Lx$. The left shift target is the same even for the initial boundary line of each of the quantization matrixes $Q_1$, $Q_2$, ....

The number of times of left shift is defined by a variable j. The boundary condition for lossless/lossy encoded data selection can be specified by the variable j and the variable i that specifies a quantization matrix to be used. That is, the boundary condition can be regarded as a function $f_{i,j}()$ using the variables i and j as parameters.

Hence, the encoding sequence control unit 110 executes the following process.
1. When $Ly < f_{i,j}(Lx)$, the first memory 105 stores lossy encoded data from the first encoding unit 102.
2. When $Ly \geq f_{i,j}(Lx)$, the first memory 105 stores lossless encoded data from the second encoding unit 103.

The encoding sequence control unit 110 calculates the function $f_{i,j}()$ every time the encoded data of a pixel block is generated. However, this increases the load on the encoding sequence control unit 110. In this embodiment, to prevent this, many boundary condition data corresponding to the function $f_{i,j}()$ (i,j=0, 1, 2, 3, ... ) are held as the LUT (LookUp Table) 120 in the encoding sequence control unit 110.

Figure 2:
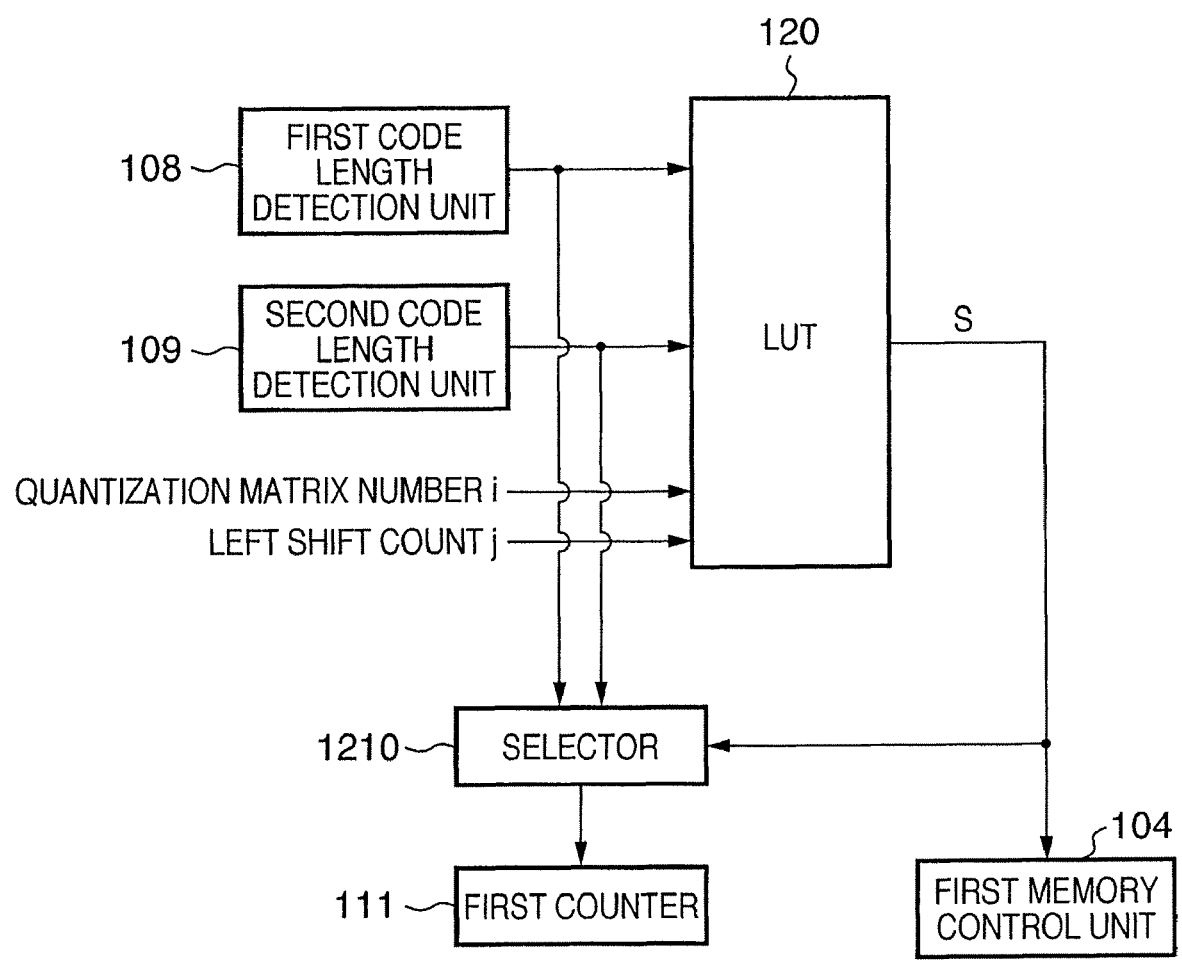
FIG. 2 is a block diagram of a part that executes an encoded data selection process in an encoding sequence control unit shown in FIG. 1.

The arrangement related to selection of encoded data amount using the LUT 120 and selection of the boundary function $f_{i,j}()$ in the encoding sequence control unit 110 can be implemented by, e.g., an arrangement shown in FIG. 2.

Code length data and the variables i and j are supplied from each of the first code length detection unit 108 and second code length detection unit 109 to the LUT 120 as an address.

The variables i and j can also be regarded as signals to select one of the plurality of tables representing the boundary condition function $f_{i,j}()$.

A 1-bit selection signal S is stored in advance at the address position in the LUT 120. For example, "1" is stored at an address position where $Ly \geq f_{i,j}(Lx)$, and "0" is stored at an address position where $Ly < f_{i,j}(Lx)$.

Upon addressing, the bit is output to the first memory control unit 104 as the encoded data selection signal S. The encoded data selection signal S is also supplied as a selection signal for a selector 1210. The selector 1210 outputs selected code length data to the first counter 111. The first counter 111 cumulatively adds data lengths output from the selector 1210.

In scanning/encoding a document, the encoding sequence control unit 110 sets the quantization matrix table $Q_i$ represented by the variable i in the first encoding unit 102. The encoding sequence control unit 110 stores one of the lossless and lossy encoded data in the first memory 105 in accordance with the boundary condition $f_{i,j}()$. In document scanning/encoding of the first time, i=j=0.

Assume that the code amount information (total encoded data amount stored in the first memory 105) held by the first counter 111 has exceeded the target code amount Th. The encoding sequence control unit 110 selects one of boundary conditions $f_{i+1,j}()$ and $f_{i,j+1}()$ adjacent to the current boundary condition and executes re-scanning/re-encoding. In other words, the encoding sequence control unit 110 must decide the values of the variables i and j. The principle to decide the variables i and j will be described below.

The encoding sequence control unit 110 of this embodiment stores encoding process log information in the encoding history recording unit 121 (FIG. 1) every time one pixel block is encoded.

The structure of data stored in the encoding history recording unit 121 is shown in, e.g., FIG. 28. FIG. 2 shows log information when i=a, and j=b.

The first field stores pixel block numbers. A maximum pixel block number Nmax depends on the size of a read document. The second field stores the lossless encoded data length Lx. The third field stores the lossy encoded data length Ly. The fourth field stores the selection signal S (FIG. 2) representing the type of encoded data stored in the first memory 105.

An area $121a$ stores a cumulative sum MLS of the lossless encoded data lengths Lx when the lossless encoded data length is selected, i.e., the selection signal S is "1". An area $121b$ stores a cumulative sum MJP of the lossy encoded data lengths Ly when the selection signal S is "0". That is, the sum of the value MLS held in the area $121a$ and the value MJP held in the area $121b$ equals the value held by the first counter 111.

FIG. 28 shows a case wherein the value held by the first counter 111 has exceeded the target code amount Th when encoding of the kth pixel block is ended.

In this case, the encoding sequence control unit 110 executes the following process.

[When MLS<MJP]

This indicates a case wherein the lossy encoded data amount is larger than the lossless encoded data amount. In other words, the lossy encoded data amount is dominant in the whole encoded data. The encoding sequence control unit 110 executes the following process.
1. The encoding sequence control unit 110 outputs an instruction to discard data in the first memory 105 to the first memory control unit 104 and clears the first counter 111 to 0.
2. The encoding sequence control unit 110 sets a quantization matrix $Q_{a+1}$ higher than a previous quantization matrix $Q_a$ by one level in the first encoding unit 102.
3. The encoding sequence control unit 110 sets i=a+1, and j=b in the LUT 120 and changes the boundary condition to be used to $f_{a+1,j}()$.
4. The encoding sequence control unit 110 starts re-scanning/re-encoding the document.

[When MLS≧MJP]

This indicates a case wherein the lossless encoded data amount is larger than the lossy encoded data amount. In other words, the lossless encoded data amount is dominant in the whole encoded data. The encoding sequence control unit 110 executes the following process.
1. The encoding sequence control unit 110 outputs an instruction to discard data in the first memory 105 to the first memory control unit 104 and clears the first counter 111 to 0.
2. The encoding sequence control unit 110 maintains the previous quantization matrix $Q_a$ in the first encoding unit 102.
3. The encoding sequence control unit 110 sets i=a, and j=b+1 in the LUT 120 and sets a boundary condition $f_{a,b+1}()$.
4. The encoding sequence control unit 110 starts re-scanning/re-encoding the document.

According to this embodiment, when encoded data obtained during the encoding process of an image of one page has exceeded the target code amount Th, the variables i and j are decided in accordance with the lossless and lossy encoded data amounts at that time. It is therefore possible to set an optimum encoding environment in accordance with the encoding target image data.

In the above-described embodiment, the variables i and j of the next scanning/encoding are decided by comparing the lossless encoded data amount MLS with the lossy encoded data amount MJP. Instead, which one of the variables i and j should be updated may be decided on the basis of the number of times of "1" (or the number of times of "0") of the signal S. More specifically, the sum of the signals S indicates the number of times of selection of lossless encoded data. If the number of times is less than the majority, the process of [When MLS<MJP] is executed. If the number of times is more than the majority, the process of [When MLS≧MJP] is executed. In the above-described embodiment, the encoded data lengths Lx and Ly and the selection signal S are stored every time one pixel block is encoded. However, the encoded data lengths Lx and Ly and the selection signal S need not always be stored because necessary information exist in the areas 121a and 121b.

Figure 3A:
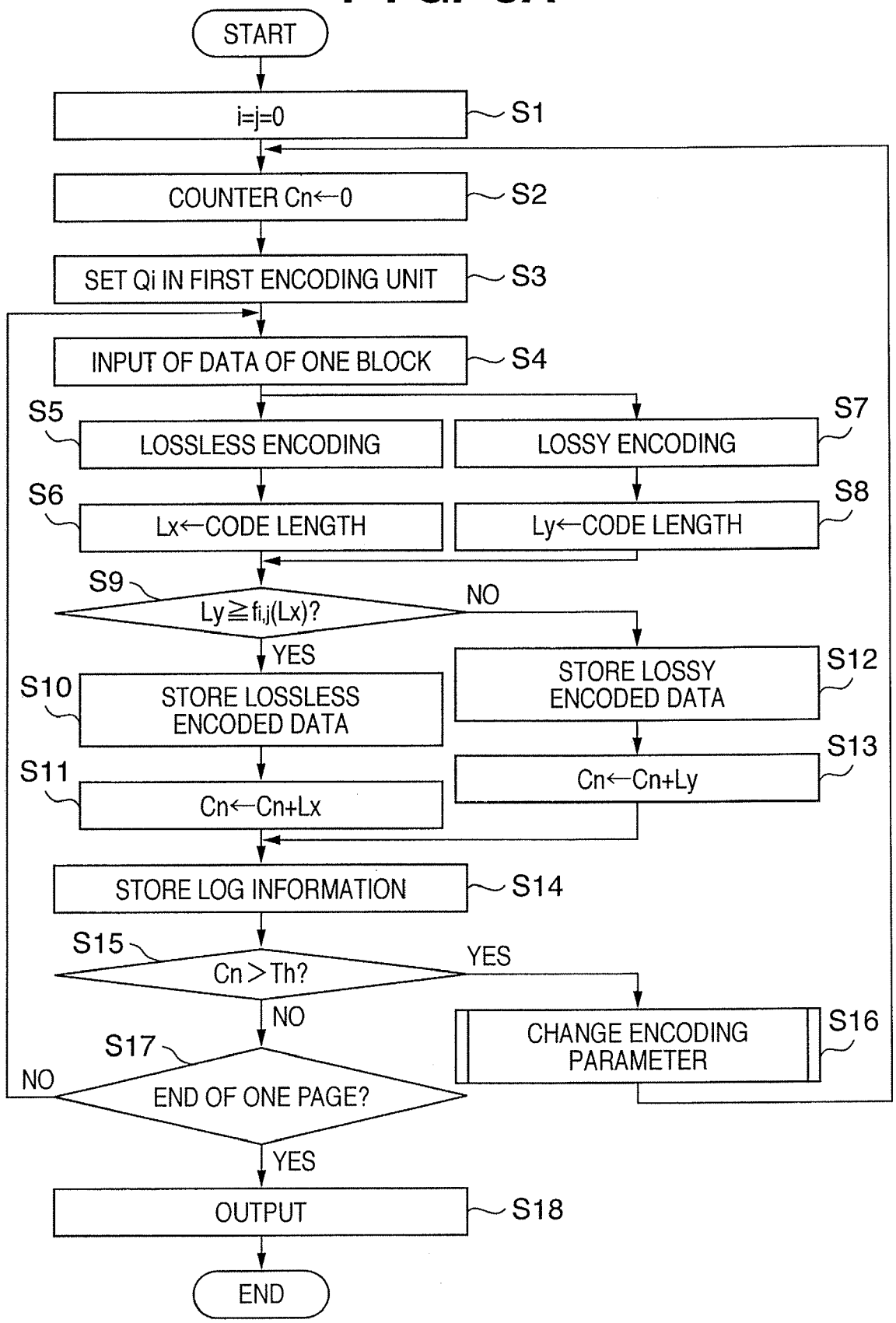
FIG. 3A is a flowchart showing the main routine of an encoding process procedure according to the first to fourth embodiments.
Figure 3B:
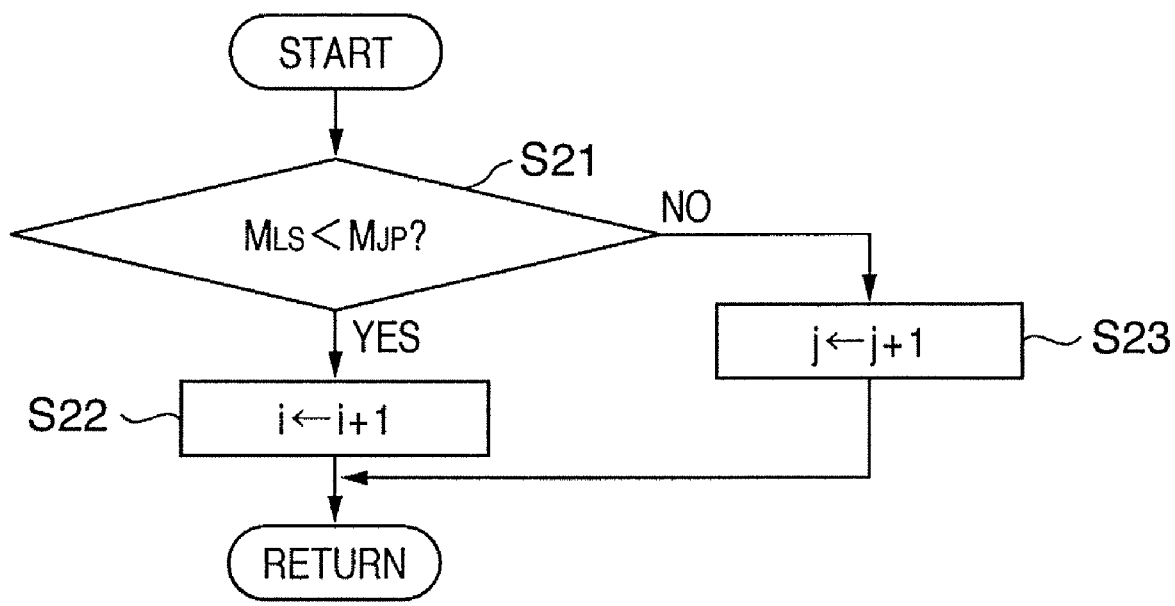
FIG. 3B is a flowchart showing an encoding parameter change process procedure according to the first embodiment.

To implement the above-described process, the encoding sequence control unit 110 of this embodiment executes the process in accordance with the flowchart in FIGS. 3A and 3B.

In step S1, 0 is set in the variables i and j as an initial value. In step S2, a variable Cn corresponding to the first counter 111 is cleared to 0.

In step S3, the quantization matrix table $Q_i$ is set in the first encoding unit 102. At this time, the encoding sequence control unit 110 clears the encoding history recording unit 121.

In step S4, data of one pixel block is input. In step S5, the first encoding unit 102 executes lossless encoding. In step S6, the encoded data length Lx at this time is obtained. In steps S7 and S8, the first encoding unit 102 executes lossy encoding, and the encoded data length Ly at this time is obtained in parallel to steps S5 and S6.

In FIG. 3A, steps S5 and S6 and steps S7 and S8 are executed in parallel. The same sequence is possible if it is implemented by a computer program, and a multitasking OS runs. If a single-tasking OS is used, steps S5, S6, S7, and S8 are executed in this order.

In step S9, it is determined whether Ly≧$f_{i,j}$(Lx) is satisfied. If YES in step S9, the first memory 105 stores the lossless encoded data in step S10. In step S11, the code length Lx is added to the counter Cn.

If NO in step S9, the first memory 105 stores the lossy encoded data in step S12. In step S13, the code length Ly is added to the counter Cn.

In step S14, the encoding history recording unit 121 stores the encoding history information (Lx and Ly and the selection signal S in this embodiment) of the pixel block of interest.

In step S15, it is determined whether the counter Cn has exceeded the threshold as the target code amount Th. If it is determined that Cn>Th, the process advances to step S16 to update the encoding parameters i and j (to be described later in detail). The process returns to step S2 to start re-input and re-encoding from the first pixel block of one page.

If it is determined in step S15 that Cn≦Th, the process advances to step S17 to determine whether the final pixel block of one page is processed. If NO in step S17, the process from step S4 is repeated to encode the next pixel block. If YES in step S17, the process advances to step S18 to write, in the secondary storage device 7 as a file, the encoded data stored in the first memory 105, and the process is ended.

The process in step S16 will be described with reference to the flowchart in FIG. 3B.

In step S21, the lossless encoded data amount MLS and lossy encoded data amount MJP cumulatively added until it is determined that the value of the variable Cn has exceeded the target code amount Th are compared.

If it is determined that MLS<MJP, the lossy encoded data amount MJP is larger than the lossless encoded data amount MLS. To update the quantization matrix $Q_i$ to $Q_{i+1}$, the variable i is incremented by "1" (step S22).

If it is determined that MLS≧MJP, the lossless encoded data amount MLS is larger than the lossy encoded data amount MJP. To shift the boundary line 2007 leftward, the variable j is incremented by "1" (step S23).

As described above, according to this embodiment, it is possible to generate encoded data equivalent to that obtained when an appropriate encoding process is executed for each image area by using both lossless encoding and lossy encoding, without providing any special image area determination circuit. If the data amount has exceeded the target code amount Th, the environment is changed by changing the quantization matrix table or/and the boundary condition, and image data is re-input and re-encoded. This allows to generate encoded data in the target code amount Th or less.

Second Embodiment

In the above-described embodiment, when the encoded data amount (the value of the first counter 111) stored in the first memory 105 has exceeded the target code amount Th, the lossless encoded data amount MLS and lossy encoded data amount MJP in the encoded data are compared. The variables i and j of the next scanning are decided in accordance with the comparison result. In the second embodiment, an example of more accurate decision of variables i and j will be described.

Prior to the description, assume that when $f_{i,j}(\ )$ changes to $f_{i+1,j}(\ )$, a statistical decrement R((i,j),(i+1,j)) of the lossy encoded data length with respect to the pixel block is obtained. When $f_{i,j}(\ )$ is used, the average lossy encoded data length of the pixel block is defined as $C(f_{i,j}(\ ))$. The decrement R((i,j),(i+1,j)) at this time is given by $$R((i,j),(i+1,j))=C(f_{i+1,j}(\ ))/C(f_{i,j}(\ ))$$

Similarly, assume that when $f_{i,j}(\ )$ changes to $f_{i,j+1}(\ )$ a statistical decrement R((i,j),(i,j+1)) of the lossy encoded data length is obtained. Also, assume that when $f_{i,j}(\ )$ changes to $f_{i+1,j+1}(\ )$, a statistical decrement R((i,j),(i+1,j+1)) of the lossy encoded data length is obtained in advance.

Assume that the encoded data amount stored in a first memory 105 has exceeded a target code amount Th during encoding under the boundary condition $f_{i,j}(\ )$. In this case, an encoding sequence control unit 110 of the second embodiment selects one of $f_{i+1,j}(\ )$, $f_{i,j+1}(\ )$, and $f_{i+1,j+1}(\ )$. That is, the encoding parameters i and j are decided.

The apparatus arrangement is the same as in FIG. 22. An encoding processing unit 6 also has the same arrangement as in FIG. 1. Different points are the process contents of the encoding sequence control unit 110 and the structure of data stored in an encoding history recording unit 121.

FIG. 29 shows an example of the data structure in the encoding history recording unit 121 according to the second embodiment. FIG. 29 is different from FIG. 28 in that the fifth to 10th fields are added. The first to fourth fields are the same as in FIG. 28.

In storing encoded data of one pixel block in the first memory 105, the encoding sequence control unit 110 of the second embodiment executes the following process.

1. The encoding sequence control unit 110 obtains values Ly', Ly", and Ly'" by multiplying lossy encoded data Ly of a pixel block of interest by the decrements R((i,j),(i+1,j)), R((i,j),(i,j+1)), and R((i,j),(i+1,j+1)) and stores the values Ly', Ly", and Ly'" in the fifth, seventh, and ninth fields as predicted encoded data lengths.

2. The encoding sequence control unit 110 stores predicted selection signals S', S", and S'" in the sixth, eighth, and 10th fields.

The processes 1 and 2 are done in step S14 in FIG. 3A.

To obtain the selection signals S', S", and S'", a pseudo selection signal S is generated by using the arrangement shown in FIG. 2. A lossless encoded data amount Lx does not change because it does not depend on the number of times of scanning.

The data stored in the encoding history recording unit 121 by the encoding sequence control unit 110 of the second embodiment are obtained in the following way.

$Ly' = Ly \times R((i,j),(i+1,j))$
When $Ly' < Lx$, then $S' = 0$
When $Ly' \geq Lx$, then $S' = 1$
$Ly'' = Ly \times R((i,j),(i,j+1))$
When $Ly'' < Lx$, then $S'' = 0$
When $Ly'' \geq Lx$, then $S'' = 1$
$Ly''' = Ly \times R((i,j),(i+1,j+1))$
When $Ly''' < Lx$, then $S''' = 0$
When $Ly''' \geq Lx$, then $S''' = 1$ The example shown in FIG. 28 indicates that the value of the first counter 111 has exceeded the target code amount when the kth pixel block is encoded.

When the first to kth pixel blocks are encoded, the lossless encoded data amount is given by MLS, and the lossy encoded data amount is given by MJP. The value of the first counter 111 is given by $$\text{Value of first counter } 111 = MLS + MJP \quad (1)$$

Assume that encoding of one page is interrupted halfway, and the (k+1)th and subsequent images are input in accordance with the same procedure as that until the kth image. A predicted total encoded data amount Mtotal of one page upon ending encoding of all pixel blocks of the page is given by $$M\text{total} = (MLS + MJP) \times N\max / k$$

A predicted encoded data amount Mtotal' of one page under the boundary condition $f_{i+1,j}()$ is given by $$M\text{total}' = (MLS' + MJP') \times N\max / k \quad (2)$$

where MLS' is the sum of lossless encoded data lengths Lx( ) when the predicted selection signal S'=1, and MJP' is the sum of lossy encoded data lengths Ly' ( ) when predicted selection signal S'=0.

In this case, when the encoded data amount has exceeded the target code amount Th during encoding of the kth pixel block, the encoding process is interrupted, and re-encoding starts. However, when the encoded data amount has exceeded the target code amount Th, accurate MLS and MJP may be calculated by continuing only counting of MLS and MJP and discarding the generated encoded data until encoding of one page is completed.

Similarly, a predicted encoded data amount Mtotal" under the boundary condition $f_{i,j+1}()$ and a predicted encoded data amount Mtotal '"under the boundary condition $f_{i+1,j+1}()$ can also be obtained.

In the second embodiment, one of the obtained predicted encoded data amounts Mtotal', Mtotal", and Mtotal'", which has the minimum absolute value of the difference from the target code amount Th is selected. The variables i and j at this time are decided as the encoding parameters of the next scanning/encoding.

If the table shown in FIG. 29 is already formed, it is possible to almost instantaneously calculate MLS'and MJP'. However, to increase the calculation speed, MLS' and MJP' need to be updated upon obtaining the predicted value Ly' or predicted selection signal S'.

In the second embodiment, when the actual encoded data amount obtained by setting the encoding parameters i=a and j=b has exceeded the target code amount Th, the encoding parameters of the re-scanning/re-encoding are selected from the three sets "i=a+1,j=b", "i=a,j=b+1", and "i=a+1,j=b+1". However, the encoding parameters may be selected from the two sets "i=a+1,j=b" and "i=a,j=b+1", as in the first embodiment.

Figure 30:
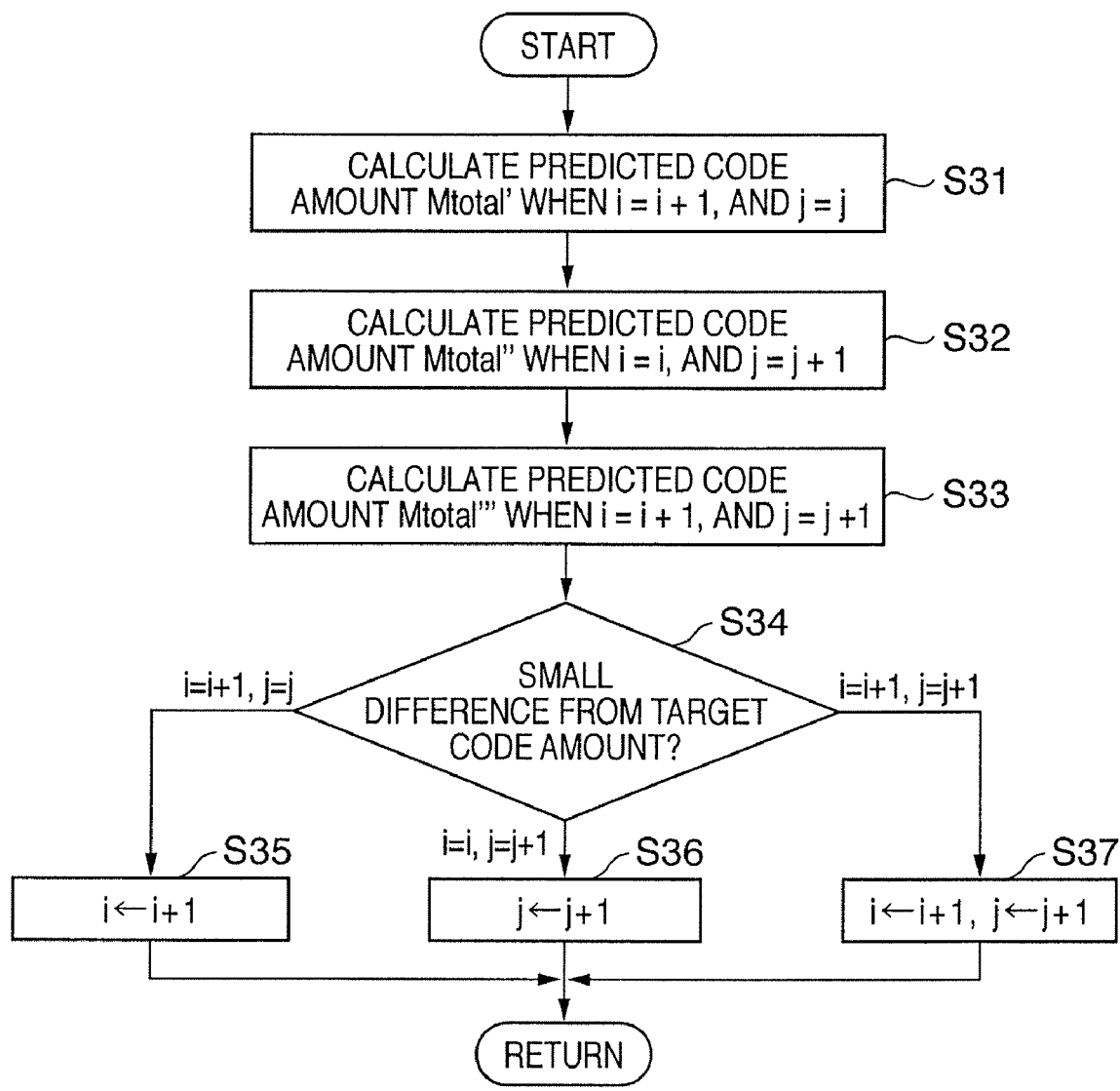
FIG. 30 is a flowchart showing an encoding parameter change process procedure according to the second embodiment.

The encoding sequence control unit 110 of the second embodiment decides the encoding parameters in accordance with the flowchart in FIG. 30 instead of FIG. 3B.

In steps S31 to S33, Mtotal', Mtotal", and Mtotal'" are calculated in the above-described manner. In step S34, one of Mtotal', Mtotal", and Mtotal'", which has the minimum absolute value of the difference from the target code amount Th, is determined.

If Mtotal' has the minimum absolute value of the difference from the target code amount Th, only the variable i is incremented by "1" without changing the variable j (step S35). If Mtotal" has the minimum absolute value of the difference from the target code amount Th, only the variable j is incremented by "1" without changing the variable i (step S36). If Mtotal'" has the minimum absolute value of the difference from the target code amount Th, both the variables i and j are incremented by "1".

As described above, according to the second embodiment, it is possible to more accurately decide the encoding parameters i and j than in the first embodiment. Consequently, it is also possible to decrease the number of times of scanning, as compared to the first embodiment.

When the second re-scanning/re-encoding starts, the encoding history recording unit 121 stores information for the third re-scanning/re-encoding.

Third Embodiment

In the second embodiment, the predicted encoded data amounts Mtotal', Mtotal", and Mtotal'" of one page are obtained, and re-encoding is executed by using encoding parameters corresponding to the data amount closest to the target code amount. In the third embodiment, an example will be described in which the encoding parameters are decided depending on the encoding target image. The apparatus arrangement is the same as in the first embodiment.

The structure of data stored in an encoding history recording unit 121 is the same as in the second embodiment. The predicted code amounts and predicted selection signals of lossy encoded data amount Ly are obtained in correspondence with all encoding parameters i and j.

Figure 25:
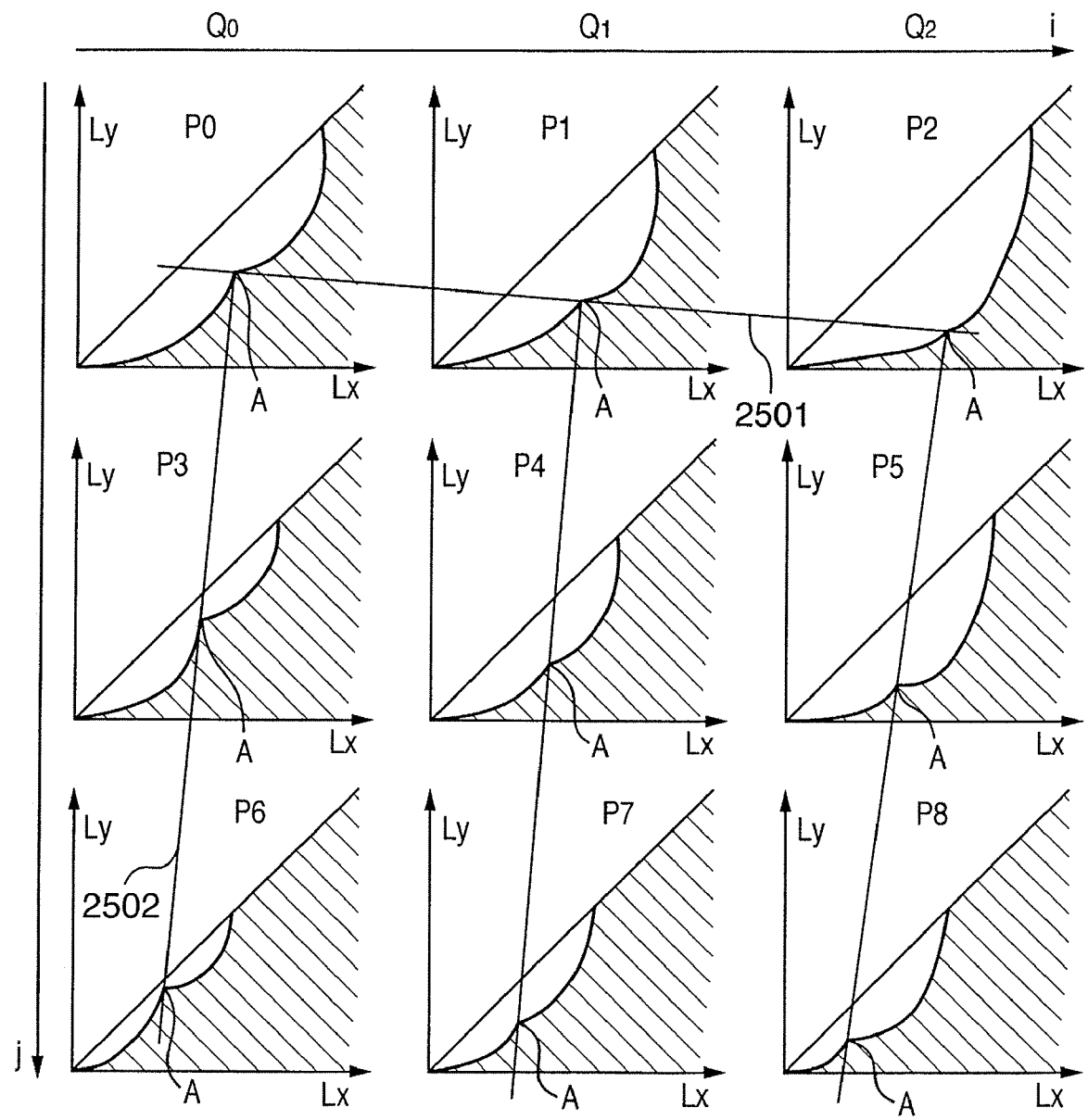
FIG. 25 is a view showing the priority in determining an encoding parameter according to the third embodiment.
Figure 26:
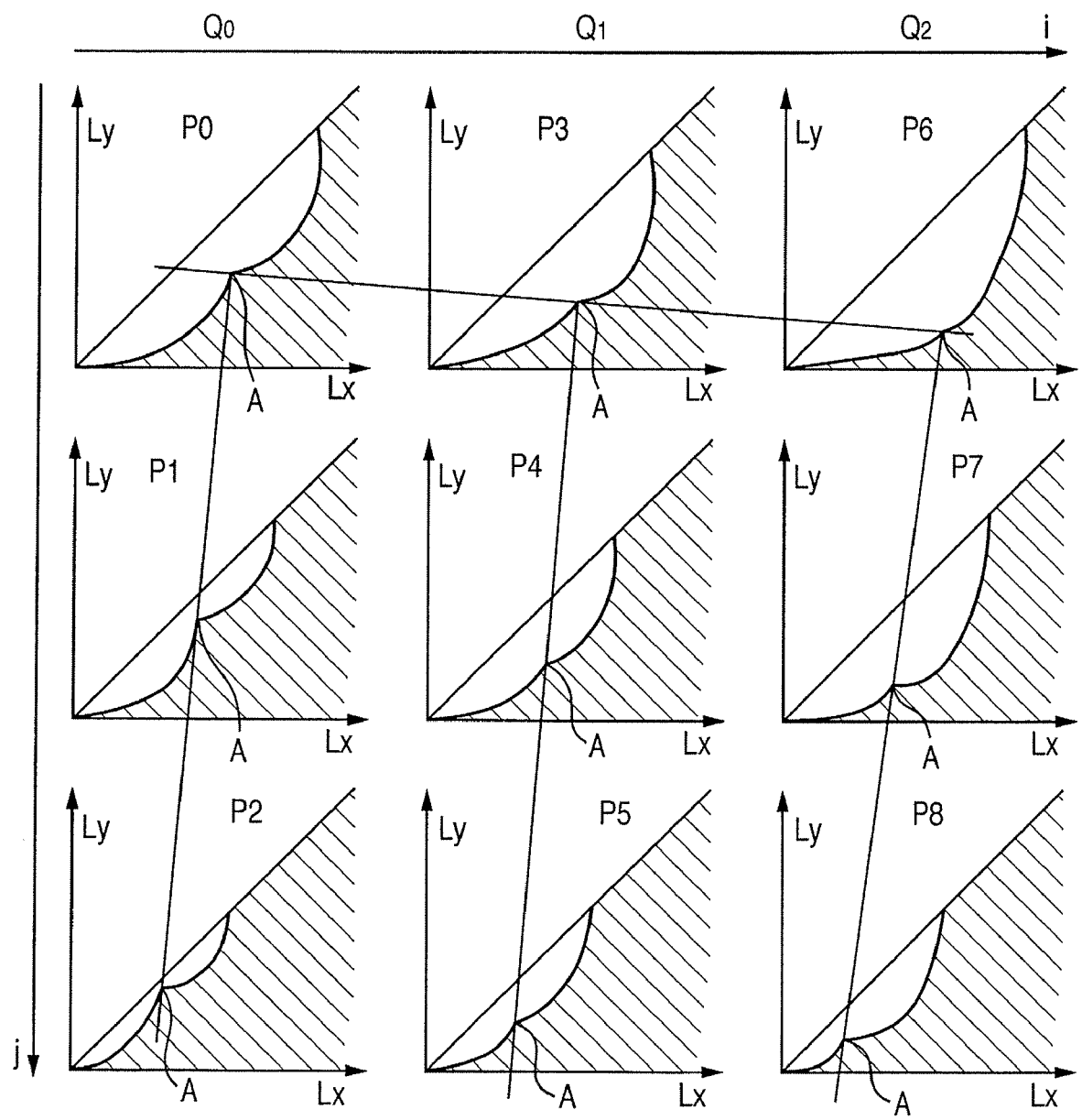
FIG. 26 is a view showing the priority in determining an encoding parameter according to the third embodiment.
Figure 27:
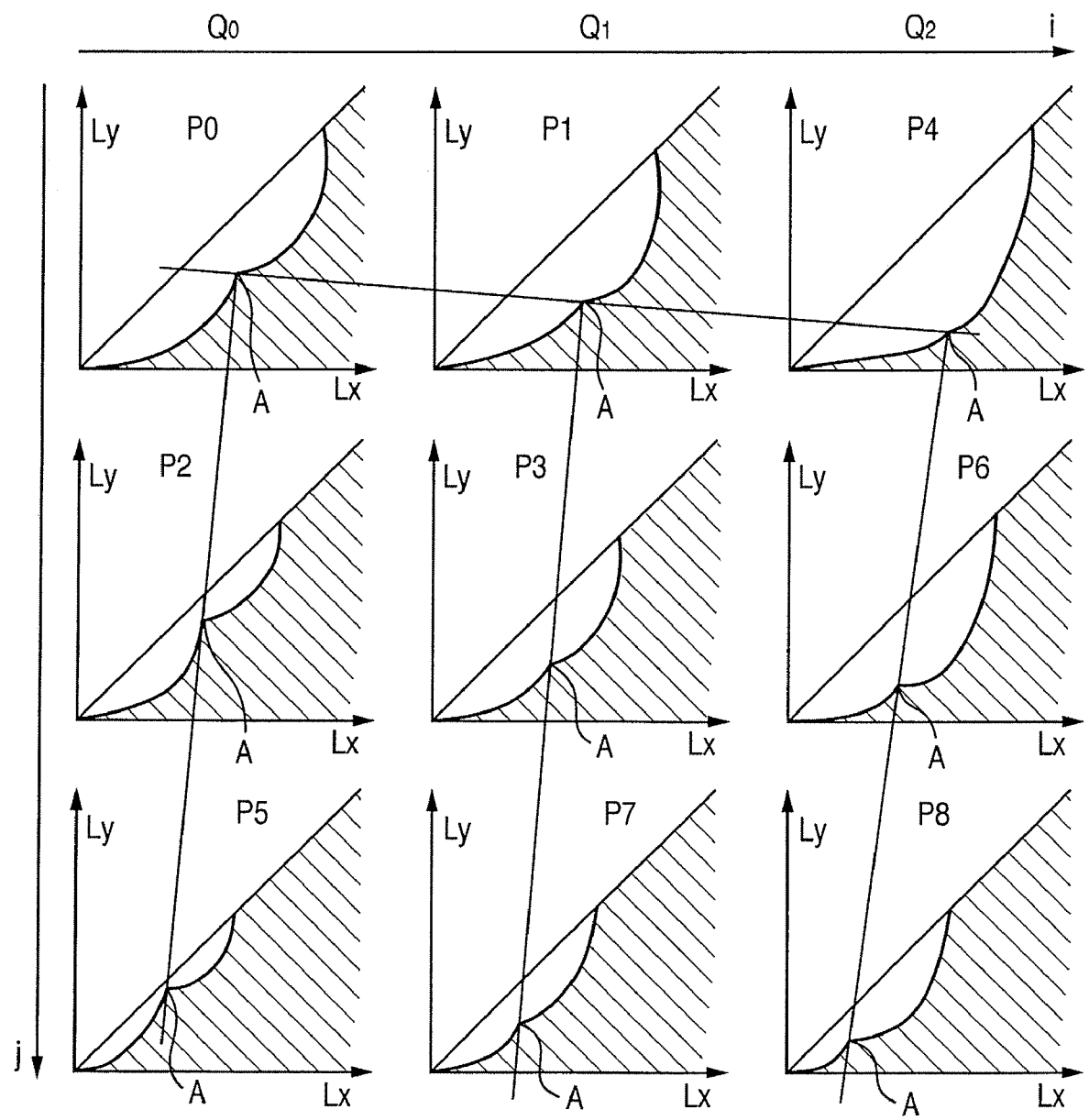
FIG. 27 is a view showing the priority in determining an encoding parameter according to the third embodiment.

FIGS. 25 to 27 show the boundary lines of boundary conditions $f_{i,j}()$ which are specified by the variables i (also serving as a variable to decide a quantization matrix $Q_i$) and j stored in an LUT 120. FIGS. 25 to 27 illustrate an example of nine boundary lines which are two-dimensionally arrayed. However, the number of boundary lines is not limited to this. Fundamentally, the vertical coordinate position of a point A (FIG. 18) shifts downward as the variable i increases (line 2502 in FIG. 25) and shifts leftward as the variable j increases (line 2502 in FIG. 25). FIGS. 25 to 27 are the same except the order indicated by P0 to P8. The priority order information in FIGS. 25 to 27 is stored in an encoding sequence control unit 110.

As described in the second embodiment, when the data amount has exceeded a target code amount Th during encoding using encoding parameters i=a, and j=b, the lossless encoded data amount is given by MLS, and the lossy encoded data amount is given by MJP.

MLS and MJP of the third embodiment and FIGS. 25 to 27 will be described below. In the following explanation, a coefficient α is a positive value smaller than 1. For example, 60 =0.6. For the descriptive convenience, assume that the current encoding parameters are i=0, and j=0.

[When MLS<MJP×α]

In this case, the lossy encoded data amount MJP is much larger than the lossless encoded data amount MLS. That is, in the encoding target image data, the occupied area of a natural image is large, whereas the occupied area of a character/line image is small. In re-scanning/re-encoding, it is preferable to preferentially increase the variable i. Hence, the encoding parameters i and j to be used for re-scanning/re-encoding are decided in accordance with the priority order P0, P1, P2, ... in FIG. 25.

[When MLS×α≧MJP]

In this case, the lossless encoded data amount MLS is much larger than the lossy encoded data amount MJP. That is, in the encoding target image data, the occupied area of a character/line image is large, whereas the occupied area of a natural image is small. This can be regarded as a document with a normal text description. In re-scanning/re-encoding, it is preferable to preferentially increase the variable j. Hence, the encoding parameters i and j to be used for re-scanning/re-encoding are decided in accordance with the priority order P0, P1, P2, ... in FIG. 26.

[When MLS×α<MJP≧MLS/α]

In this case, the lossless encoded data amount MLS almost equals the lossy encoded data amount MJP. That is, the encoding target image data contains both a character/line image and a natural image whose occupation ratios are almost the same. In re-scanning/re-encoding, it is preferable to increase both the variables i and j at almost the same weighting. Hence, the encoding parameters i and j to be used for re-scanning/re-encoding are decided in accordance with the priority order P0, P1, P2, ... in FIG. 27.

A process will be described here, which is executed when the encoded data amount (the value of the first counter 111) has exceeded the target code amount Th during encoding using the encoding parameters i=0 and j=0, and "MLS<MJP×α" holds between MLS and MJP.

In this case, the predicted code amount of one page is obtained in accordance with the priority order shown in FIG. 25. The predicted code amount can be obtained by equation (2) in the second embodiment.

In the third embodiment, the encoding parameters i and j are represented by priority orders Pz (z=0, 1, 2. . . ). The lossless encoded data amount and lossy encoded data amount decided by the priority order Pz when the data amount has exceeded the target code amount Th are defined as MLSz and MJPz, respectively. In this case, a predicted total encoded data amount Mpz when one page is encoded by using encoding parameters represented by the priority order Pz is given by $$Mpz = (MLSz + MJPz) \times N\text{max}/k \quad (3)$$

As described above, the predicted encoded data amount Mpz is nothing but a predicted value and does not always match the encoded data amount obtained by actual scanning/encoding using the encoding parameters. Hence, an allowable value β (positive value) is added to modify equation (3) to $$Mpz \geq (MLSz + MJPz) \times N\text{max}/k + \beta \quad (4)$$

In the third embodiment, 1, 2, . . . are sequentially given to z of the priority orders shown in FIG. 25. The variable z that satisfies equation (3) first is obtained. Re-scanning/re-encoding is executed by using encoding parameters represented by the variable z. For example, when z=4, re-scanning/re-encoding is executed by using the encoding parameters i=1, and j=1. If the encoded data amount has exceeded the target code amount Th again, the encoding parameters are decided from the priority order P5. Note that when the encoded data amount has exceeded the target code amount Th for the first time, and the priority orders in FIGS. 25 to 27 are decided, the priority orders are not changed. That is, during encoding of an image of one page, the priority orders in FIGS. 25 to 27 are not selected every time.

The above-described process of the encoding sequence control unit 110 according to the third embodiment will be summarized below.

In step S14 in FIG. 3A, the predicted lossy encoded data amounts and the predicted selection signals are stored in correspondence with all possible combinations of the encoding parameters i and j. In the third embodiment, only the process in step S16 in FIG. 3A changes.

The process in step S16 of the third embodiment will be described with reference to the flowchart in FIG. 31.

In step S41, it is determined whether the data amount has exceeded the target code amount Th for the first time. This determination can be done by determining whether both the encoding parameters i and j are 0. Alternatively, a special flag may be used for determination.

If it is determined in step S41 that the data amount "has exceeded the target code amount Th for the first time", the process advances to step S42 to determine the relationship between the lossless encoded data amount MLS and the lossy encoded data amount MJP of the current encoded data and decide the priority order.

When MLS<MJP×α, the priority order is decided to preferentially decrease the code amount of lossy encoding. In this embodiment, the priority order in FIG. 25 is decided.

When MLS×α≧MJP, the priority order is decided to preferentially decrease the code amount of lossless encoding. In this embodiment, the priority order in FIG. 26 is decided.

When MLS×α<MJP≧MLS/α, the priority order is decided to decrease both the code amount of lossless encoding and that of lossy encoding. In this embodiment, the priority order in FIG. 27 is decided.

In step S43, the initial value "0" is substituted into the variable z representing the number of priority order.

The process advances to step S44 to increment the variable z by "1". Hence, when the process in steps S42 and S43 is executed, z=1 in step S44. If the data amount has exceeded the target code amount Th for the second time, the process in steps S42 and S43 is not executed. Hence, the value z in the previous scanning/encoding is further incremented by "1".

In step S45, a predicted encoded data amount MPz of one page represented by the variable z is calculated by referring to the data in the encoding history recording unit 121. In step S46, it is determined whether the condition [MPz≧Th+β] is satisfied. If NO in step S46, the process returns to step S44 to update the variable z and repeat the same process.

If YES in step S46, the process advances to step S47 to decide the variables i and j represented by the variable z at that point of time as the encoding parameters of re-scanning/re-encoding, and the process is ended.

The above-described third embodiment will be summarized below.

1. When the encoded data amount (the value of the first counter 111) has exceeded the target code amount Th during encoding using the initial encoding parameters i=0 and j=0, the lossless encoded data amount MLS is compared with the lossy encoded data amount MJP. This allows to determine the property of the input image.
2. The priority order to obtain the encoding parameters i and j is decided on the basis of the determined property of the input image.
3. The predicted encoded data amount approximate to the target code amount Th is obtained in accordance with the decided priority order. When re-scanning/re-encoding is actually started by using the encoding parameters i and j, encoded data close to the target code amount Th can efficiently be obtained.

In the third embodiment, the three patterns are shown in FIGS. 25 to 27 as the priority order patterns to decide the encoding parameters. However, the two patterns in FIGS. 25 and 26 may be used by determining "MLS<MJP". Alternatively, four or more patterns may be used by finely defining the conditions.

As described above, according to the third embodiment, the parameters to reduce the code amount to the target code amount Th or less can efficiently be decided on the basis of the property of an encoding target image, in addition the functions and effects of the first and second embodiments.

A condition "i≧a, and j≧b" may be added to obtain the encoding parameters i and j next to i=a and j=b for the next scanning/encoding.

Fourth Embodiment

The fourth embodiment will be described. The fourth embodiment further advances the third embodiment. Details will be described below.

In the third embodiment, the coefficient $\beta$ of inequality (4)

$$Mpz \leq (MLSz+MJPz) \times Nmax/k + \beta$$

is a positive value.

As can easily be seen from inequality (4), the larger the coefficient $\beta$ is, the higher the probability to satisfy the condition is. Assume that the priority order shown in FIG. 25 is decided. If the value $\beta$ is sufficiently large, the condition is immediately satisfied by the priority order P1, and re-scanning/re-encoding starts by using the encoding parameters i=1 and j=0.

In actual image data encoding, if the code amount decreases to a target code amount Th or less when the encoding parameters corresponding to a priority order P4 are used, scanning/encoding is executed five times in total on the basis of P0, P1, P2, P3, and P4. That is, when the coefficient $\beta$ is set to a large value, it is possible to generate encoded data to obtain the maximum image quality with a code amount equal to or smaller than the target code amount Th, although the number of times of scanning/encoding increases at a high probability.

On the other hand, when the coefficient $\beta$ is set to a small value and can take even, e.g., a negative value, the condition is satisfied at P1 or P2 close to the priority order P0 at a low probability. The condition is satisfied only when a priority order far from the priority order P0 is set. That is, when the coefficient $\beta$ is set to a small value, the number of times of scanning/encoding can be decreased, although the quality of the decoded image may be low more than necessity.

Figure 33:
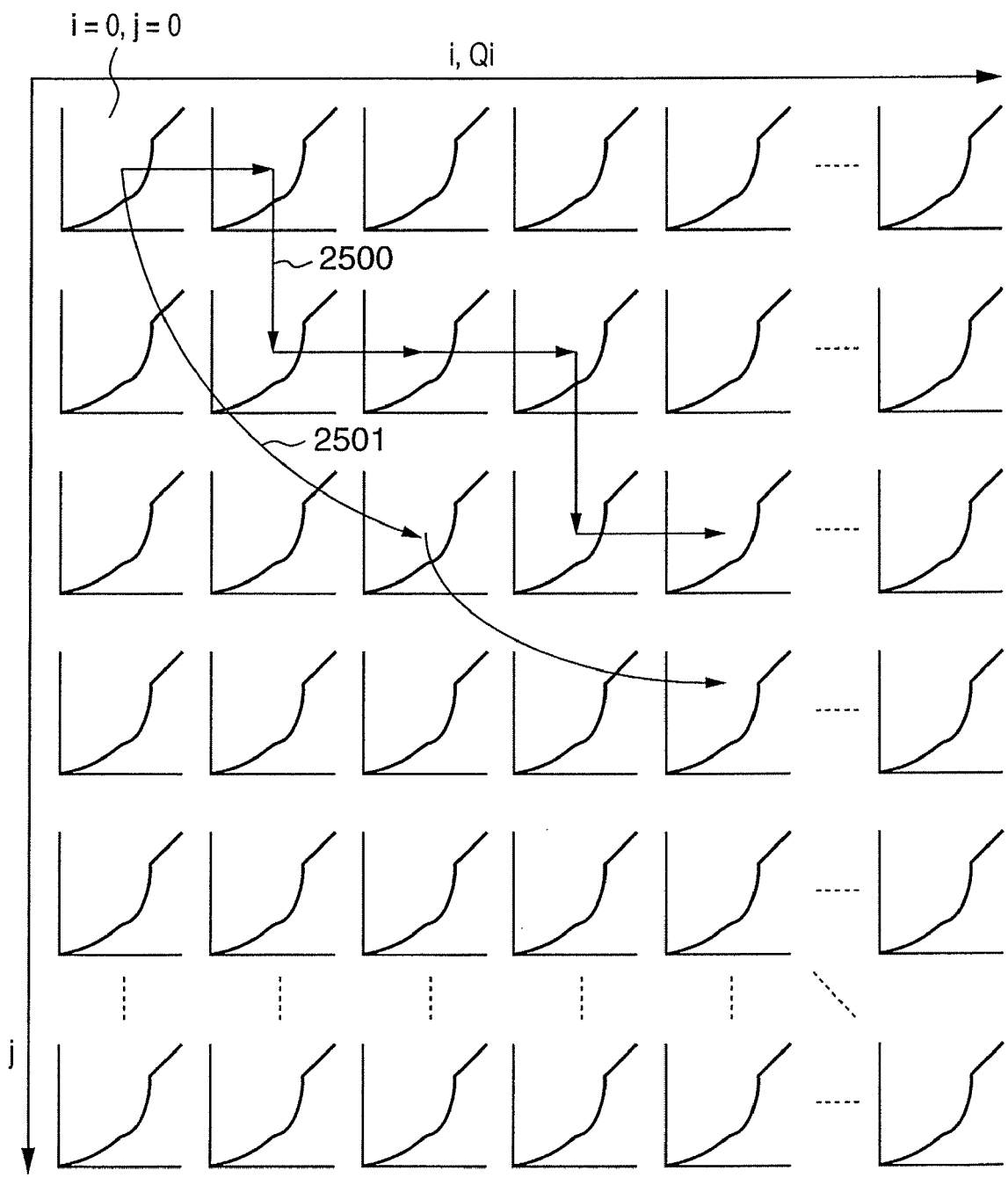
FIG. 33 is a view showing an example in a change of encoding parameter update transition depending on the tolerance β according to the fourth embodiment.

An example of nine boundary lines (boundary conditions) has been described above. However, the above-described case can be understood more easily by increasing the number of boundary lines. FIG. 33 shows an example. An arrow 2500 indicates the progress of scanning/encoding when the coefficient $\beta$ is large. If the coefficient $\beta$ is sufficiently large, scanning/encoding is executed seven times. However, the encoding parameters i and j closest to the target code amount Th can be decided at the target code amount Th or less. An arrow 2501 indicates that scanning/encoding is executed three times, i.e., a small number of repetitive times, although the image data is compressed more than necessity, as compared to the arrow 2500.

As is apparent from this examination, the value of the coefficient $\beta$ functions as a parameter that affects the number of times of scanning/encoding or the image quality of the encoded data of the final target code amount.

In the fourth embodiment, the coefficient $\beta$ is changed so that it can take both positive and negative values. The user can set the value through an operation unit 2 (FIG. 22), as needed. From the user's viewpoint, the value is designated as an encoding rate (or image quality) setting parameter.

For the descriptive convenience, the fourth embodiment assumes that the user can set an encoding rate coefficient v in three steps: −1, 0 (default), and +1. A value obtained by multiplying a coefficient $\gamma$ depending on the size (document size) of input image data by the set encoding rate coefficient v is defined as the coefficient $\beta$. That is, $\beta = \gamma \times v$.

The number of settable steps is not limited to three. It may be two or four or more. The operation unit 2 operated by the user displays, e.g., a slider bar to select one of the three steps. However, any other selection mechanism may be employed.

Figure 31:
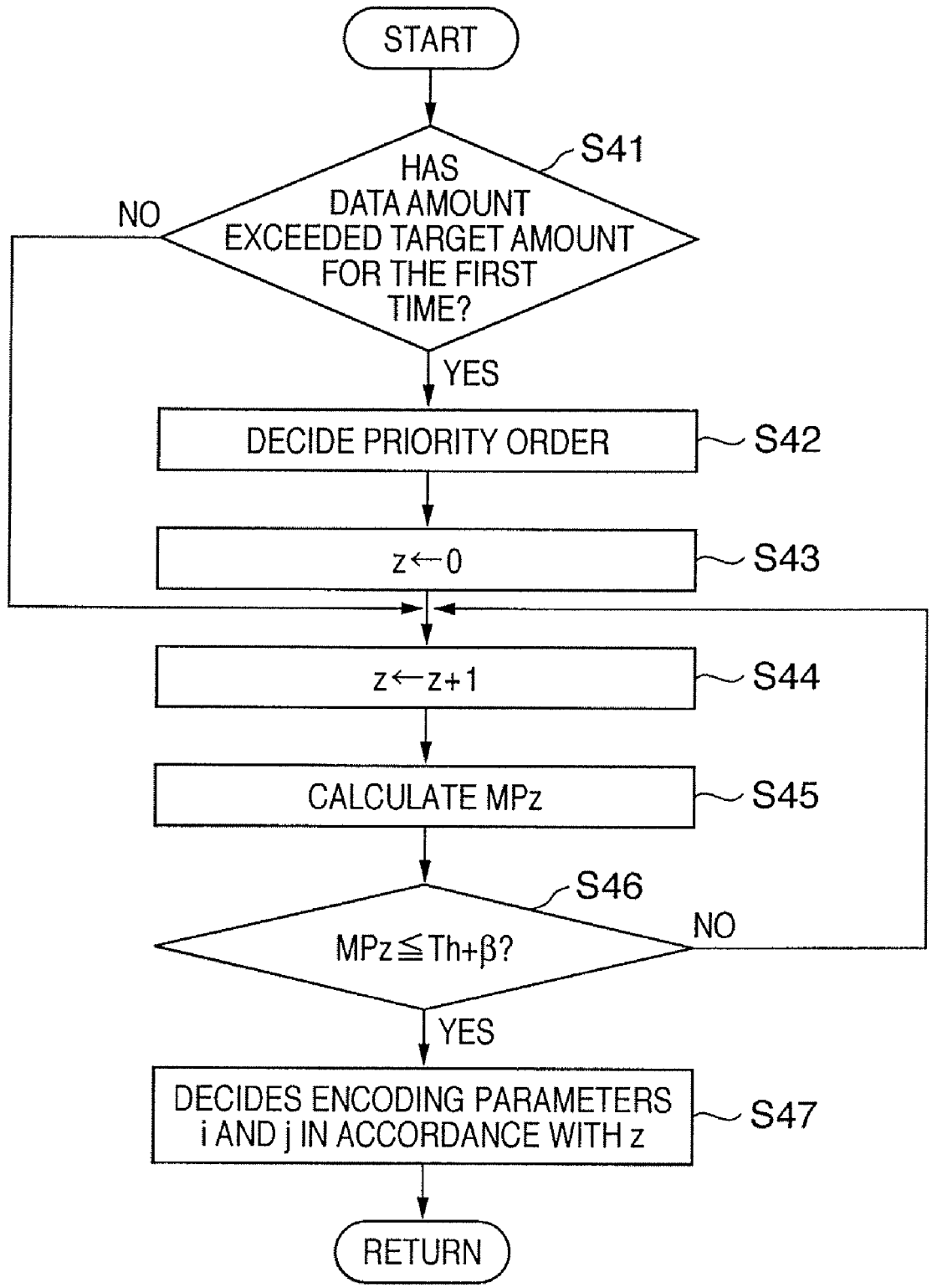
FIG. 31 is a flowchart showing an encoding parameter change process procedure according to the third embodiment.

In the fourth embodiment, basically, the coefficient $\beta$ in step S46 in FIG. 31 of the third embodiment is decided. The actual encoding process is apparent from the above description. The process procedure of a control unit 1 in response to an operation instruction from the operation unit 2 will be described here with reference to the flowchart in FIG. 33.

In step S51, input from the operation unit 2 is detected. In step S52, it is determined whether the input is an instruction related to the encoding rate. In step S54, it is determined whether the input is a copy start instruction. If it is determined that the input is the encoding rate instruction, the process advances to step S53 to decide the coefficient v in accordance with the instruction (the default is v=0). If it is determined that the input is an instruction other than the encoding rate instruction and copy start instruction, the process advances to step S55 to execute an appropriate process.

If it is determined that a copy start instruction is input, the process advances to step S56 to convey one of document sheets set on the ADF of a document reading unit 3 onto the document reading surface (platen glass). At this time, the coefficient $\gamma$ is decided by detecting the document size by using a known technique (step S57).

The process advances to step S58 to multiply the coefficient $\gamma$ by the coefficient v to calculate the coefficient $\beta$. The coefficient $\beta$ is set in an encoding sequence control unit 110. At this time, the target code amount Th is also set in the encoding sequence control unit 110.

When the settings are done, the process advances to step S59 to cause the document reading unit 3 to start scanning the document and the encoding sequence control unit 110 to start encoding. In step S60, the process waits until the encoded data of one page is stored.

Figure 32:
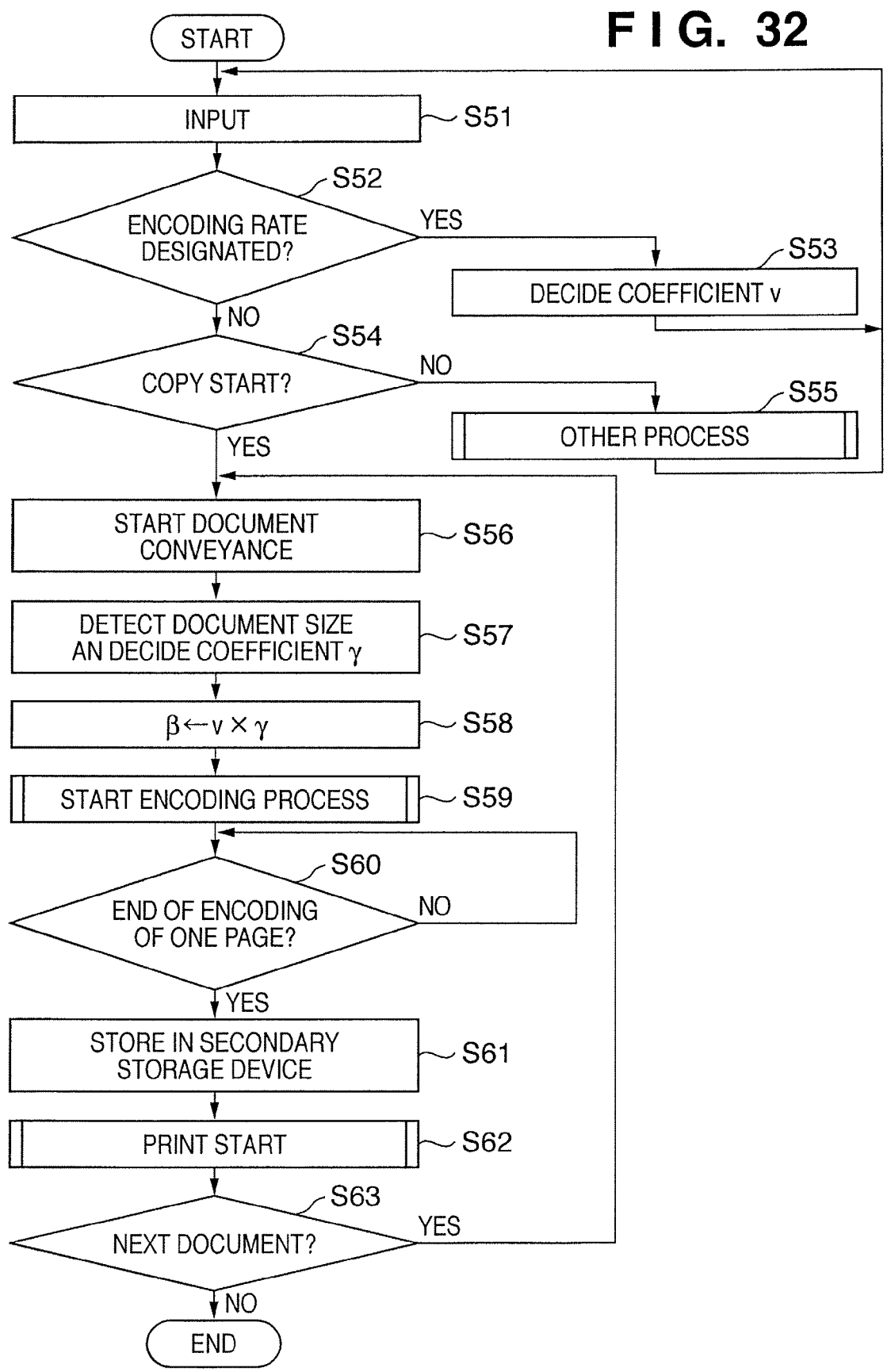
FIG. 32 is a flowchart showing a process procedure of determining a tolerance β of a predicted encoded data amount according to the fourth embodiment.

When encoding of one page is ended, the process advances to step S61 to cause a secondary storage device 7 to store the encoded data of one page stored in a first memory 105. In step S62, decoding/printing starts. The decoding/printing process is independent of the process illustrated in FIG. 32. The process advances to step S63 to determine on the basis of a signal from a sensor (not shown) whether an uncopied document remains on the document reading unit 3. If YES in step S63, the process from step S56 is repeated.

As described above, according to the fourth embodiment, the user can set the encoding rate or output image quality, in addition the functions and effects of the third embodiment.

The flowchart of the fourth embodiment exemplifies a copy process. Instead, this embodiment may be applied to a process of receiving print data from an external device and printing.

Fifth Embodiment

In the first to fourth embodiments, when the encoded data amount obtained during encoding exceeds the target code amount Th, image data is re-input (re-scanned).

In the fifth embodiment, an example will be described in which encoded data in a target code amount Th or less can be obtained without re-input. For the descriptive convenience, the encoding parameter decision principle of the fifth embodiment is the same as in the first embodiment. However, the encoding parameters may be decided in accordance with the second to fourth embodiments, as is apparent from the following explanation.

The apparatus arrangement is the same as in FIG. 22. An encoding processing unit 6 will mainly be described below.

Figure 4:
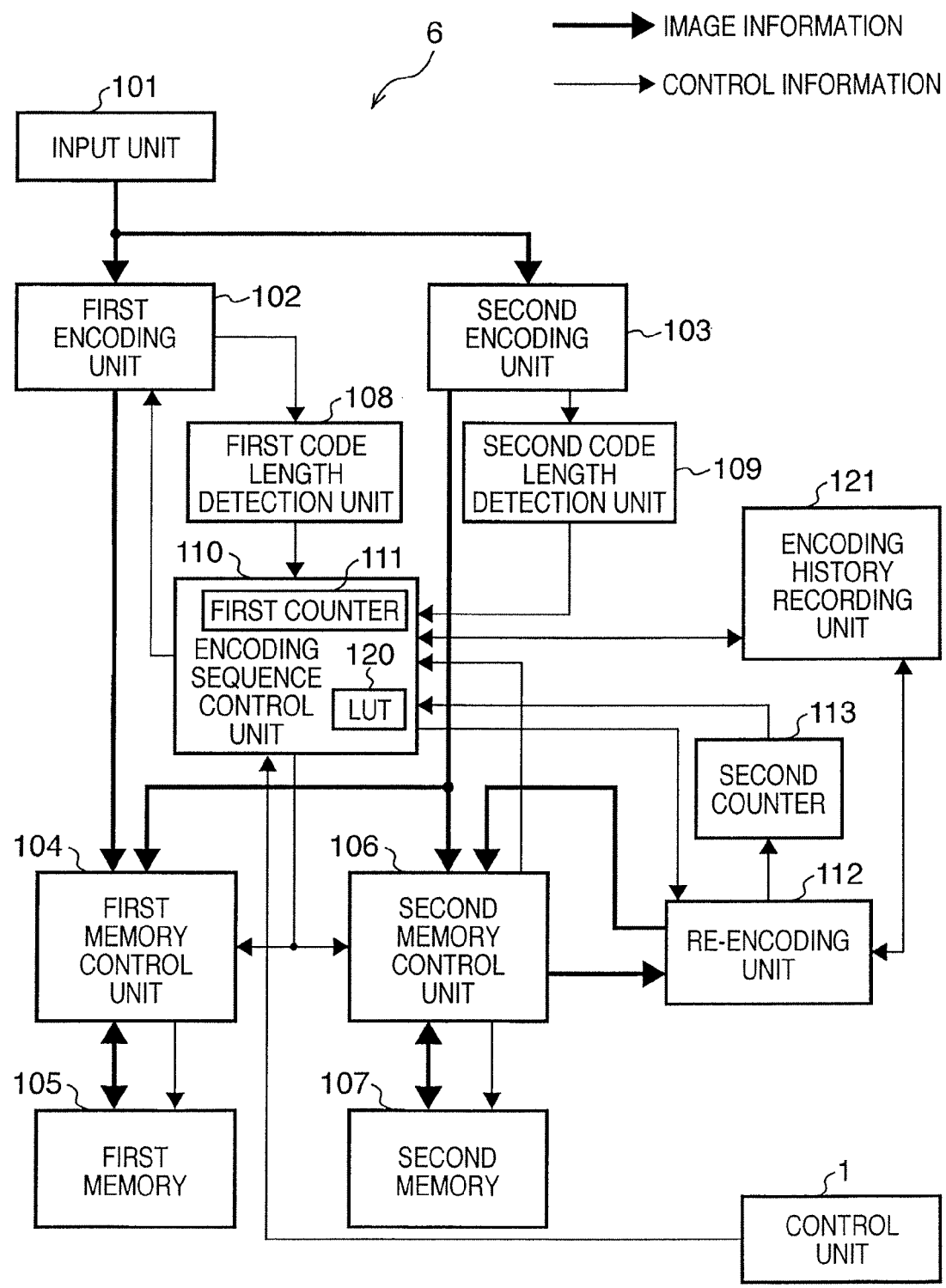
FIG. 4 is a block diagram of an encoding processing unit according to the fifth embodiment.

FIG. 4 is a block diagram of the encoding processing unit 6 according to the fifth embodiment. FIG. 4 is different from FIG. 1 in that a second memory control unit 106, second memory 107, re-encoding unit 112, and second counter 113 are added. The remaining parts are the same as in FIG. 1 and are denoted by the same reference numerals.

A first memory 105 stores encoded data selected on the basis of the same criteria as in the above-described first embodiment, and a description thereof will be omitted. Characteristic points of the fifth embodiment will be explained below.

The second memory control unit 106 stores, in the second memory 107, encoded data (lossless encoded data) generated by a second encoding unit 103 and reads out the encoded data from the second memory 107 under the control of an encoding sequence control unit 110. The second memory 107 is used as a work area in encoding image data of one page.

The re-encoding unit 112 re-encodes, of the encoded data amount (lossless encoded data) stored in the second memory 107, encoded data in a range designated by the encoding sequence control unit 110. The re-encoding unit 112 has, e.g., the arrangement shown in FIG. 13.

The second memory 107 stores lossless encoded data encoded by the second encoding unit (JPEG-LS encoding unit) 103. First, a JPEG-LS decoding unit 112a decodes (restores) the data to the pixel blocks of the original image. A JPEG encoding unit 112b JPEG-encodes (lossy-encodes) the reconstructed pixel blocks in accordance with a quantization matrix table $Q_i$ set by the encoding sequence control unit 110. At this time, an identification bit indicating that the data is lossless encoded data is added to the top of the encoded data.

A code length detection unit 112c detects the code length of the JPEG-encoded data. A code length detection unit 112d detects the code length of the lossless encoded data read out from the second memory. An LUT 112e stores the same information as in an LUT 120 in the encoding sequence control unit 110. The LUT 112e receives encoding parameters i and j from the encoding sequence control unit 110 and the two code length data as addresses and outputs a 1-bit signal as a selection signal.

A selector 112f selects one of lossless encoded data and lossy encoded data in accordance with the selection signal from the LUT 112e and outputs the selected data to the second memory control unit 106, thereby storing the selected encoded data in the second memory 107. The other selector 112g selects the code length of the selected encoded data and causes the second counter 113 to cumulatively add the code length.

The above-described process is repeatedly executed for the range designated by the encoding sequence control unit 110. Every time the re-encoding unit 112 starts re-encoding, the second counter 113 is reset and cumulatively counts the encoded data amount generated by the re-encoding unit 112. When re-encoding in the set range is ended, the value (the encoded data amount generated by re-encoding) held by the second counter is output to the encoding sequence control unit 110.

The arrangement in FIG. 4 has been described above. The overall process will be described next in more detail.

In starting encoding image data of one page, a control unit 1 sets, in the encoding sequence control unit 110, the target code amount Th corresponding to the input image size. The encoding sequence control unit 110 sets an initial quantization matrix table $Q_0$ (encoding parameters of the maximum image quality) in a first encoding unit 102 and clears a first counter 111 to 0. The encoding sequence control unit 110 also sets both the encoding parameters i and j to 0. The encoding sequence control unit 110 causes the first encoding unit 102 and second encoding unit 103 to start the encoding process. Input of image data of one page and the encoding process will be described below.

A first code length detection unit 108 and second code length detection unit 109 output encoded data corresponding to the same pixel block. The first code length detection unit 108 and second code length detection unit 109 obtain the code lengths of the data. The encoding sequence control unit 110 selects one of the encoded data and causes the first counter 111 to add the code length information of the selected encoded data, as in the first embodiment, i.e., in accordance with the arrangement in FIG. 2. At this time, the encoding sequence control unit 110 outputs a control signal representing the selected data to a first memory control unit 104. The encoding sequence control unit 110 also stores lossless and lossy data code lengths Lx and Ly and a selection signal in an encoding history recording unit 121, as in the first embodiment (FIG. 28).

The first memory control unit 104 receives the control signal from the encoding sequence control unit 110 and stores, in the first memory 105, one of the encoded data from the first encoding unit 102 and second encoding unit 103.

More specifically, when "$Ly \geq f_{i,j}(Lx)$", the first memory control unit 104 selects the encoded data from the second encoding unit 103 and stores it in the first memory 105. If this condition is not satisfied, the first memory control unit 104 selects the encoded data from the first encoding unit 102 and stores it in the first memory 105.

As a consequence, the first memory 105 stores encoded data amount with a short code length on the basis of the boundary defined by the boundary condition $f_{i,j}(Lx)$. That is, the first memory 105 stores lossless encoded data and lossy encoded data which are mixed. On the other hand, the second memory 107 stores only lossless encoded data.

Note that the first counter 111 stores information of the total code amount of the encoded data amount stored in the first memory 105.

The process to this point is the same as in the first embodiment except that the second memory 107 stores lossless encoded data.

The encoding sequence control unit 110 monitors the value of the first counter 111, i.e., the total amount of the encoded data amount stored in the first memory 105 during progress of encoding and determines whether the code amount has exceeded (or reached) the target code amount Th. Upon determining that the value (total code amount) stored in the first counter 111 has exceeded the target code amount Th, the encoding sequence control unit 110 executes the following process.

1. The encoding sequence control unit 110 outputs a control signal to the memory control unit 104 so as to discard data stored in the first memory 105. The first memory control unit 104 discards the stored encoded data by clearing the memory address counter or the encoded data management table on the basis of the control signal.
2. The encoding sequence control unit 110 clears the first counter 111 to 0 (image input from the input unit 101 continues).
3. The encoding sequence control unit 110 updates the encoding parameters i and j in accordance with first embodiment. When the variable i is updated, the encoding sequence control unit 110 sets the quantization matrix table $Q_i$ represented by the updated variable i in the first encoding unit 102. See the description in the first embodiment for the update process of the encoding parameters i and j.
4. The encoding sequence control unit 110 clears the second counter 113 to 0 and sets, in the re-encoding unit 112, the changed encoding parameters i and j and the changed quantization matrix table $Q_i$. The encoding sequence control unit 110 causes the re-encoding unit 112 to start re-encoding the encoded data stored in the second memory 107. The encoded data (containing both lossless and lossy encoded data) obtained by re-encoding is temporarily restored in the second memory 107. The second memory 107 also stores the encoded data from the second encoding unit 103 in distinction from the encoded data obtained by re-encoding.
5. When re-encoding finishes, the encoding sequence control unit 110 transfers the encoded data "re-"stored in the second memory 107 to the first memory 105 and also deletes the data from the second memory 107 (without deleting the lossless encoded data from the encoding unit 103). The encoding sequence control unit 110 reads out the value of the second counter 113 and adds it to the first counter 111. As a result, the first counter 111 indicates the total amount of the encoded data stored in the first memory again.

The second memory control unit 106 detects whether re-encoding is ended. More specifically, if no data to be read out for re-encoding remains, the second memory control unit 106 notifies the encoding sequence control unit 110 of the end of re-encoding. Actually, when not only the reading process of the second memory control unit 106 but also the process of the re-encoding unit 112 finishes, encoding is ended.

Upon determining that the total encoded data amount has exceeded the target code amount Th before the end of input of the image of one page and encoding, the encoding sequence control unit 110 executes the processes 1 to 5. Finally, the first memory 105 stores encoded data in the target code amount Th or less.

Figure 11:
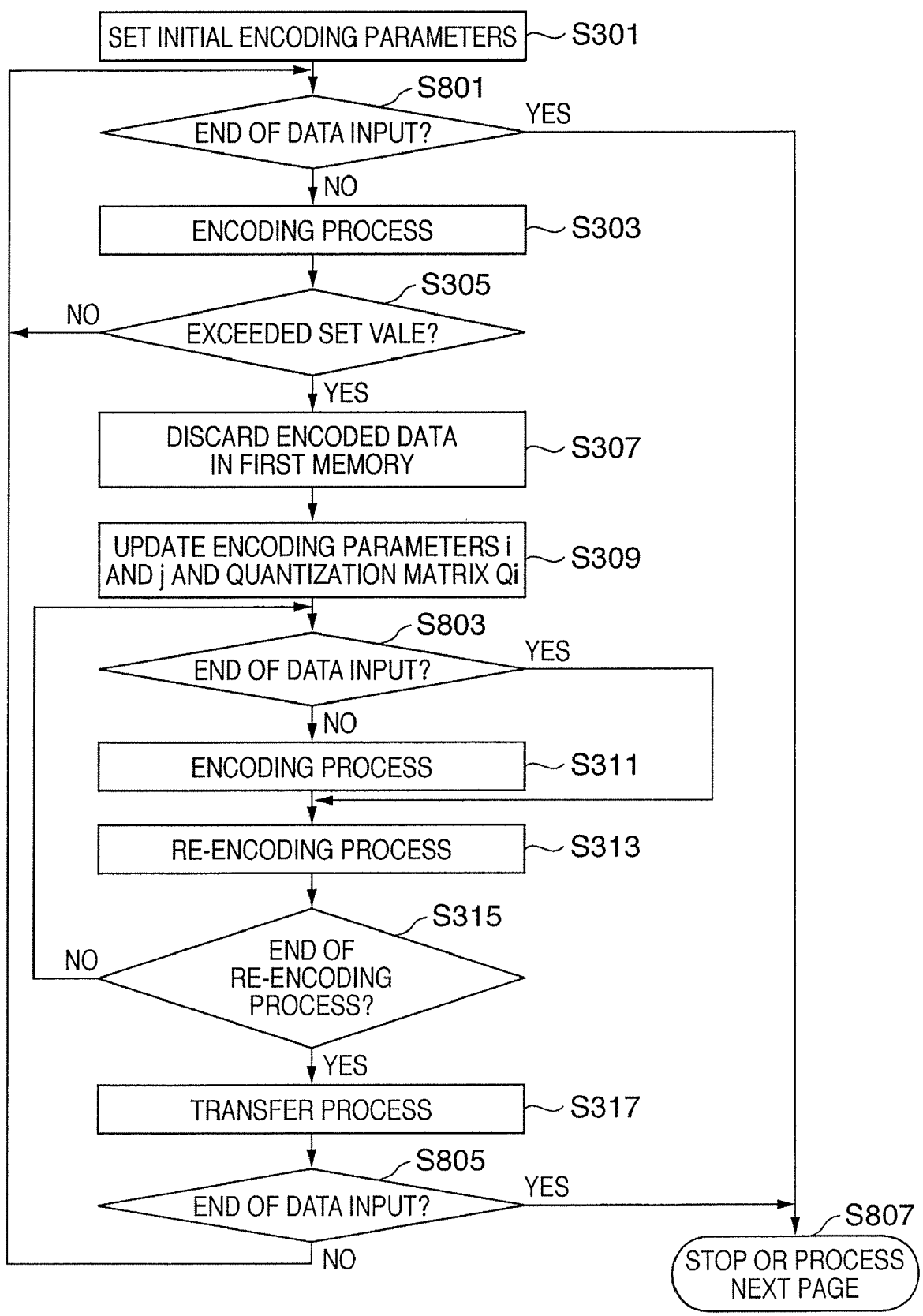
FIG. 11 is a flowchart showing details of the process according to the fifth embodiment.

FIG. 11 is a flowchart showing the process procedure of the encoding sequence control unit 110 in the arrangement in FIG. 4. For the sake of simplicity, the process procedure will be described first with reference to the simplified flowchart of FIG. 5.

Figure 5:
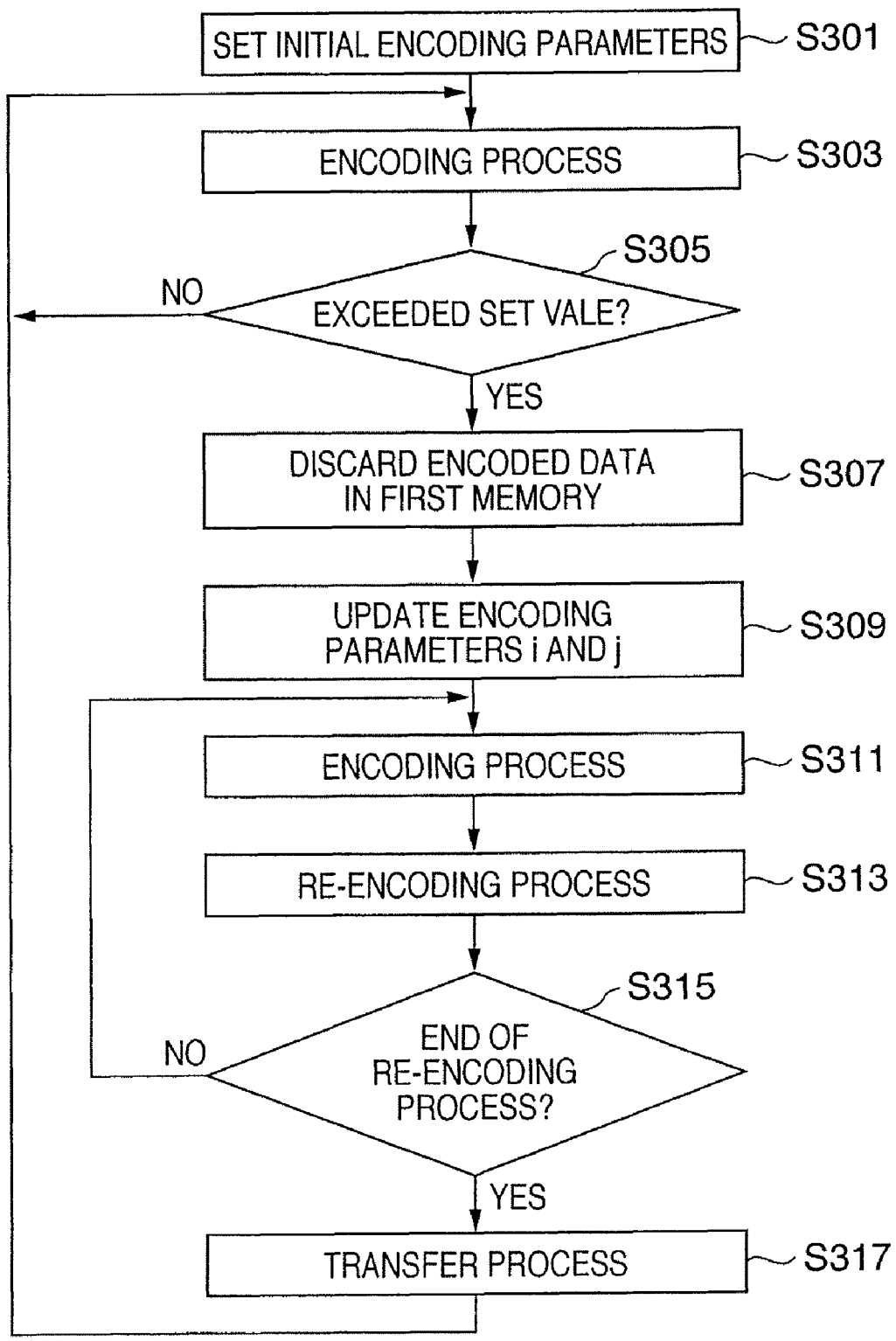
FIG. 5 is a simplified flowchart of a process according to the fifth embodiment.

The flowchart in FIG. 5 is roughly divided into three process phases.
(1) Encoding phase
(2) Encoding/re-encoding phase
(3) Transfer phase FIGS. 6 to 10 show the manner image data and encoded data are processed and stored in the memories in these process phases to visually help understanding.

Figure 6:
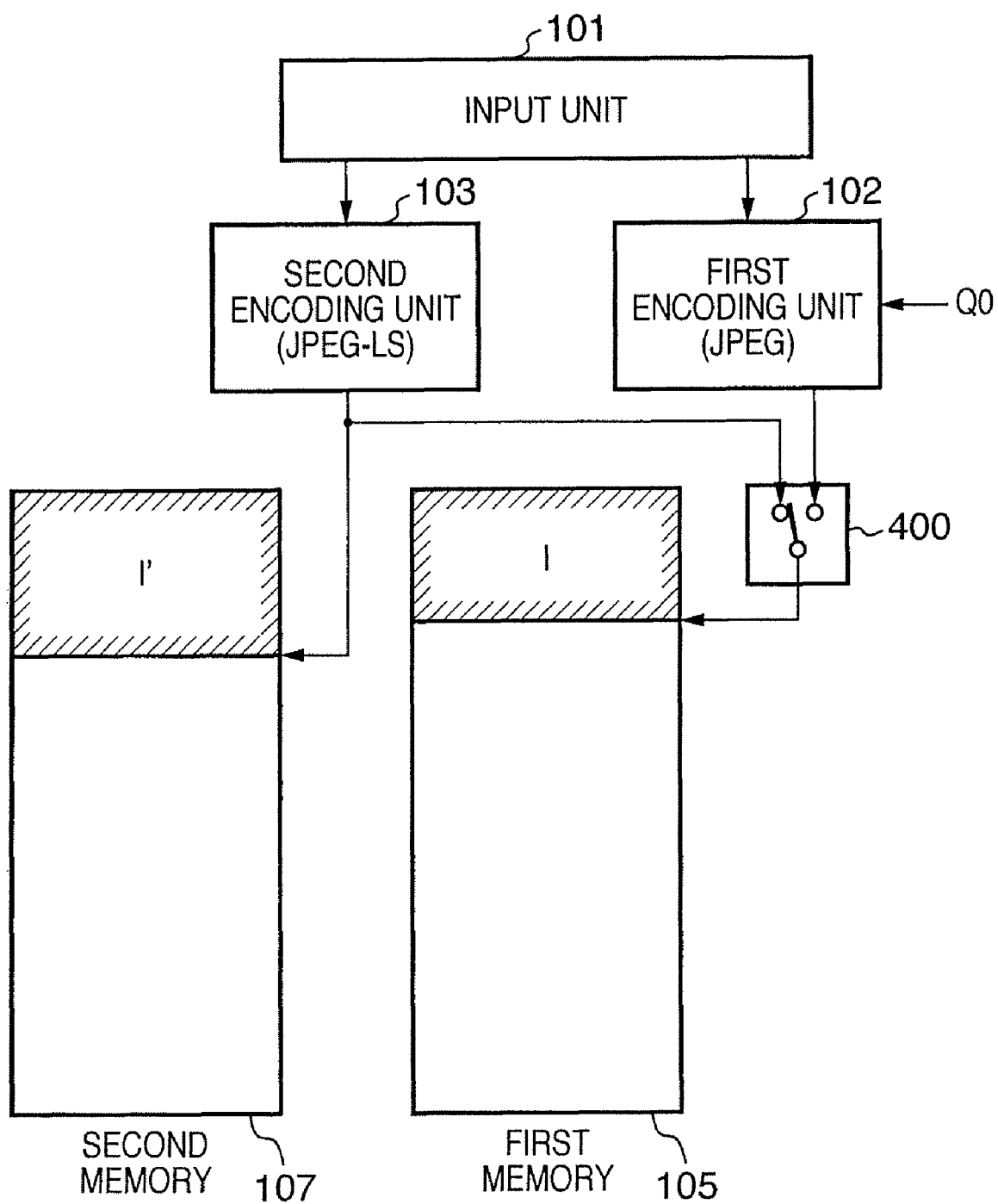
FIG. 6 is a view showing a data flow and memory contents in an encoding phase in the initial state according to the fifth embodiment.

FIG. 6 shows the initial state of the encoding phase corresponding to steps S303 and S305 of the flowchart in FIG. 5. A switch 400 in FIG. 6 is implemented by the functions of the encoding sequence control unit 110 and first memory control unit 104. As a switching signal, the signal from the LUT 120 in FIG. 2 is used.

The first memory 105 stores one of the encoded data from the two encoding units. A data amount I stored in the first memory 105 is smaller than a data amount I' stored in the second memory 107, and this relationship is maintained.

Figure 7:
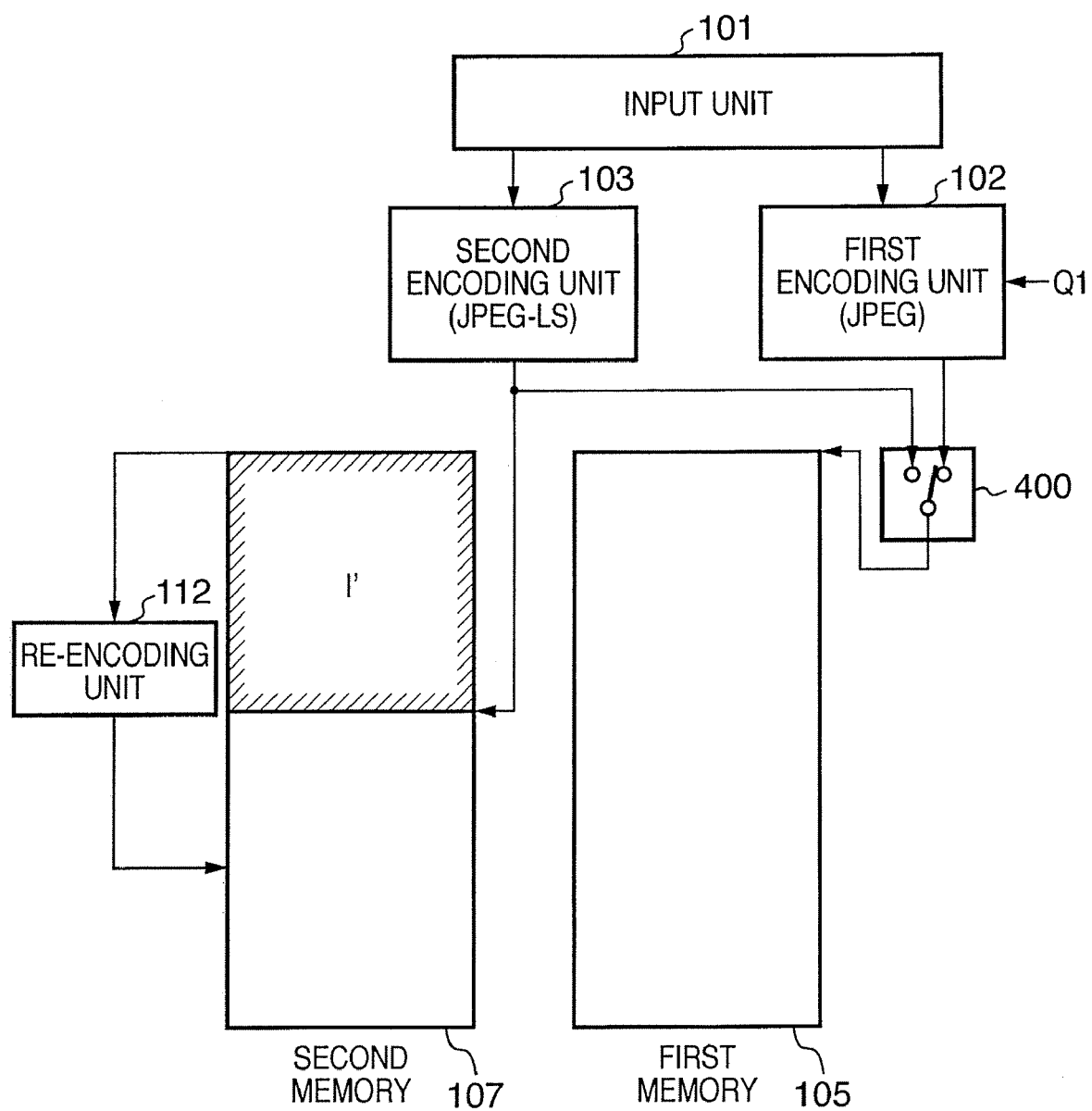
FIG. 7 is a view showing a data flow and memory contents at the start of an encoding/re-encoding phase according to the fifth embodiment.

FIG. 7 shows transition when the value held by the first counter 111 has exceeded the target code amount Th in step S309. In this case, the encoding parameters i and j are updated, and the quantization matrix is also updated as needed (when the variable i is updated). Data in the first memory 105 is discarded. For this reason, no valid encoded data exists in the first memory 105, as shown in FIG. 7.

Figure 8:
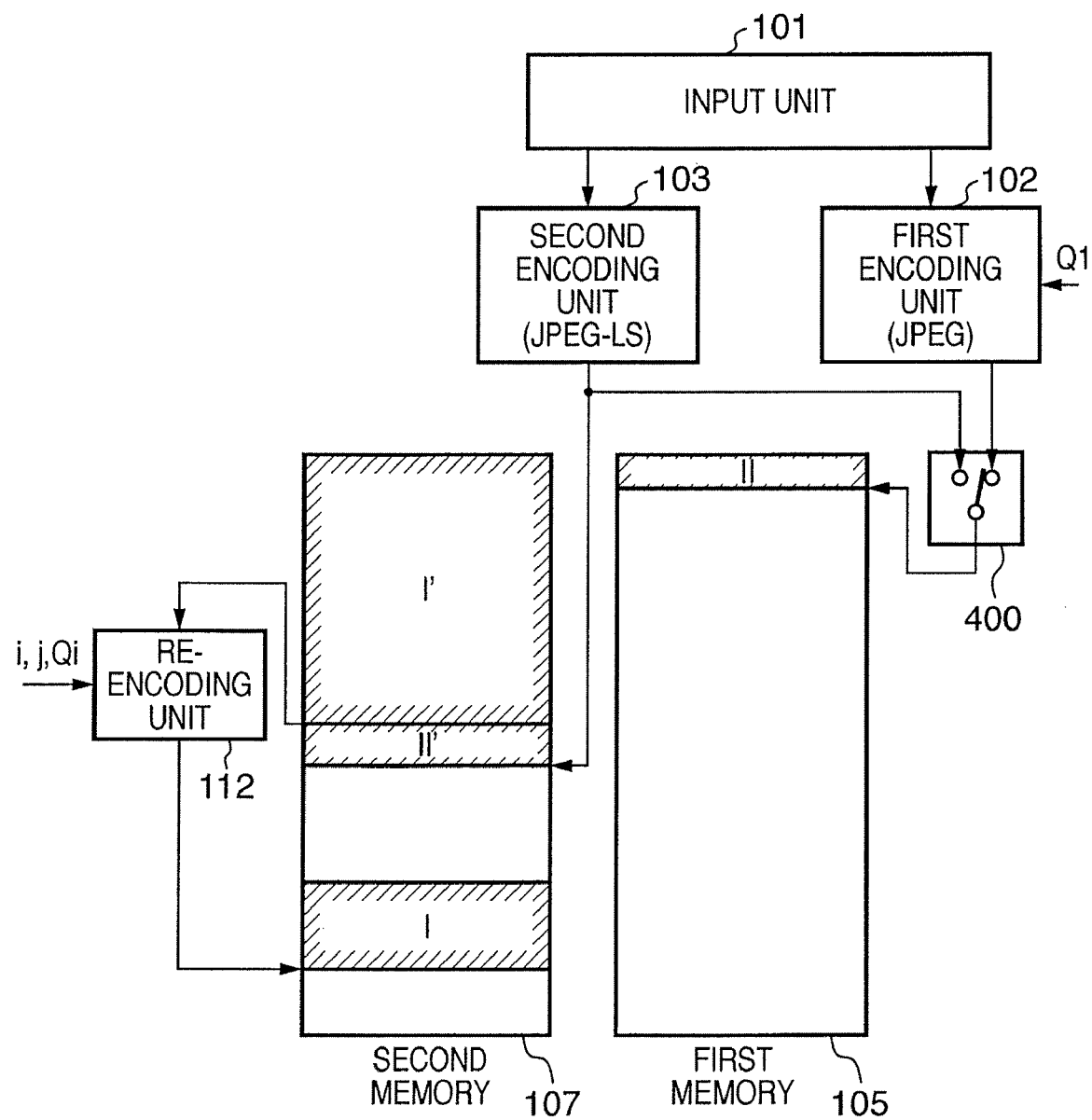
FIG. 8 is a view showing a data flow and memory contents at the end of the encoding/re-encoding phase according to the fifth embodiment.
Figure 9:
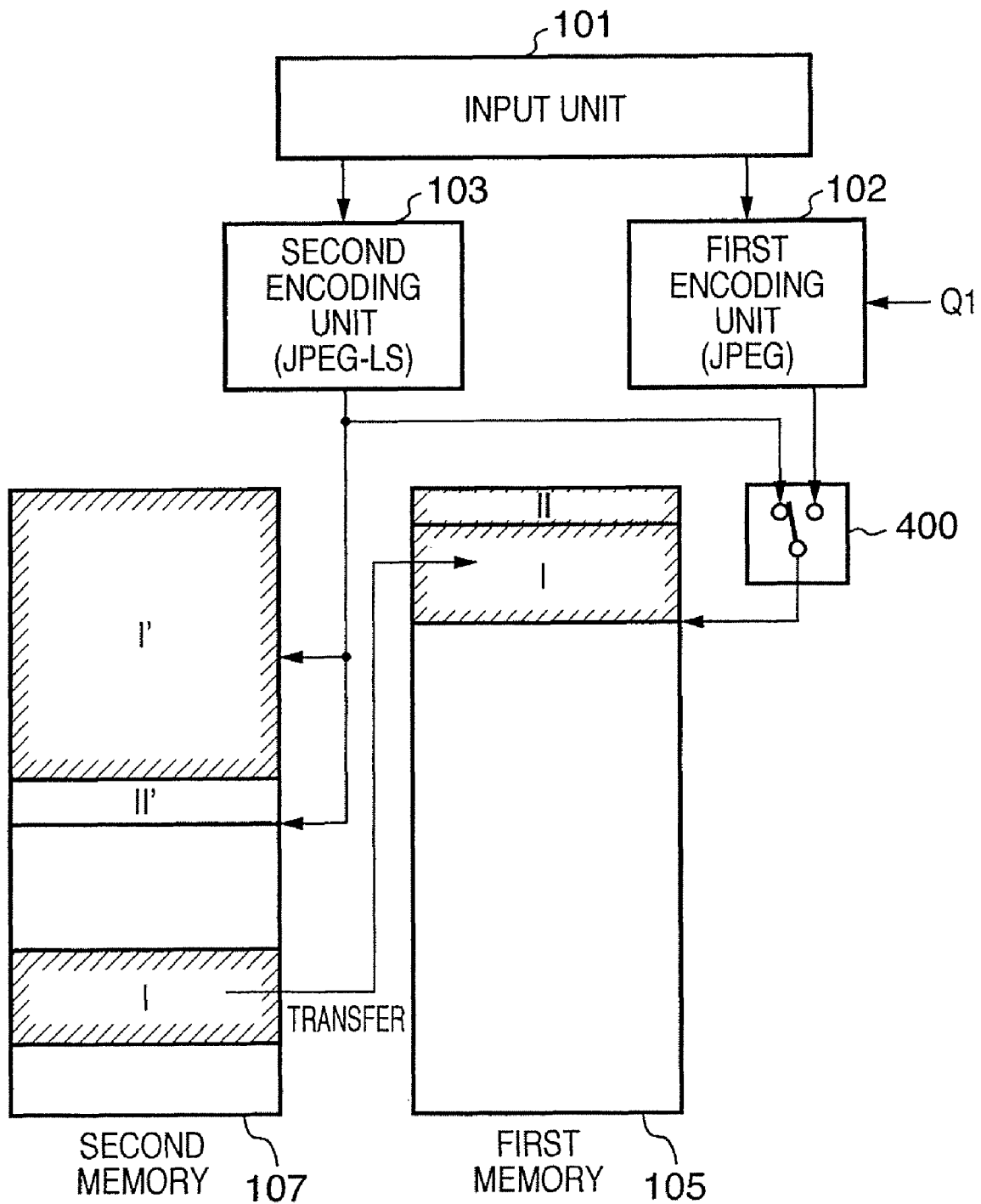
FIG. 9 is a view showing a data flow and memory contents in a transfer phase according to the fifth embodiment.
Figure 10:
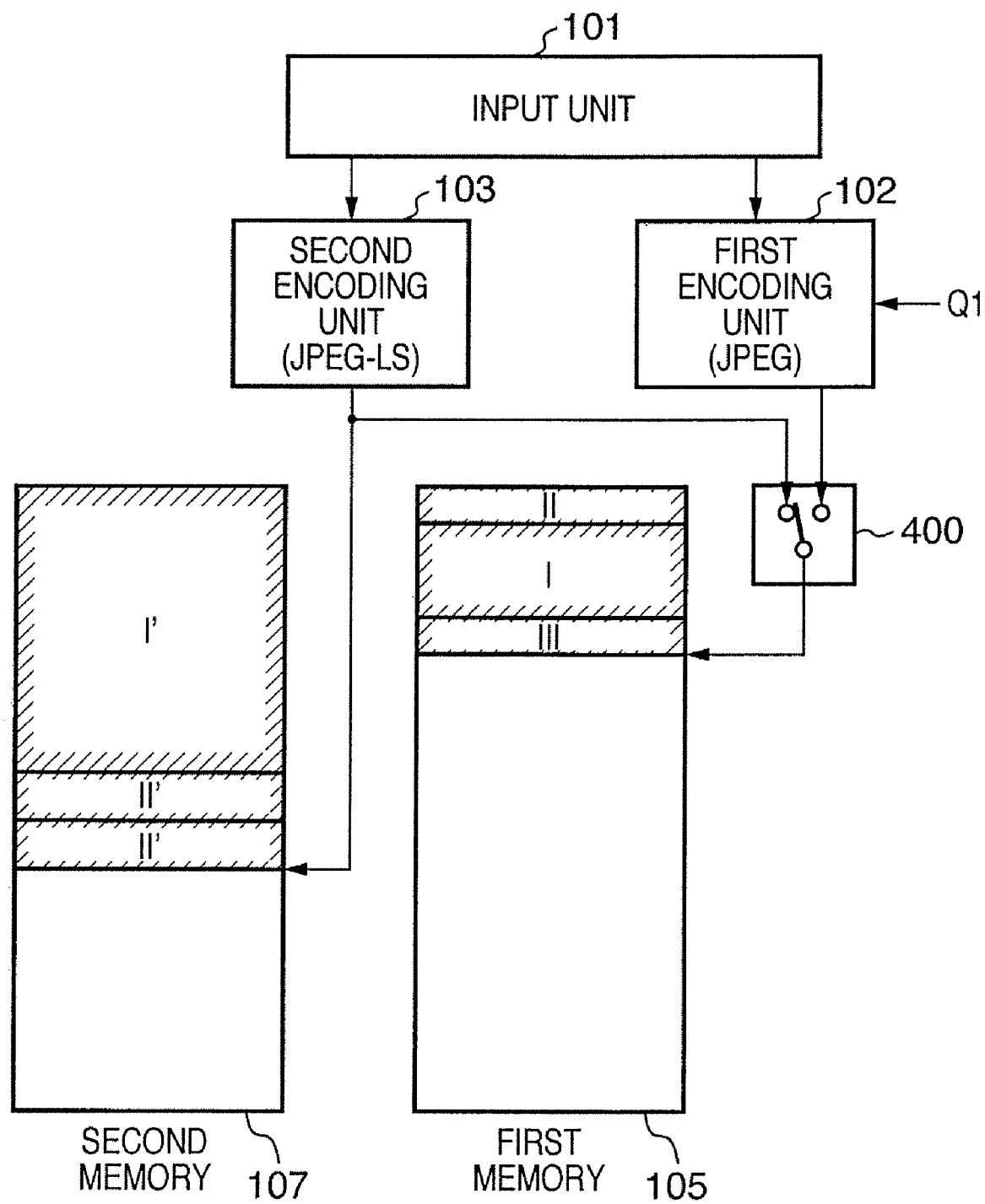
FIG. 10 is a view showing a data flow and memory contents in an encoding phase after the transfer phase according to the fifth embodiment.

FIG. 8 shows the process state of the encoding/re-encoding phase corresponding to steps S311 to S315. FIG. 9 shows the process state of the transfer phase corresponding to step S317. FIG. 10 shows the process state of the encoding phase after the transfer phase. Each phase will be described below.

<<Encoding Phase>>

The encoding process of image data of one page starts from an encoding parameter initial setting process (step S301). In this initial setting process, the target code amount Th is uniquely decided from the size of the image to be encoded (the paper size read from the input unit 101 of, e.g., page description rendering). Each of the encoding parameters i and j is set to "0". The quantization matrix table $Q_i$ (=$Q_0$) applied to the first encoding unit 102 is set.

In step S303, the first encoding unit 102 and second encoding unit 103 start encoding. As a result, the first memory 105 stores one of encoded data from the first encoding unit 102 and that from the second encoding unit 103 for each pixel block. The first counter counts the encoded data amount stored in the first memory 105, as described above. The second memory 107 stores lossless encoded data from the second encoding unit 103. FIG. 6 shows this state. The area I representing the data amount stored in the first memory 105 is equal to or less than at least the area I' representing the data amount stored in the second memory 107.

In step S305, it is detected whether the data amount count value has exceeded the target code amount Th. If NO in step S305, the first and second encoding processes in step S303 continue. This is the encoding phase in the initial state.

<<Encoding/Re-encoding Phase>>

When encoding progresses, and the total code data amount stored in the first memory 105 has exceeded the target code amount Th, the encoded data in the first memory 105 is discarded, and the first counter 111 is cleared to 0 in step S307. In step S309, the encoding parameters i and j are updated in accordance with the principle described in the first embodiment. If the parameter i is updated, the quantization matrix table $Q_i$ specified by the updated parameter i is set in the first encoding unit 102.

That the total encoded data amount exceeds the target code amount Th indicates that the data amount after compression exceeds the target code amount Th. In this case, it is nonsense to continue encoding under the same condition. Hence, status transition to a condition capable of obtaining a higher compression ratio occurs.

When the encoding parameters i and j are updated, and the quantization matrix is also updated as needed, the process advances to step S311. The first encoding unit 102 and second encoding unit 103 resume encoding. The updated encoding parameters i and j and quantization matrix table $Q_i$ are set in the re-encoding unit 112. The re-encoding unit 112 starts re-encoding of the encoded data amount stored in the second memory 107. The re-encoding result is stored in the second memory again. FIG. 7 shows this state.

In step S315, the process waits until re-encoding finishes.

<Transfer Phase>

FIG. 8 shows the encoded data storage states of the first memory 105 and second memory 107 when it is determined in step S315 that re-encoding is ended. Referring to FIG. 8, areas II and II' indicate encoded data corresponding to image data that is newly input during re-encoding. The area I indicates a result (containing both lossy encoded data and lossless encoded data) obtained by re-encoding the encoded data stored in the area I'.

In step S317, the re-encoded data (area I shown in FIG. 9) stored in the second memory 107 is transferred to the first memory 105, as shown in FIG. 9. When this transfer is ended, the data in the area I of the second memory 107 is discarded (or allows overwrite). The data amount (the size of the area I in FIG. 9) obtained by re-encoding is held by the second counter 113. The data amount is added to the first counter 111.

After the transfer phase, the process returns to the encoding phase in steps S303 and S305. As a result, encoded data III and III' corresponding to the new input image data are stored in the memories, as shown in FIG. 10. This encoding phase is slightly different from that in the initial state (FIG. 6) in that the encoded data are stored in the first memory 105 not in the order of image input. Except this difference, the encoding phase immediately after the transfer phase can be regarded as the same as the encoding phase in the initial state. Note that the encoded data are not always stored in the chronological order, as shown in FIG. 10. The storage addresses in each phase are separately stored. When one page is encoded, and the data is to be output to a secondary storage device 7, chronological data can be obtained by reading out the encoded data from the first memory 105 and outputting them in the chronological order.

When the three phases: the encoding phase, encoding/re-encoding phase, and transfer phase are repeated, the image data of one page can finally be stored in the first memory 105 as codes compressed to the data amount setting value or less. The input unit 101 only continues input until the series of processes is ended. That is, it is unnecessary to re-input the image from the beginning.

The flowchart in FIG. 5 illustrates only processes corresponding to the phases shown in FIGS. 6 to 10 to help understanding. In fact, input of image data of one page finishes somewhere in the phases. Subsequent processes slightly change depending on the phase where the image input is ended. FIG. 11 is a flowchart showing the data flow considering it. In the flowchart shown in FIG. 11, the relationship between completion of input of image data of one page and the various kinds of processes described in FIG. 5 is considered. Steps S801, S803, S805, and S807 are added to the flowchart in FIG. 5.

In steps S801, S803, and S805 corresponding to the encoding phase, encoding/re-encoding phase, and transfer phase, respectively, it is detected whether input of image data of one page from the input unit 101 is ended.

If it is detected in the encoding phase or transfer phase (step S801 or S805) that input of image data of one page is ended, the process advances to step S807 to complete compression-coding of the page. If image data of at least one page remains as a process target, compression-coding of image data of the next page starts. If no image data remains, the process stops.

If the end of input of image data of one page is detected in the encoding/re-encoding phase (step S803), the first encoding unit 102 and second encoding unit 103 need to temporarily stop the operation until the image data is totally re-encoded. In this case, the process skips the encoding process in step S311 and jumps to step S313 to continue only re-encoding to reduce the amount of image data encoded by the first encoding unit 102 and second encoding unit 103 to a predetermined encoded data amount. The first memory 105 cannot collect the encoded data of whole image data of one page before the re-encoding process is completely ended, and the next transfer process is ended. Hence, the re-encoding process and the subsequent transfer process must continue even after input of image data of one page is ended. If completion of the re-encoding process is detected in step S315, the encoded data stored in only the second memory 107 is transferred to the first memory (step S317). Then, completion of input of image data of one page is detected in step S805, and the process advances to step S807.

The operation according to the fifth embodiment, i.e., the operation in FIG. 11 have been described above.

As described above, according to the fifth embodiment, the same functions and effects as in the first embodiment can be obtained. It is possible to generate encoded data in the target code amount Th or less without interrupting input of an image of one page and executing re-input.

An especially notable point is that two techniques, i.e., JPEG for lossy encoding and JPEG-LS for lossless encoding are used together. As already described above, JPEG encoding can ensure a high compression efficiency for a natural image. JPEG-LS encoding can obtain a high compression ratio for a character/line image and faithfully reproduce the original image because it is lossless encoding.

Figure 12:
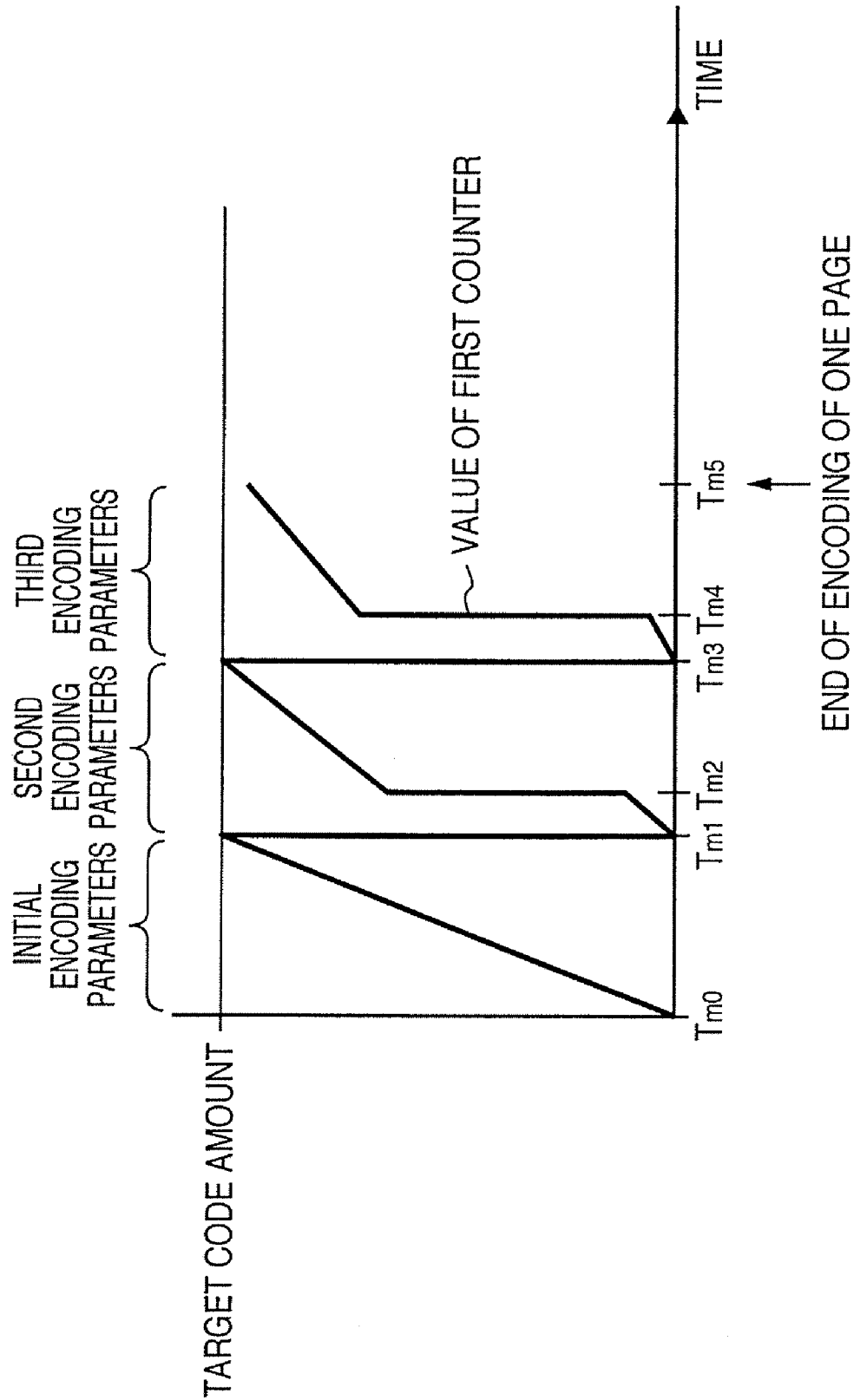
FIG. 12 is a view showing an example of transition of the value of a first counter according to the fifth embodiment.

FIG. 12 is a view showing an example of time-axis transition of the first counter 111 (code amount).

In the example shown in FIG. 12, input of a document image starts at timing Tm0 and ends at timing Tm5. If the size of the input document is fixed, the timing Tm5 is fixed. The process at each timing will be described below.

Timing Tm0:

This is the image input start (encoding start) timing. Since the encoding parameters i and j are "0", the quantization matrix $Q_0$ is set in the first encoding unit 102 as the initial value. The first counter 111 is initialized to "0". When image input and encoding continue, the encoded data of the image data is encoded. The count value of the first counter 111 gradually increases.

Timing Tm1:

This timing indicates that the encoded data amount of the image data has reached the target code amount Th. The encoded data of the image data in the first memory 105 is discarded. The first counter 111 is cleared to 0. The encoding parameters i and j are decided in accordance with the same procedure as in the first embodiment. The decided encoding parameters i and j are set in the re-encoding unit 112, and re-encoding starts.

Timing Tm2:

This timing indicates the end of re-encoding and transfer. When re-encoding finishes, the encoded data obtained by re-encoding is transferred from the second memory 107 to the first memory 105. In addition, the value of the second counter 113 representing the re-encoded data amount is added to the first counter 111. As a result, the first memory 105 and second memory 107 store encoded data corresponding to image data input from the top of the page to the timing Tm2.

Timing Tm3:

This timing indicates that the encoded data amount of the image data has reached the target code amount again. The encoded data of the image data in the first memory 105 is discarded. The first counter 111 is cleared to 0. The encoding parameters i and j are updated. Re-encoding starts.

Timing Tm4:

This timing indicates the end of re-encoding and transfer. When re-encoding finishes, the encoded data obtained by re-encoding is transferred from the second memory 107 to the first memory 105. In addition, the value of the second counter 113 representing the re-encoded data amount is added to the first counter 111. As a result, the first memory 105 and second memory 107 store encoded data corresponding to image data input from the top of the page to the timing Tm2.

Timing Tm5:

This timing indicates the end of input of the document of one page. Since the first memory 105 stores the encoded data of the image of one page, the result is output to the secondary storage device 7.

To read the second document image, the process is repeated from the timing Tm1.

For some images, the value of the first counter 111 may exceed the target code amount immediately before the timing Tm5, i.e., the end of input of the document image. In this case, re-encoding and transfer are executed after the timing Tm5. Hence, the encoded data stored in the first memory 105 is output to the secondary storage device 7 when input of the document image is ended, and encoding (re-encoding and transfer) is ended.

As described above, according to the fifth embodiment, it is possible to obtain encoded data in the target code amount Th or less by inputting image data of one page only once, in addition the functions and effects of the first embodiment.

<Modification of Fifth Embodiment>

Figure 14:
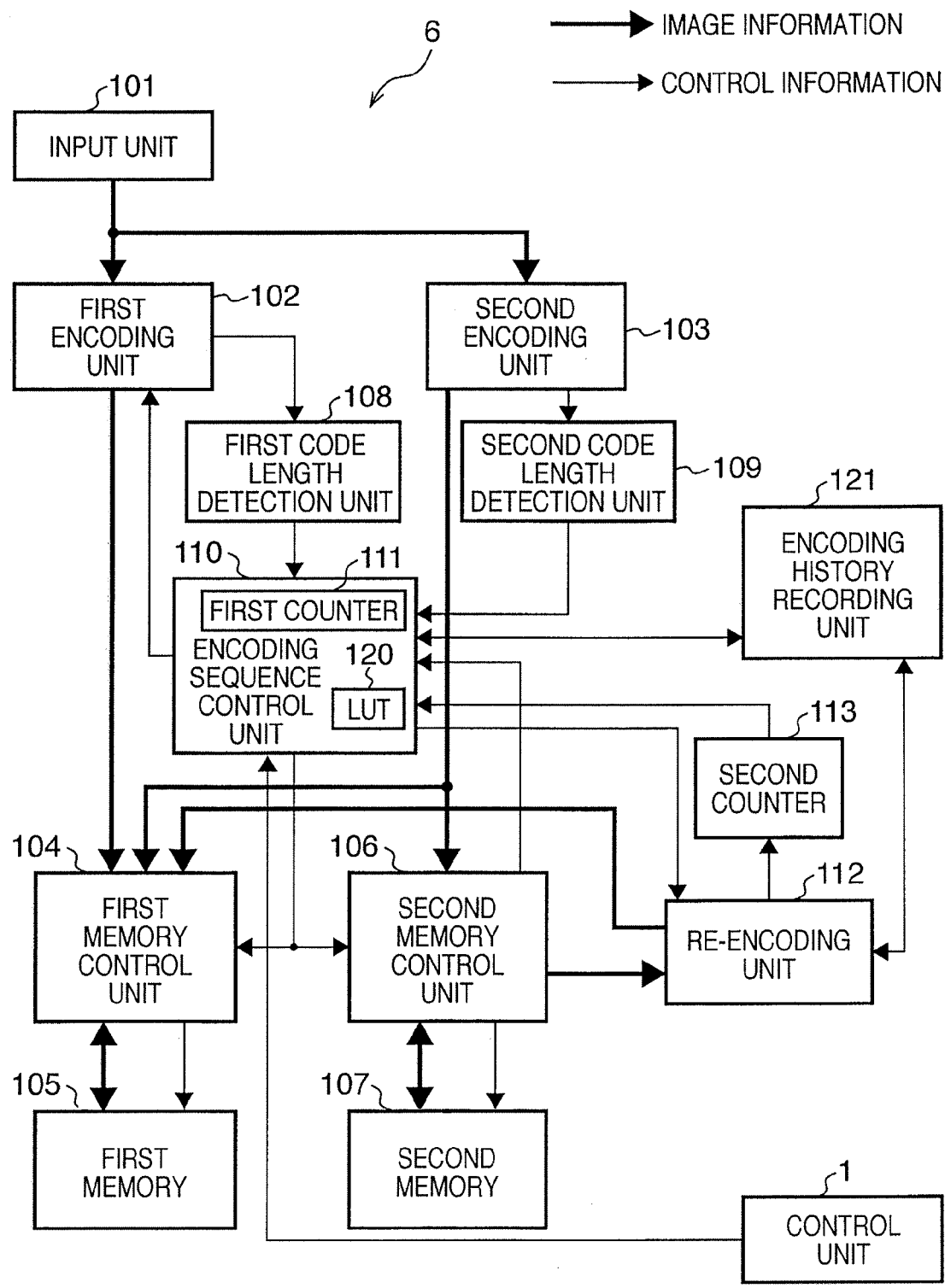
FIG. 14 is a block diagram showing a modification of an encoding processing unit according to the fifth embodiment.

FIG. 14 shows a modification of FIG. 4. FIG. 14 is different from FIG. 4 in that the first memory 105 stores encoded data re-encoded by the re-encoding unit 112. The remaining components are the same as in FIG. 4.

Figure 15:
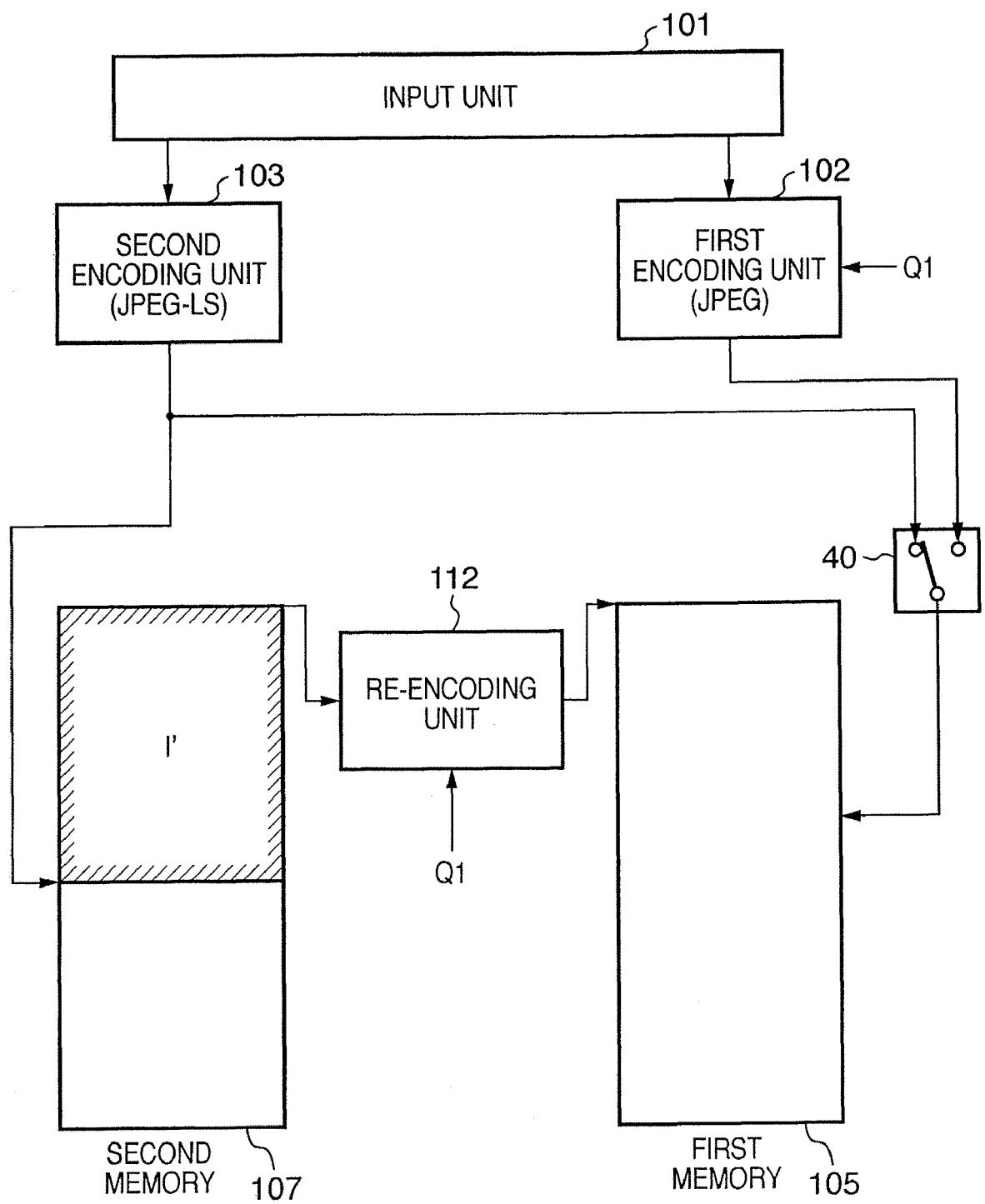
FIG. 15 is a view showing a data flow and memory contents at the start of the encoding/re-encoding phase in the arrangement shown in FIG. 14.

FIG. 15 shows a state when the total encoded data amount stored in the first code length detection unit 108 exceeds the target code amount Th, data in the first memory 105 is discarded, and re-encoding of the encoded data (area I' in FIG. 15) stored in the second memory 107 starts.

As shown in FIG. 15, the storage destination re-encoded data from the re-encoding unit 112 is set to the first memory 105. Re-encoding starts.

Figure 16:
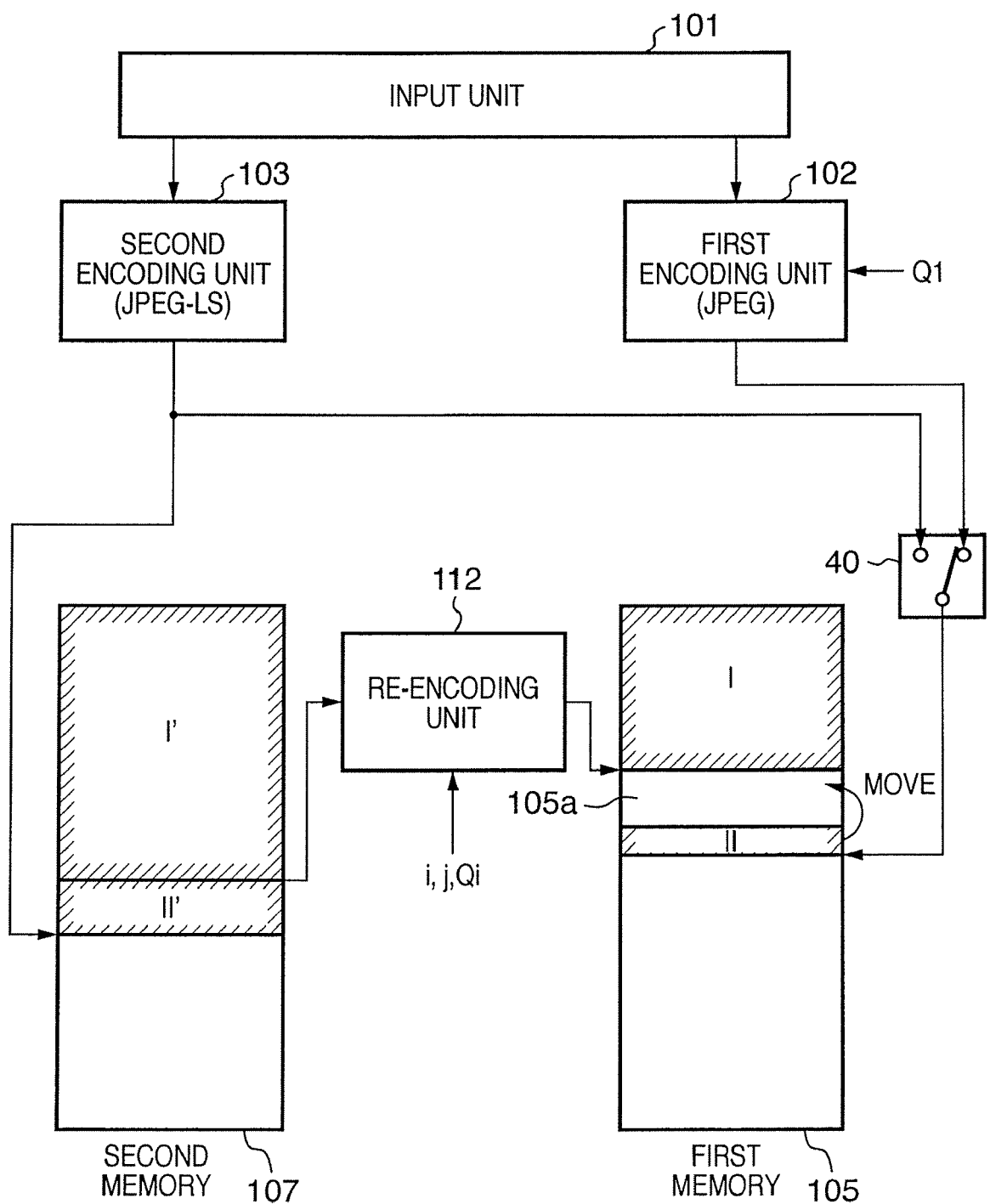
FIG. 16 is a view showing a data flow and memory contents at the start of the encoding/re-encoding phase in the arrangement shown in FIG. 14.

FIG. 16 shows the encoded data storage states of the two memories at the end of re-encoding.

When re-encoding finishes, the first memory 105 stores encoded data indicated by the area I, as shown in FIG. 16. The encoded data in the area I corresponds to the encoded data of image data that is input before it is determined that the data amount has exceeded the target code amount.

Input and encoding of image data are executed even during re-encoding. Hence, the areas II and II" exist, as shown in FIG. 16.

Figure 17:
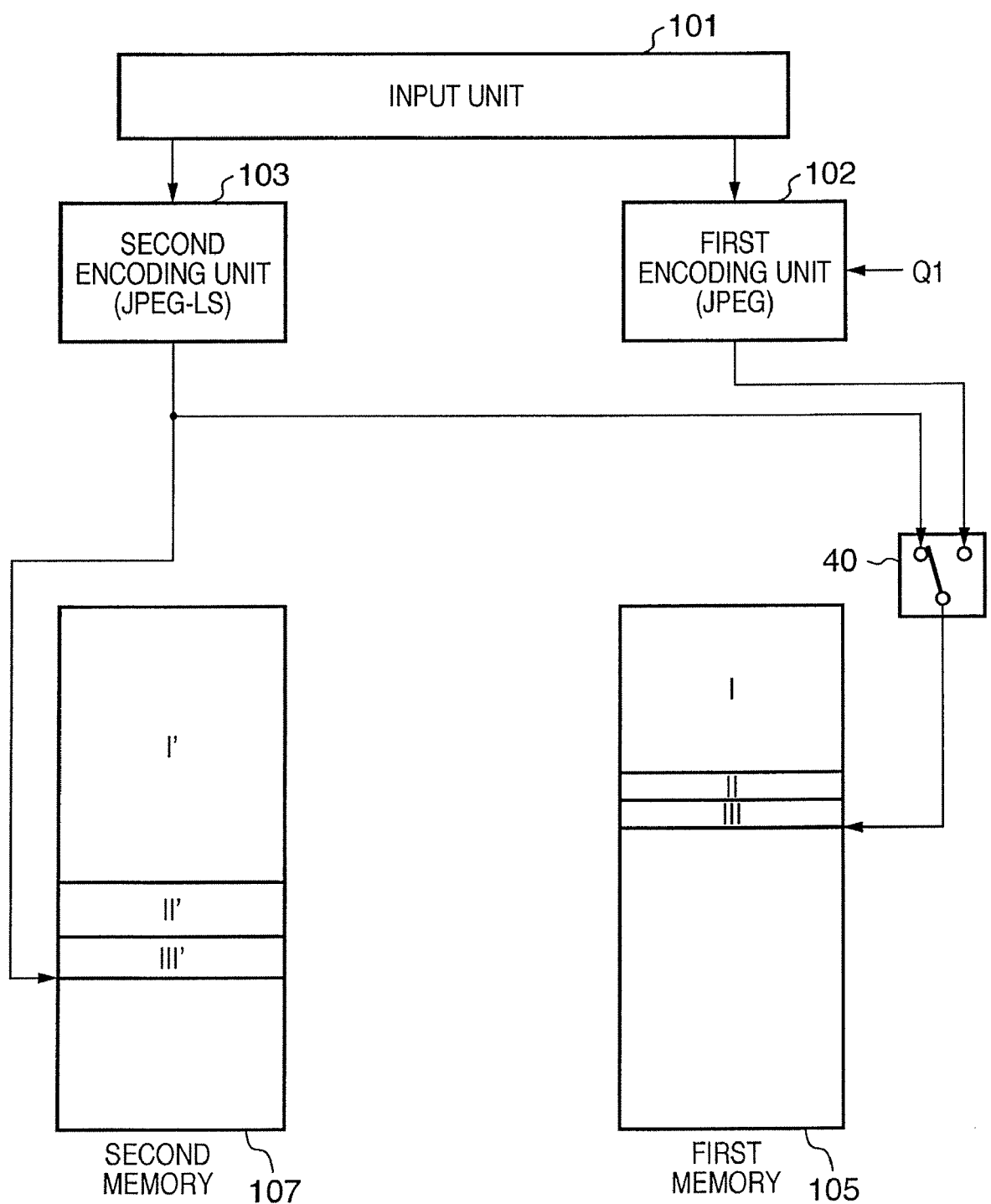
FIG. 17 is a view showing a data flow and memory contents in the transfer phase in the arrangement shown in FIG. 14.

A free space 105a is formed in the first memory 105. The encoded data in the area II in FIG. 16 is moved to the end of the area I. After that, the encoding phase resumes. The storage states of the memories at this time are shown in FIG. 17.

The arrangement shown in FIG. 14 is more advantageous than FIG. 4 because data transfer after re-encoding can be omitted virtually.

This modification only eliminates the transfer phase. The process is executed by repeating the three phases in both the fifth embodiment and this modification. The process contents are also almost the same as in FIGS. 5 and 11, and a description thereof will be omitted. In FIG. 16, the data is moved in the first memory 105 to eliminate the free space 105a. However, the internal transfer is not always necessary because a file management table or packet management table suffices in managing the connection relationship between the areas.

Another Modification of Fifth Embodiment

In the fifth embodiment and its modification, when encoding is executed by using the encoding parameters i=a and j=b and the quantization matrix table $Q_a$, and the obtained encoded data amount has exceeded the target code amount Th during the process, the encoding parameters i and j are updated in accordance with the first embodiment.

However, the encoding parameters may be decided in accordance with the principles described in the second to fourth embodiments. This is because the second to fourth embodiments are embodiments related to step S16 in FIG. 3A of the first embodiment, and the same process also exists in step S309 in FIG. 5 or 11 of the fifth embodiment.

In the fifth embodiment, the first memory 105 and second memory 107 have been described as physically separated memories. In the present invention, separately providing these memories is one characteristic feature. However, even if the memories are not physically separated, the present invention is applicable. Particularly, if the transfer rate of the memory is sufficiently high, it is possible to physically allocate two areas corresponding to the first and second memories on one memory. In the above description, "first memory" is replaced with "first memory area", and "second memory" is replaced with "second memory area". In this case, it is obvious that the present invention can be implemented by using one memory.

When the embodiments are implemented on one memory, some processes of data transfer described in the transfer phase are unnecessary. A detailed description will be omitted because it is easy to surmise. If the two areas are strictly separated, data transfer is necessary as in the arrangement with two physically separated memories. Additionally, if the two areas share the same data, not only omission of data transfer but also reduction of the storage capacity is possible.

For example, if the start address and data size of encoded data held in the second memory area are transferred to the first memory area, the same effect as in the above-described encoded data transfer can be obtained.

When the encoded data is stored in the form of a file or packet, the amount of information transferred between the memory control units slightly increases because management table information related to the encoded data needs to be transferred.

In the first to fifth embodiments, the encoding target is an 8×8 pixel block. However, the present invention is not limited to this size. Any other size can be employed if it is possible to compare the amounts of two kinds of encoded data generated in the same image area by using two (or more) different encoding techniques. For example, assume that JPEG encoding encodes each N×M pixel block, and JPEG-LS encodes each 2N×2M pixel block. In this case, four JPEG encoded data may be compared with one JPEG-LS encoded data.

Sixth to Ninth Embodiments

In compression-coding image data, the smaller the number of pixels of image data as an encoding target is, the smaller the generated code amount is. Hence, the encoding efficiency can be increased by reducing the resolution of the image as the encoding target as long as the influence on the image quality is small. In examples to be described in the sixth and subsequent embodiments, a resolution conversion technique is added to the arrangement of the first embodiment.

In the sixth to ninth embodiments to be described below, the present invention is applied to the copying machine in FIG. 22, as in the above-described first to fifth embodiments. A description of the arrangement in FIG. 22 will be omitted, and an encoding processing unit 6 will be described.

Sixth Embodiment

Figure 34:
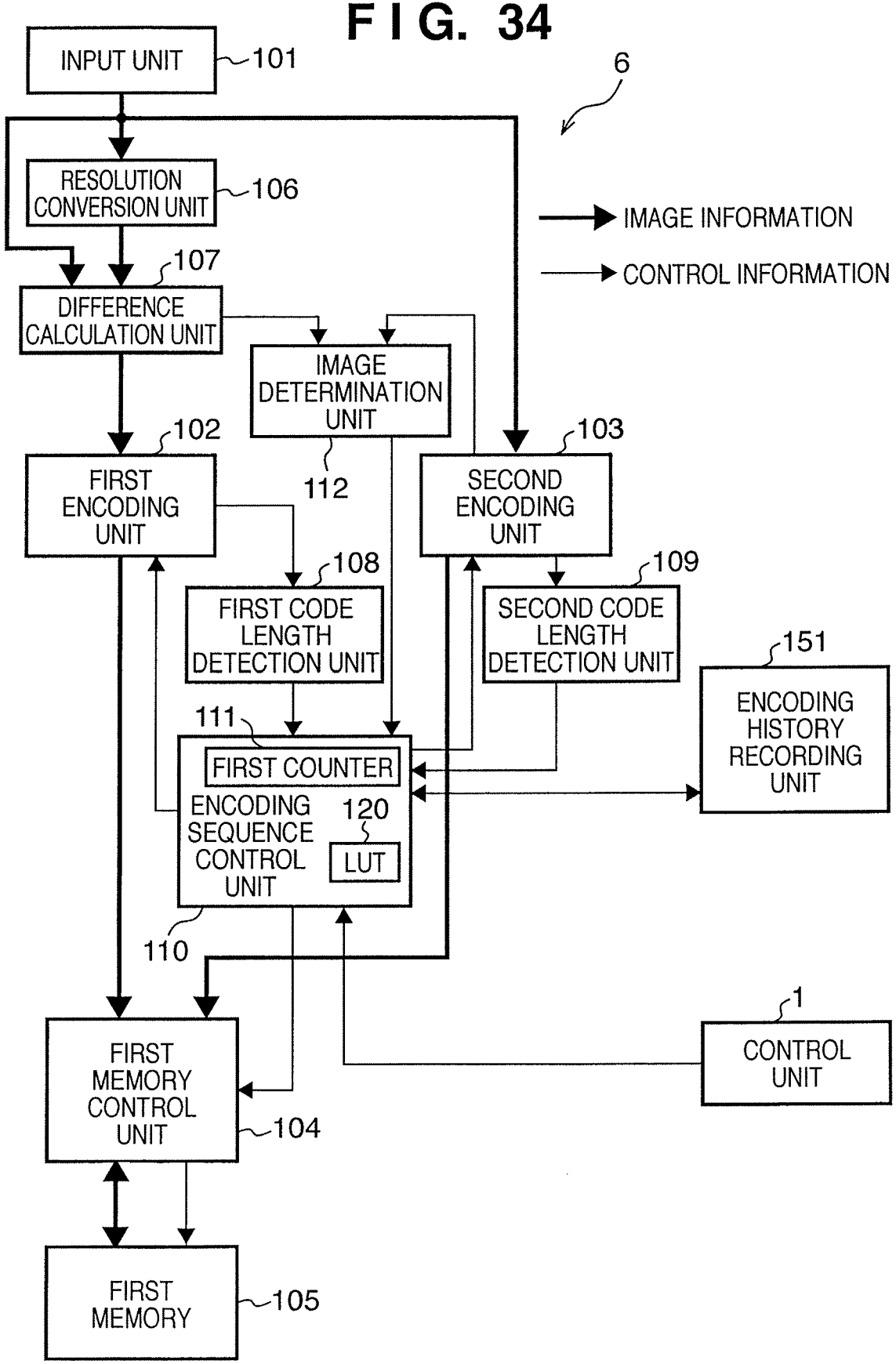
FIG. 34 is a block diagram of an encoding processing unit according to the sixth embodiment.

FIG. 34 is a block diagram of the encoding processing unit 6 according to the sixth embodiment. The same reference numerals as in FIG. 1 denote parts having the same functions in FIG. 34. Instead of explaining only different parts, the same parts will be described again to help grasping the overview.

An input unit 101 incorporating a line buffer memory for a plurality of lines receives image data from a document reading unit 3 or rendering unit 4 via a selector 5 in the raster order, as described above. The input unit 101 stores the image data in the internal line buffer. The input unit 101 outputs N×M pixel blocks. In the first embodiment, the size of one block is 8×8 pixels. In the sixth embodiment, the size of one block is 16×16 pixels.

A resolution conversion unit 106 converts the resolution of the input image data. In this resolution conversion, one pixel is generated from four pixels (two horizontal pixels×two vertical pixels), thereby reducing the resolution to ½ in the horizontal and vertical directions. The resolution is reduced by extracting a pixel at a predetermined position in 2×2 pixels as a representative pixel or calculating the mean value of 2×2 pixels. However, any other known resolution conversion method may be used.

As described above, the input unit 101 outputs data of each 16×16 pixel block. Hence, the resolution conversion unit 106 eventually outputs data of each 8×8 pixel block. The resolution conversion unit 106 of the sixth embodiment decreases the resolution of the input image to ½. However, this is merely an example, and any other value is usable. For example, to reduce the resolution to ⅓, the input unit 101 outputs data of each 24×24 pixel block.

A difference calculation unit 107 calculates a difference that indicates the change amount between the input image data and that after resolution conversion. The difference can be calculated by, e.g., the following method.

Let P0 be the value of a pixel output from the resolution conversion unit 106, and P1, P2, P3, and P4 be the values of 2×2 pixels of an input image serving as the base of the pixel value P0. The difference calculation unit 107 calculates a difference d in the following way.

$$d = |P0-P1| + |P0-P2| + |P0-P3| + |P0-P4|$$

where |x| is the absolute value of x. In a color image, each pixel has RGB color component values. The above-described equation is calculated for each color component.

Instead of calculating the absolute value, $d=(P0-P1)^2 + (P0-P2)^2 + (P0-P3)^2 + (P0-P4)^2$ may be calculated.

The resolution conversion unit 106 outputs 8×8 pixels=64 pixel data. The difference calculation unit 107 obtains the difference d(=d1, d2, d3, . . . , d64) for each of the 64 pixels. A sum of difference values di is obtained as a difference value D after resolution conversion of 16×16 pixels of the input images which is given by $$D = \Sigma di$$

The difference calculation unit 107 outputs the obtained difference value D to an image determination unit 112. If the difference value D is large, the image quality of the partial image containing the 8×8 pixel block after resolution conversion largely degrades from the equivalent partial image in the original image. Such information can also be obtained by calculating MSE, PSNR, dispersion, or standard deviation instead of calculating the absolute value of the difference.

The difference value D is small when the input image is, e.g., a natural image. In a natural image, adjacent pixels have a small difference between them. For this reason, P0 and P1, P2, P3, or P4 also have a small difference value, as a matter of course.

The difference value D can be regarded as index information representing an error generated when a partial image represented by 16×16 pixels of the original image, as described above. Hence, the difference value D will be referred to as resolution conversion error information hereinafter.

Referring back to FIG. 34, a first encoding unit 102 generates encoded data (lossy encoded data) by executing lossy encoding of each 8×8 pixel block output from the difference calculation unit 107 and outputs the encoded data to a first memory control unit 104. The encoded data has, at the top, an identification bit (e.g., "0") indicating that the data is encoded by the first encoding unit 102.

The image encoding unit 102 of this embodiment uses JPEG encoding (lossy encoding). More specifically, image data corresponding to an 8×8 pixel block undergoes orthogonal transform, quantization using a quantization table, and Huffman encoding. The generated code amount changes depending on the quantization step. An encoding sequence control unit 110 sets the quantization step. JPEG encoding is known as a technique suitable for a natural image.

A quantization matrix table has the structure shown in FIG. 21 described in the first embodiment. The quantization matrix set in the first encoding unit 102 before the start of encoding of one page is $Q_0$ in FIG. 21.

A second encoding unit 103 is a lossless encoding unit, unlike the first encoding unit 102. In lossless encoding, a decoding result matches the image before encoding. The image quality does not degrade in principle. In this embodiment, the second encoding unit 103 uses JPEG-LS.

The second encoding unit 103 of the first embodiment losslessly encodes each 8×8 pixel block. The second encoding unit 103 of the sixth embodiment receives each 16×16 pixel block, generates lossless encoded data, and outputs it to the first memory control unit 104. The second encoding unit 103 adds, to the top of the lossless encoded data, an identification bit (e.g., "1") to discriminate it from lossy encoded data generated by the first encoding unit 102.

If the identification bit is "0", a decoding processing unit 8 according to the sixth embodiment determines that the encoded data of the pixel block is lossy encoded data and executes decoding. The decoding processing unit 8 generates an image by enlarging the decoded image to several times (twice in this embodiment) in the horizontal and vertical directions. To double an image, 2×2 pixels having the same value as that of one pixel obtained by decoding are generated.

The number of pixels may be increased by linear interpolation as needed. If the identification bit is "1", the decoding processing unit 8 determines that the encoded data of the pixel block is lossless encoded data, executes decoding, generates data of 16×16 pixels, and outputs it.

When pixel data of interest is being encoded by JPEG-LS, the second encoding unit 103 counts the number of colors contained in the pixel group around the pixel of interest. This will be described below in detail.

Figure 38:
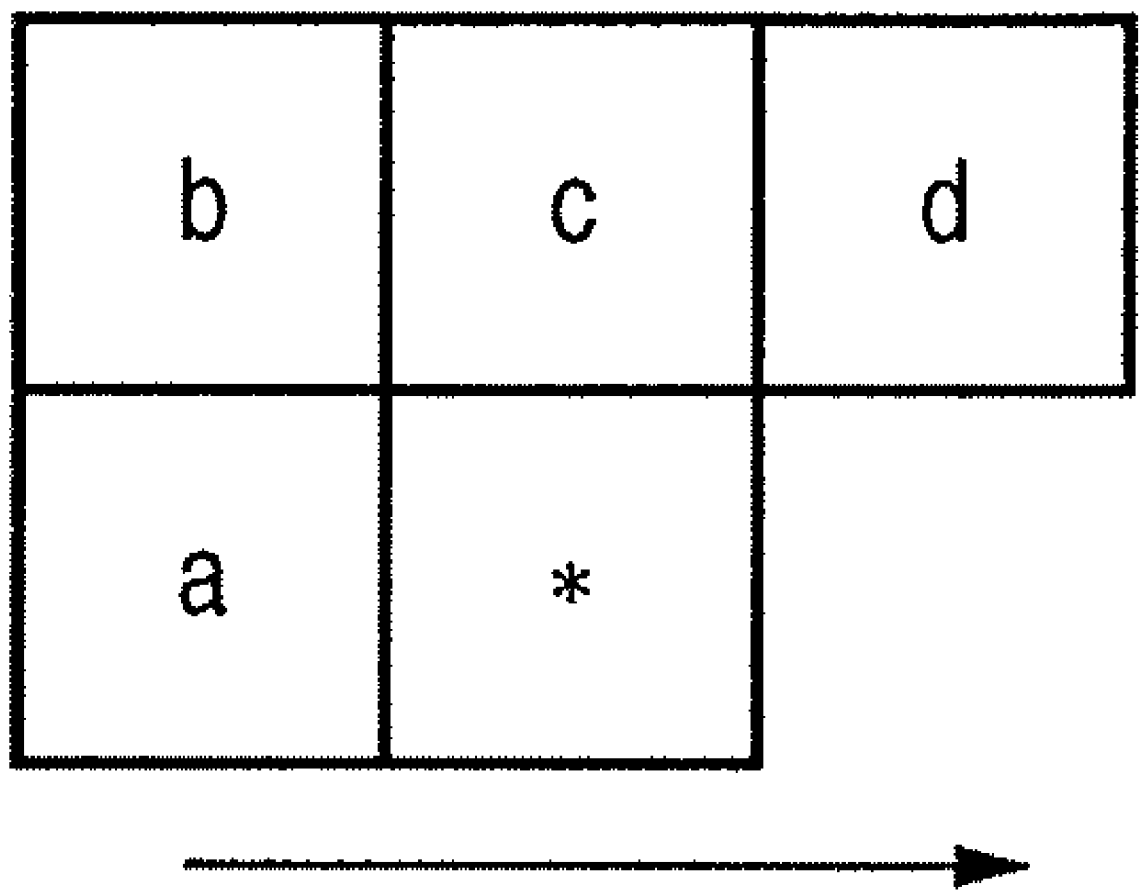
FIG. 38 is a view showing the scan sequence in counting the number of colors.

FIG. 38 shows the scan sequence in counting the number of colors. In FIG. 38, the asterisk indicates a pixel of interest, and the arrow indicates the scan direction. When one line in a 16×16 area is scanned, scanning starts from the left end of a line immediately under in FIG. 38. Hence, neighboring pixels a, b, c, and d of the pixel of interest in FIG. 38 are pixels that are already encoded.

In the sixth embodiment, every time the position of the pixel of interest is updated, the number of times where the number of colors contained in the neighboring pixels a, b, c, and d is "2". In the example shown in FIG. 38, the number of neighboring pixels is four. Hence, the minimum number of colors is "1", and the maximum number of colors is "4". In the sixth embodiment, color count information representing how many times the color count "2" has been detected during scanning of the 16×16 pixel area is output to the image determination unit 112. The pixel of interest is excluded from the color count target but may be included.

The first encoding unit 102 and second encoding unit 103 generate encoded data corresponding to the same 16×16 pixel data of the original image at almost the same timing.

A first code length detection unit 108 detects the encoded data length (including one bit serving as the identification bit) of the pixel block output from the first encoding unit 102 and outputs the result to the encoding sequence control unit 110. A second code length detection unit 109 detects the encoded data length (including one bit serving as the identification bit) of the pixel block output from the second encoding unit 103 and outputs the result to the encoding sequence control unit 110.

At the timing of encoded data output from the first and second encoding units, the image determination unit 112 determines whether the resolution conversion error information D from the difference calculation unit 107, color count information C from the second encoding unit 103, and two preset thresholds Th1 and Th2 hold $$\text{Condition: } D > Th1, \text{ and } C > Th2 \tag{1}$$

If Condition (1) is satisfied, the image determination unit 112 outputs an image determination signal H of "1" to the encoding sequence control unit 110. Otherwise, the image determination unit 112 outputs an image determination signal H of "0" to the encoding sequence control unit 110.

If the above condition is satisfied, the number of colors contained in the 16×16 pixel area of the original image is as small as almost two, and the image contains many high-frequency components. An typical example is a character/line image (black character or line on a white ground). In the following description, assume that when the above condition is satisfied, the 16×16 pixel block in the original image is a specific image.

The encoding sequence control unit 110 controls the encoding processing unit 6 of this embodiment. As one of its processes, the encoding sequence control unit 110 decides encoded data to be stored in a first memory 105 by using the signals from the first code length detection unit 108 and second code length detection unit 109, the signal H from the image determination unit 112, and an internal LUT (LookUp Table) 120 (the selection principle will be described later). The encoding sequence control unit 110 outputs a selection signal to a first memory control unit 104 to cause it to select the decided encoded data.

The encoding sequence control unit 110 also records, in an encoding history recording unit 151, information representing which data has been selected, lossy encoded data or lossless encoded data, and information representing the lossy or lossless encoded data length in correspondence with each pixel block (this will be described later in detail).

The encoding sequence control unit 110 comprises a first counter 111 which cumulatively counts the code length data of encoded data to be stored in the first memory 105. The first counter 111 is cleared to 0 upon starting encoding one page. Hence, the first counter 111 holds information representing the total encoded data amount stored in the first memory 105.

The encoding sequence control unit 110 compares the value (the encoded data amount stored in the first memory 105) of the first counter 111 with a target code amount Th (determined depending on the size of an input image) Upon detecting that the value of the first counter 111 has exceeded (or reached) the target code amount Th, the encoding sequence control unit 110 outputs a control signal to the memory control unit 104 to discard data stored in the memory 105. At this time, the encoding sequence control unit 110 clears the first counter 111 to 0. Then, the encoding sequence control unit 110 requests the control unit 1 (FIG. 22) to re-input the image and re-scan the document image.

Re-scanning is done to reduce the encoded data amount to be stored in the first memory 105. To do this, the encoding sequence control unit 110 changes the quantization matrix set in the first encoding unit 102, the determination condition based on the signals from the first and second code length detection units and the image determination unit 112, or the selection criteria by the LUT 120. That is, the encoding sequence control unit 110 updates environmental settings (encoding parameters) to suppress the generated encoded data amount as compared to at least that of the previous time. The update process will be described later in detail.

If encoding of one page finishes before the value of the first counter 111 exceeds the target code amount Th, the encoded data is output to a secondary storage device 7 as a file. Note that the encoded data of one page contains both lossless and lossy encoded data. If image data of the next page exists (or the next document page exists), the document is conveyed to the reading surface (generally, platen glass) to read it, and reading and encoding start.

The process contents of the encoding processing unit 6 according to the sixth embodiment have roughly been described above.

<Description of Environmental Settings>

Environmental settings to make the encoding sequence control unit 110 of the sixth embodiment decide which should be stored in the first memory 105, lossy or lossless encoded data of each pixel block, will be described next. Environmental settings of the sixth embodiment is almost the same as in <Description of Environmental Settings> of the first embodiment. This will be explained again. To help understanding the process contents of the sixth embodiment, the following explanation will be done assuming that no image determination information from the image determination unit 112 is present. A process using image determination information from the image determination unit 112 will be described later in detail.

As describe above, in the sixth embodiment, the first encoding unit 102 uses JPEG as lossy encoding, and the second encoding unit 103 uses JPEG-LS as lossless encoding, as in the first embodiment.

Reading of a document which contains character/line image areas $T_1$ and $T_2$, a gradation (image with smoothly changing gray level) area G by computer graphics, and a natural image area I, as shown in FIG. 20, will be examined.

Only character/line images with sharp edges are present in the character/line image area $T_1$. Only character/line images with slightly blurred edges are present in the character/line image area $T_2$. The character/line image area $T_2$ corresponds to an image area that has undergone anti-aliasing to smoothen the edge of a character or graphic pattern or digital resolution conversion. The character/line image area $T_2$ can simply be considered as an image area where a pseudo image is generated after copy is repeated many times.

Assume that quantization matrix $Q_0$ (maximum image quality and minimum compression ratio) is set as an initial parameter for the first encoding unit 102 that executes lossy encoding, and the document in FIG. 20 is read. Let Lx be the code length of encoded data obtained by lossless-encoding each 16×16 pixel block, and Ly be the code length of encoded data obtained by lossy-encoding an 8×8 pixel block obtained by converting the resolution of the 16×16 pixel block. The same result as in FIG. 18 is obtained by plotting points P(Lx, Ly) having Lx and Ly as coordinates as many as the pixel blocks contained in one page.

Elliptical distribution areas 2001 to 2004 in FIG. 18 almost indicate the distribution areas of plotted points of the areas $T_1$, $T_2$, G, and I. A few points are plotted outside the ellipses. These points are neglected as irregular points. A broken line 2006 in FIG. 18 indicates a relationship Ly=Lx.

From the viewpoint of encoded data compression efficiency, encoded data to be stored in the first memory 105 is decided under the following conditions.

1. When Ly<Lx, the first memory 105 stores lossy encoded data from the first encoding unit 102.
2. When Ly≧Lx, the first memory 105 stores lossless encoded data from the second encoding unit 103.

In this case, the first memory 105 can minimize the total encoded data amount of one page.

However, under the boundary condition Ly=Lx, the computer gradation area G is divided by the boundary line 2006. That is, lossy encoded data and lossless encoded data mix in pixel blocks. More specifically, the computer gradation area G alternately contains pixel blocks of lossless encoded data and those of lossy encoded data at a very high possibility. If this data is decoded, block noise readily occurs and makes the boundary between adjacent pixel blocks discontinuous due to the different encoding schemes. This is disadvantageous in terms of image quality.

In the sixth embodiment, a nonlinear boundary condition indicated by a solid line 2007 in FIG. 18 is set. More specifically, a curve projecting downward (concave from the upper side) is set such that it passes through the intermediate position between the distribution area 2003 of the computer gradation area G and the distribution area 2004 of the natural image area I while going around outside the distribution area 2003. The curve passes between the distribution area 2002 of the character/line image area $T_2$ and the distribution area 2004 of the natural image area I.

In FIG. 18, the curve part (nonlinear part) of the boundary line 2007 passes outside the computer gradation area G and the character/line image area $T_2$ that has undergone anti-aliasing. However, the curve does not always pass outside the computer gradation area G and the character/line image area $T_2$ that has undergone anti-aliasing and is preferably obtained by using more samples. In either case, the boundary line 2007 of this embodiment allows to employ lossless encoded data at a high probability for a part with a relatively small code amount, as compared to the simple linear boundary condition 2006, so that the above-described problem can be prevented. The part where the boundary line is nonlinear corresponds to an area where the code lengths of both encoding schemes are short. Hence, the influence on the encoded data amount of the entire image can be reduced.

The boundary condition represented by the solid line 2007 is expressed by Ly=f(Lx).

1. When Ly<f(Lx), the first memory 105 stores lossy encoded data from the first encoding unit 102.
2. When Ly≧f(Lx), the first memory 105 stores lossless encoded data from the second encoding unit 103.

As a result, the computer gradation area contains the encoded data of different encoding schemes at a low probability. This prevents the above-described problem.

The solid line 2007 in FIG. 18 expresses, by using a curve, the section represented by the origin, a point A (≈the maximum value of the lossless encoded data length in the computer gradation area+α), and a point B (the maximum value of the character/line image area $T_2$ that has undergone anti-aliasing and satisfies Ls<Ly+α). The broken line 2006 and solid line 2007 are superimposed in a region where the code lengths are larger than the point B. As a result, when both the lossless encoded data length and the lossy encoded data length are long, encoded data with a short data length is selected. This suppresses any increase in the encoded data amount stored in the first memory 105.

A measure taken when the value of the first counter 111 has exceeded the target code amount Th will be described below. From scanning of the second time, the encoded data amount must be smaller than the encoded data amount of the previous time. The present inventors came up with two approaches. Each approach will be described.

<First Approach>

In the first approach, when quantization matrix $Q_{i-1}$ was used in the previous encoding, a quantization matrix $Q_i$ of a higher level is used in the current scanning and encoding. In addition, the boundary condition is changed. This will be described below in detail.

In FIG. 18, the quantization matrix $Q_0$ set in the first encoding unit 102 is used. FIG. 19 shows the plotted distribution areas of the image areas when the quantization matrix $Q_1$ higher than the quantization matrix $Q_0$ by one level is used.

Since the code length Lx of lossless encoded data does not vary, the distribution areas 2001 to 2004 in FIG. 18 generally shift downward along the vertical axis to distribution areas 2001' to 2004' in FIG. 19. Accordingly, the curve part of the boundary line 2007 in FIG. 18 also generally shifts downward to a boundary line 2007' in FIG. 19.

Let $Q_i$ be the quantization matrix used by the first encoding unit 102. The boundary condition is defined as $f_i(\ )$. A variable i takes values "0", "1", "2", "3", . . . , as shown in FIG. 21. As the variable i becomes large, the curve part of the boundary line indicated by the boundary condition $f_i$ shifts downward.

That is, the process of the encoding sequence control unit 110 is as follows.

1. When Ly<$f_i$(Lx), the first memory 105 stores lossy encoded data from the first encoding unit 102.
2. When Ly≧$f_i$(Lx), the first memory 105 stores lossless encoded data from the second encoding unit 103.

If the quantization matrix used at least in the previous encoding was $Q_{i-1}$, the quantization matrix $Q_i$ is used in the current process. This allows to decrease the encoded data amount stored in the first memory 105 as compared to that in the previous encoding.

<Second Approach>

A hatched area 2010 in FIG. 23 explicitly indicates the area sandwiched between the boundary lines 2006 and 2007 in FIG. 19.

Let Lx be the code length of lossless encoded data obtained from a pixel block and Ly be the code length of lossy encoded data obtained from the pixel block. If the coordinates (Lx,Ly) exist in the area 2010, the first memory 105 stores the lossless encoded data in an amount larger than the lossy encoded data.

It is therefore possible to reduce the encoded data amount stored in the first memory 105 by only reducing the area of the area 2010 without changing the quantization matrix $Q_i$.

To do this, the boundary line 2007 shifts leftward to a boundary line 2007a, as shown in FIG. 24, in scanning of the second time. If the encoded data amount generated at this time has exceeded the target code amount Th, a boundary line 2007b further shifted leftward is employed.

Referring to FIG. 24, the boundary line 2007b passes inside the area 2002. The area 2007b corresponds to an unclear character/line image that has undergone anti-aliasing. A character/line image in a normal document corresponds not to the area 2002 but to the area 2001. Hence, the influence of image quality degradation by encoding is small. However, it is preferable to prevent the boundary line from entering the area 2003 (image by computer graphics). The reason has been described above. In the present invention, however, the boundary line need not always pass outside the area 2003. This is because even when the boundary line slightly enters the area 2003, the possibility of image quality degradation is lower than that upon employing the linear boundary line 2006.

The boundary lines 2007a and 2007b are expressed as lines obtained by shifting the boundary line 2007 leftward. Instead of simply shifting the boundary line 2007, its horizontal scaling factor may be changed, as in the first approach.

As described above, it is possible to reduce the encoded data amount by general shifting the boundary line 2007 leftward without changing the quantization matrix.

<Description of Encoding Environment Setting Principle>

In the second approach, the boundary lines 2007a, 2007b, . . . are defined by shifting the initial boundary line 2007 of the quantization matrix $Q_0$ leftward while satisfying Ly≧Lx. The left shift target is the same even for the initial boundary line of each of the quantization matrixes $Q_1$, $Q_2$, . . . .

The number of times of left shift is defined by a variable j. The boundary condition for lossless/lossy encoded data selection can be specified by the variable j and the variable i that specifies a quantization matrix to be used. That is, the boundary condition can be regarded as a function $f_{i,j}()$ using the variables i and j as parameters.

Hence, the encoding sequence control unit 110 executes the following process.

1. When Ly<$f_{i,j}$(Lx), the first memory 105 stores lossy encoded data from the first encoding unit 102.
2. When Ly≧$f_{i,j}$(Lx), the first memory 105 stores lossless encoded data from the second encoding unit 103.

The encoding sequence control unit 110 calculates the function $f_{i,j}()$ every time the encoded data of a pixel block is generated. However, this increases the load on the encoding sequence control unit 110. In this embodiment, to prevent this, many boundary condition data corresponding to the function $f_{i,j}$(i,j=0, 1, 2, 3, . . . ) are held as the LUT (LookUp Table) 120 in the encoding sequence control unit 110.

The arrangement related to selection of encoded data amount using the LUT 120 and selection of the boundary function $f_{i,j}()$ in the encoding sequence control unit 110 can be implemented by, e.g., an arrangement shown in FIG. 2.

Code length data and the variables i and j are supplied from each of the first code length detection unit 108 and second code length detection unit 109 to the LUT 120 as an address.

The variables i and j can also be regarded as signals to select one of the plurality of tables representing the boundary condition function $f_{i,j}()$ A 1-bit selection signal S is stored in advance at the address position in the LUT 120. For example, "1" is stored at an address position where Ly≧$f_{i,j}$(Lx), and "0" is stored at an address position where Ly<$f_{i,j}$(Lx).

Upon addressing, the bit is output to the first memory control unit 104 as the encoded data selection signal S. The encoded data selection signal S is also supplied as a selection signal for a selector 1210. The selector 1210 outputs selected code length data to the first counter 111. The first counter 111 cumulatively adds data lengths output from the selector 1210.

In scanning/encoding a document, the encoding sequence control unit 110 sets the quantization matrix table $Q_i$ represented by the variable i in the first encoding unit 102. The encoding sequence control unit 110 stores one of the lossless and lossy encoded data in the first memory 105 in accordance with the boundary condition $f_{i,j}()$. In document scanning/encoding of the first time, i=j=0.

Assume that the code amount information (total encoded data amount stored in the first memory 105) held by the first counter 111 has exceeded the target code amount Th. The encoding sequence control unit 110 selects one of boundary conditions $f_{i+1,j}()$ and $f_{i,j+1}()$ adjacent to the current boundary condition and executes re-scanning/re-encoding. In other words, the encoding sequence control unit 110 must decide the values of the variables i and j. The principle to decide the variables i and j will be described below.

The encoding sequence control unit 110 of this embodiment stores encoding process log information in the encoding history recording unit 151 (FIG. 34) every time one pixel block is encoded.

The structure of data stored in the encoding history recording unit 151 is shown in, e.g., FIG. 39. FIG. 2 shows log information when i=a, and j=b.

The first field stores pixel block numbers. A maximum pixel block number Nmax depends on the size of a read document. The second field stores the lossless encoded data length Lx. The third field stores the lossy encoded data length Ly. The fourth field stores the selection signal S (FIG. 2) representing the type of encoded data stored in the first memory 105. The fifth field stores the image determination signal H from the image determination unit 112, and a description thereof will be omitted here.

An area 151a stores a cumulative sum MLS of the lossless encoded data lengths Lx when the lossless encoded data length is selected, i.e., the selection signal S is "1". An area 151b stores a cumulative sum MJP of the lossy encoded data lengths Ly when the selection signal S is "0". That is, the sum of the value MLS held in the area 151a and the value MJP held in the area 151b equals the value held by the first counter 111.

FIG. 39 shows a case wherein the value held by the first counter 111 has exceeded the target code amount Th when encoding of the kth pixel block is ended.

In this case, the encoding sequence control unit 110 executes the following process.

[When MLS<MJP]

This indicates a case wherein the lossy encoded data amount is larger than the lossless encoded data amount. In other words, the lossy encoded data amount is dominant in the whole encoded data. The encoding sequence control unit 110 executes the following process.

1. The encoding sequence control unit 110 outputs an instruction to discard data in the first memory 105 to the first memory control unit 104 and clears the first counter 111 to 0.
2. The encoding sequence control unit 110 sets a quantization matrix $Q_{a+1}$ higher than a previous quantization matrix $Q_a$ by one level in the first encoding unit 102.
3. The encoding sequence control unit 110 sets i=a+1, and j=b in the LUT 120 and changes the boundary condition to be used to $f_{a+1,j}(\ )$.
4. The encoding sequence control unit 110 starts re-scanning/re-encoding the document.

[When MLS≧MJP]

This indicates a case wherein the lossless encoded data amount is larger than the lossy encoded data amount. In other words, the lossless encoded data amount is dominant in the whole encoded data. The encoding sequence control unit 110 executes the following process.

1. The encoding sequence control unit 110 outputs an instruction to discard data in the first memory 105 to the first memory control unit 104 and clears the first counter 111 to 0.
2. The encoding sequence control unit 110 maintains the previous quantization matrix $Q_a$ in the first encoding unit 102.
3. The encoding sequence control unit 110 sets i=a, and j=b+1 in the LUT 120 and sets a boundary condition $f_{a,b+1}(\ )$.
4. The encoding sequence control unit 110 starts re-scanning/re-encoding the document.

According to this embodiment, when encoded data obtained during the encoding process of an image of one page has exceeded the target code amount Th, the variables i and j are decided in accordance with the lossless and lossy encoded data amounts at that time. It is therefore possible to set an optimum encoding environment in accordance with the encoding target image data.

[Description of Utilization of Image Determination Signal H]

The above description contains no mention of the image determination signal H from the image determination unit 112 to help understanding the process of the sixth embodiment. A process using the image determination signal H from the image determination unit 112 will be described below.

As described above, in a character/line image area, encoded data generated by the second encoding unit 103 is selected at a high probability. In a natural image area, encoded data generated by the first encoding unit 102 is selected at a high probability.

However, note that a probability is merely a probability, and exceptions can also occur.

Assume that a normal image of one page containing only characters is encoded and printed. In this case, the upper and lower halves of one character may undergo different encoding processes. As a result, the upper half of the character may have a sharp edge while the lower half does not. This print result may make an observer feel strange. For a character, it is preferable to print it with a sharp edge or, even with slightly poor sharpness, print the edge of the whole character in the same appearance. It is more important to print all characters in the entire page with the same edge.

The image determination unit 112 outputs the image determination signal H representing whether to satisfy Condition (1).

Condition (1) indicates whether the resolution conversion error before and after resolution conversion of a 16×16 pixel block is large, and the number of colors contained in the 16×16 pixels can be regarded as "2". That is, Condition (1) determines whether an image is at least a character image.

In the sixth embodiment, if the image determination signal H from the image determination unit 112 is "1", this is forcibly added to the determination criteria to select one of the lossless and lossy encoded data. During encoding of one page, the selection target is fixed.

In the sixth embodiment, when the image determination signal is "1", lossless encoded data is selected unconditionally in the initial state. If the image determination signal is "H", and conditions to be described later are satisfied, conversely, lossy encoded data is selected unconditionally.

To do this, a variable FLAG to determine the initial state is prepared. FLAG=0 is set in encoding an image of one page for the first time.

That is, when FLAG=0, and the image determination signal H="1", the selection signal S is generated to store lossless encoded data from the second encoding unit 103 in the first memory 105.

When FLAG=1, and the image determination signal H="1", the selection signal S is generated to store lossy encoded data from the first encoding unit 102 in the first memory 105.

The encoding sequence control unit 110 of the sixth embodiment controls the encoding process in the following way. The following explanation will be done letting Lx be the code length of lossless encoded data of a 16×16 pixel block, and Ly be the code length of lossy encoded data of an 8×8 pixel block obtained by converting the resolution of the 16×16 pixel block, as described above.

[First Encoding of Target Image Data]

The encoding sequence control unit 110 sets the encoding parameters i, j, and FLAG to "0". The encoding sequence control unit 110 sets the quantization matrix $Q_0$ in the first encoding unit 102 as an initial value. The first encoding unit 102 and second encoding unit 103 start encoding image data from the input unit 101.

The encoding sequence control unit 110 decides encoded data to be stored in the first memory 105 in accordance with the following conditions.

Condition A: when image determination signal H is "1"

The first memory 105 unconditionally stores lossless encoded data generated by the second encoding unit 103.

Condition B: when image determination signal H is "0"

When $Ly<f_{0,0}(Lx)$, the first memory 105 stores lossy encoded data generated by the first encoding unit 102.

When $Ly≧f_{0,0}(Lx)$, the first memory 105 stores lossless encoded data generated by the second encoding unit 103.

Note that both the conditions A and B assume that FLAG=0 because it is the first scanning.

[From Second Encoding]

In this case, the value held by the first counter 111 has exceeded the target code amount during the first or previous encoding.

For the sake of simplicity, a description will be done below assuming that the value held by the first counter 111 has exceeded the target code amount Th when the kth pixel block is ended, as shown in FIG. 39, during the first encoding. That is, a=b=0, and FLAG=0 in FIG. 39.

Let M0 be the encoded data amount (the value held by the first counter 111) stored in the first memory 105 when encoding of the kth pixel block is ended. At this time, M0 has the following relationship with respect to MLS and MJP stored in the encoding history recording unit 151 in FIG. 39.

$$M0=MLS+MJP$$

The lossless encoded data amount MLS includes two types. One is an encoded data amount when lossless encoded data is forcibly selected in accordance with the condition A (the image determination signal H is "1"). This will be defined as MLS (H1). The other is a code amount when "Ly$\geq$f$_{0,0}$(Lx)" is satisfied under the condition B (the image determination signal H is "0"). This will be defined as MLS(H0). That is, $$MLS=MLS(H1)+MLS(H0)$$

The image determination signal H is "1" or "0". In the example shown in FIG. 39, MLSH1 is given by $$MLSH1=\Sigma Lx(b)\times H(b)$$

where $\Sigma$ is the addition function of the variable b=1, 2, ..., k. MLSH0 is simply given by $$MLSH0=MLS-MLSH1$$

In this embodiment, one of MJP, MLS(H1), and MLS(H0), which exhibits the maximum value, is selected, and the encoding parameters to be used in the next scanning/encoding are decided. Theoretically, MJP=MLS(H1)=MLS(H0) is also possible. In this case, the process is done by setting a priority order of MJP<MLS(H0)<MLS(H1).

The encoding history recording unit 151 may have an area to store MJP, MLS(H1), and MLS(H0). In this case, MJP, MLS(H1), and MLS(H0) are updated every time encoding of one pixel block is ended. Hence, the above calculation is unnecessary.

Note that the above-described case assumes FLAG=0. When FLAG=1, and the image determination signal H is "1", lossy encoded data is forcibly selected. Hence, MLS(H1) is always "0", i.e., minimum.

<When MLS(H1) is Maximum>

This indicates the amount of lossless encoded data when FLAG=0, and the image determination signal H is "1" is the largest in the encoded data stored in the first memory 105.

In the sixth embodiment, scanning/encoding is executed again while maintaining the current encoding parameters i and j. Without any change, only the same result as the previous process is obtained. To prevent this, the condition is changed to select lossy encoded data from the first encoding unit 102 when the image determination signal H is "1" in the next scanning/encoding. That is, FLAG is updated to 1. The process of the encoding sequence control unit 110 is as follows.

1. The encoding sequence control unit 110 outputs an instruction to discard data in the first memory 105 to the first memory control unit 104 and clears the first counter 111 to 0.
2. The encoding parameters i and j are not changed. Hence, the encoding sequence control unit 110 maintains the quantization matrix Q$_a$ of the previous scanning/encoding in the first encoding unit 102 and maintains the boundary condition f$_{a,b}$( ).
3. The encoding sequence control unit 110 sets the variable FLAG to "1".
4. The encoding sequence control unit 110 starts re-scanning/re-encoding the document.

In re-scanning/re-encoding of an image, if the image determination signal H is "1", the selection signal S to unconditionally store lossy data in the first memory 105 is output.

From then on, the value of FLAG maintains "1" until final encoded data of the page of interest is obtained.

Hence, the process <When MLS(H1) is Maximum> described here is executed only once during encoding of the page of interest.

<When MLS(H0) is Maximum>

This indicates the amount of lossless encoded data stored upon determining "Ly$\geq$f$_{a,b}$(Lx)" is the largest in the encoded data stored in the first memory 105.

In this case, the encoding sequence control unit 110 executes the process in accordance with the above-described procedure. This will be explained again.

1. The encoding sequence control unit 110 outputs an instruction to discard data in the first memory 105 to the first memory control unit 104 and clears the first counter 111 to 0.
2. The encoding sequence control unit 110 maintains the previous quantization matrix Q$_a$ in the first encoding unit 102.
3. The encoding sequence control unit 110 sets the encoding parameters i and j to i=a, and j=b+1 in the LUT 120 and sets the boundary condition to be used to f$_{a,b+1}$( ).
4. The encoding sequence control unit 110 starts re-scanning/re-encoding the document.

As a result, re-scanning/re-encoding of the image starts. Encoded data to be selected when the image determination signal H changes to "1" during encoding is decided depending on the variable FLAG.

<When MJP is Maximum>

This indicates the amount of loss encoded data stored upon determining "Ly<f$_{a,b}$(Lx)" is the largest in the encoded data stored in the first memory 105.

In this case, the encoding sequence control unit 110 executes the process in accordance with the above-described procedure. This will be explained again.

1. The encoding sequence control unit 110 outputs an instruction to discard data in the first memory 105 to the first memory control unit 104 and clears the first counter 111 to 0.
2. The encoding sequence control unit 110 sets the quantization matrix Q$_{a+1}$ higher than the previous quantization matrix Q$_a$ by one level in the first encoding unit 102.
3. The encoding sequence control unit 110 sets the encoding parameters i and j to i=a+1, and j=b in the LUT 120 and changes the boundary condition to be used to f$_{a+1,j}$( )
4. The encoding sequence control unit 110 starts re-scanning/re-encoding the document.

As a result, re-scanning/re-encoding of the image starts. Encoded data to be selected when the image determination signal H changes to "1" during encoding is decided depending on the variable FLAG. When FLAG=1, MJP includes the amount of lossy encoded data selected because the image determination signal H is "1", and the amount of lossy encoded data selected because the image determination signal H is "0", and Ly<f$_{a,b}$(Lx).

Figure 35:
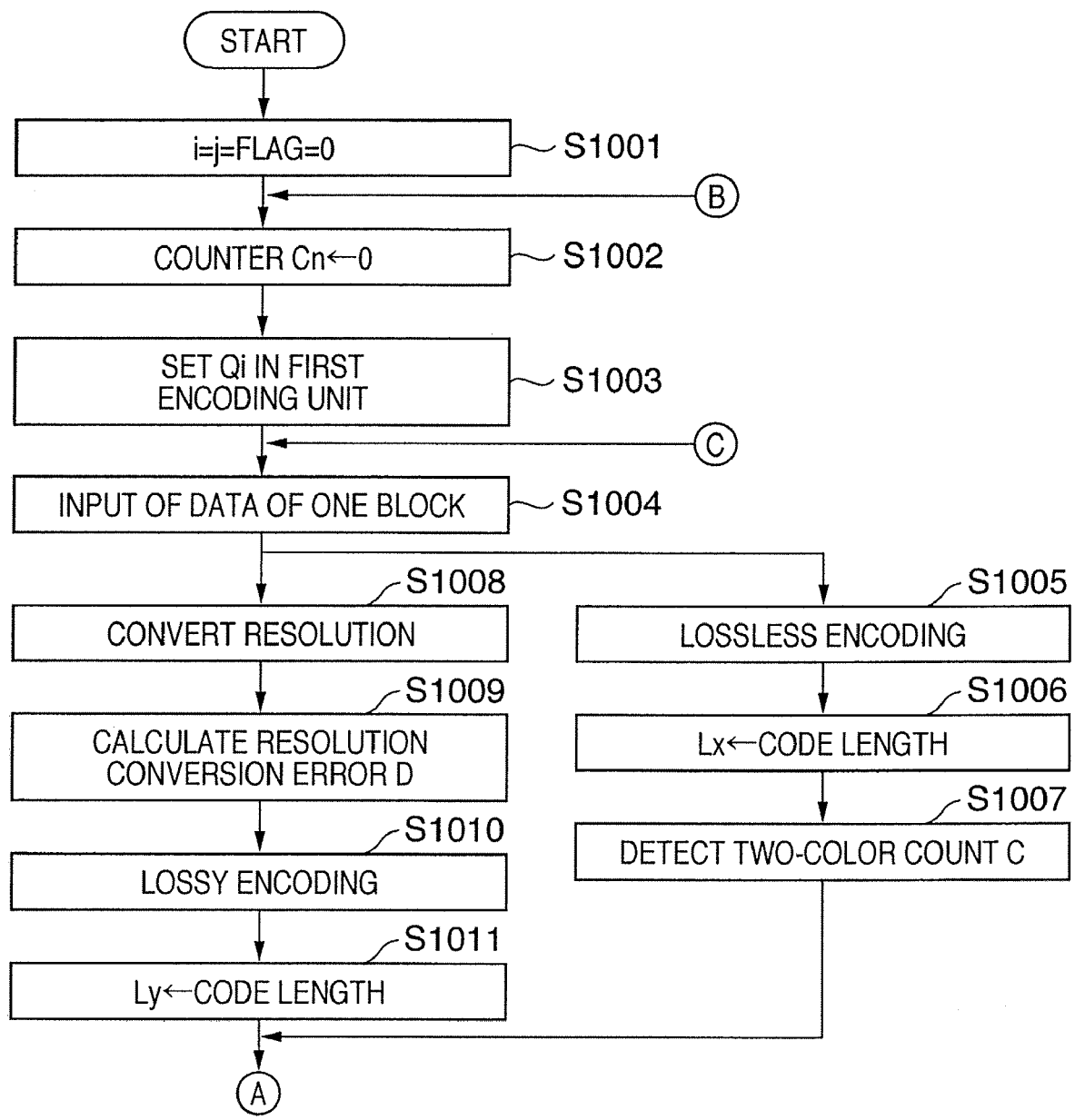
FIG. 35 is a flowchart showing an encoding process procedure according to the sixth embodiment.
Figure 36:
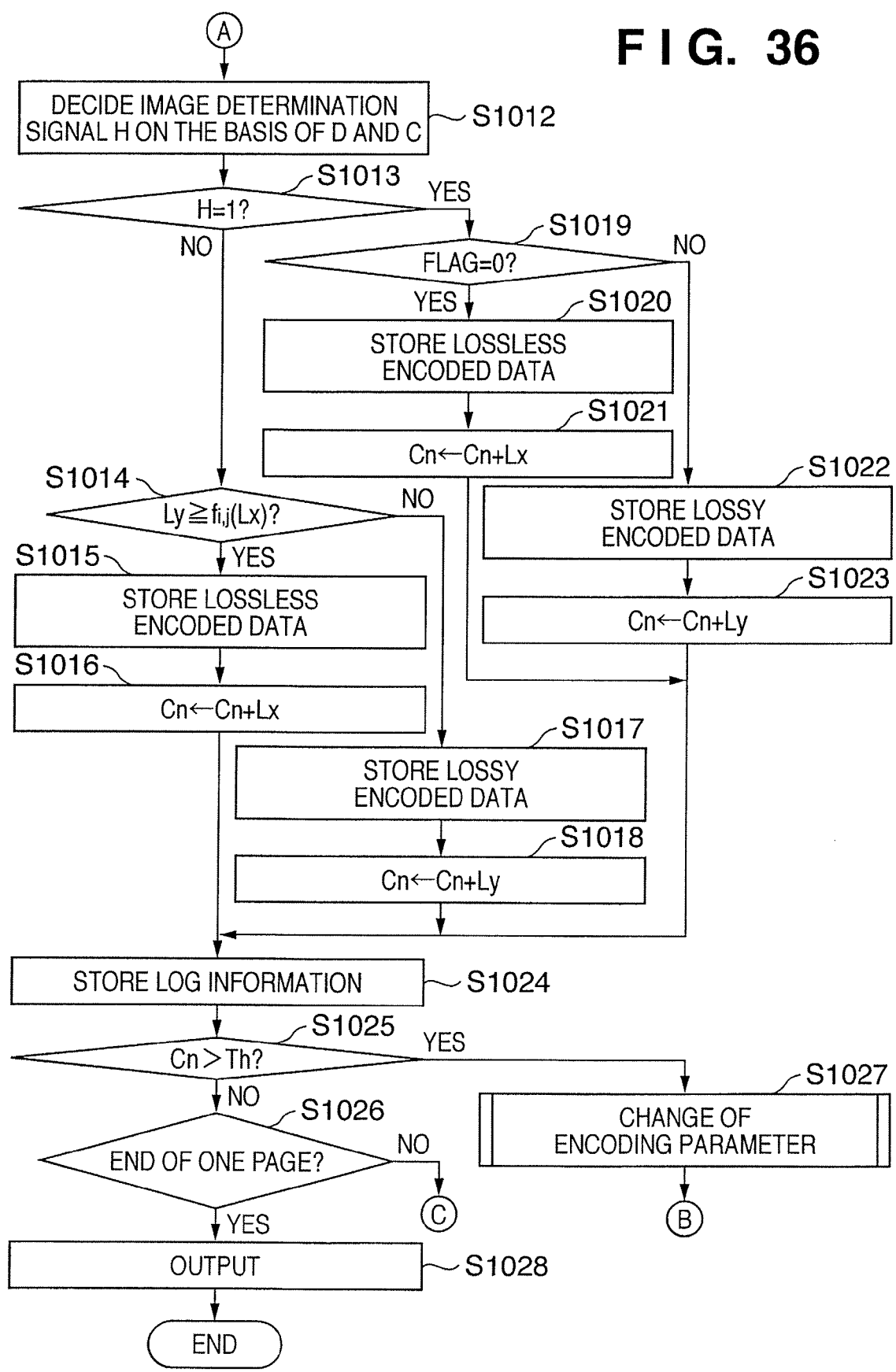
FIG. 36 is a flowchart showing an encoding process procedure according to the sixth embodiment.
Figure 37:
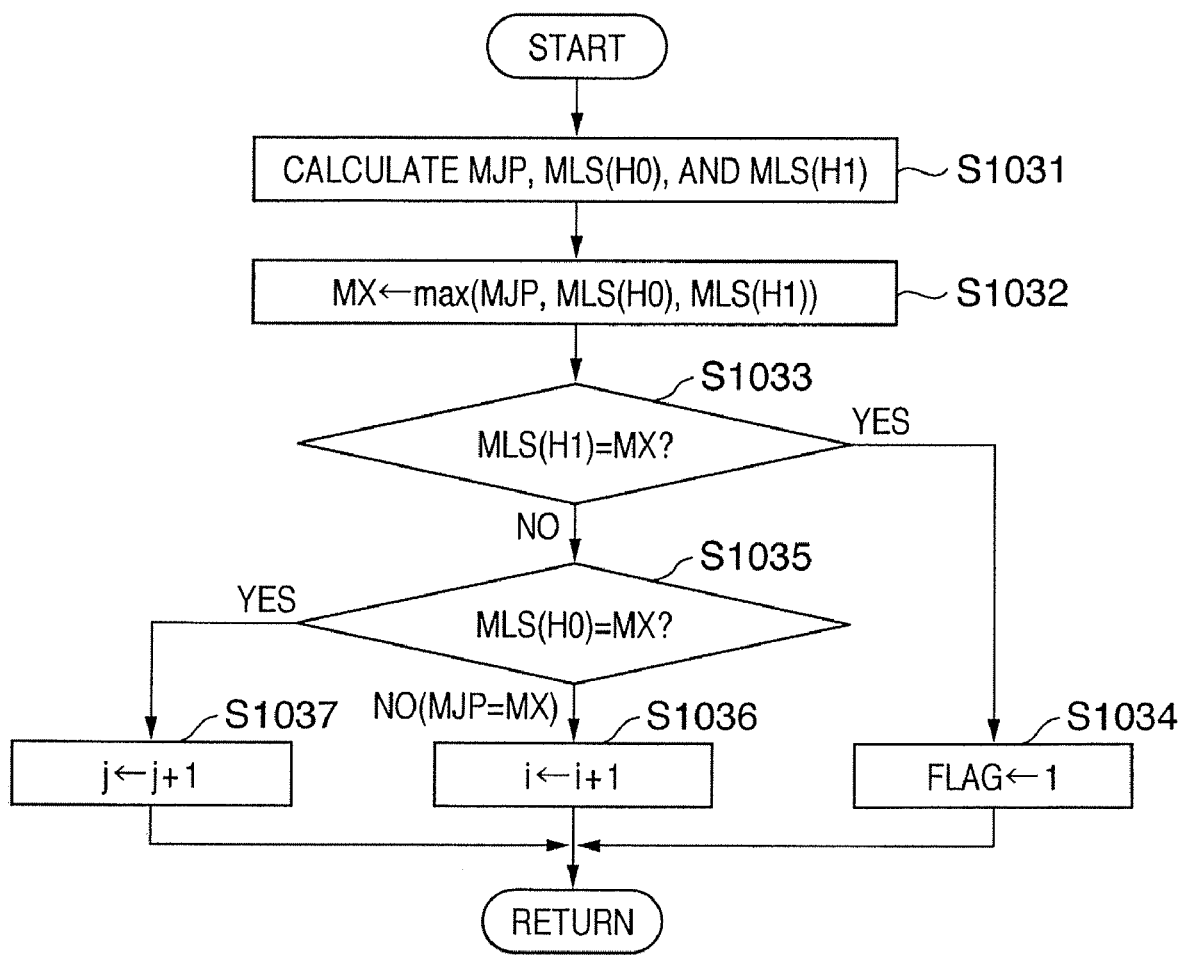
FIG. 37 is a flowchart showing an encoding process procedure according to the sixth embodiment.

To implement the above process, the encoding sequence control unit 110 executes the process in accordance with the flowcharts in FIGS. 35 to 37.

In step S1001, the encoding sequence control unit 110 sets an initial value "0" to the variables i, j, and FLAG. In step S1002, a variable Cn corresponding to the first counter 111 is cleared to 0.

In step S1003, the encoding sequence control unit 110 sets the quantization matrix table Q$_i$ in the first encoding unit 102. In the first encoding, i=0. Hence, the quantization matrix table Q$_0$ is set in the first encoding unit 102. At this time, the encoding history recording unit 151 is cleared.

In step S1004, the data of one pixel block (partial image data containing 16×16 pixels) is input.

In step S1005, the first encoding unit 102 executes lossless encoding. In step S1006, the resultant encoded data length Lx is obtained. During this encoding process, the count C (to be referred to as the two-color count C hereinafter) representing how many times the number of colors in the pixels around the pixel of interest as the encoding target becomes "2" during encoding is counted.

In parallel to the lossless encoding, the encoding sequence control unit 110 executes the process in steps S1008 to S1011.

In step S1008, the 16×16 pixel block is converted into an 8×8 pixel block by resolution conversion. In step S1009, the resolution conversion error D is calculated. In step S1010, lossy encoding is executed. In step S1011, the resultant encoded data length Ly is obtained.

In FIG. 35, the process in steps S1005 to S1007 and that in steps S1008 to S1011 are executed in parallel. The same sequence is possible if it is implemented by a computer program, and a multitasking OS runs. If a single-tasking OS is used, steps S1005, S106, S1007, S1008, S1009, S1010, and S1011 are executed in this order.

When lossless encoding and lossy encoding of the pixel block of interest are ended, the process advances to step S1012 (FIG. 36).

In step S1012, the image determination signal H is calculated on the basis of the two-color count C and resolution conversion error D. More specifically, If D>Th1, and C>Th2, then H=1

Otherwise, H=0

In step S1013, the encoding sequence control unit 110 determines whether the image determination signal H is "1". If it is determined that H=0, the process advances to step S1014.

In step S1014, the encoding sequence control unit 110 determines whether "Ly≧$f_{i,j}$(Lx)" is satisfied. If YES in step S1014, the first memory 105 stores lossless encoded data in step S1015. In step S1016, the code length Lx is added to the counter Cn.

If it is determined in step S1014 that "Ly<$f_{i,j}$(Lx)", the first memory 105 stores lossy encoded data in step S1017. In step S1018, the code length Ly is added to the counter Cn.

If it is determined in step S1013 that the image determination signal H is "1", the process advances to step S1019 to determine whether FLAG is "0".

If YES in step S1019, the first memory 105 stores lossless encoded data in step S1020. In step S1021, the code length Lx is added to the counter Cn.

If it is determined that FLAG is "1", the first memory 105 stores lossy encoded data in step S1022. In step S1023, the code length Ly is added to the counter Cn.

When encoded data storage in the first memory 105 is thus ended, the process advances to step S1024 to store the encoding history information (Lx, Ly, selection signal S, and image determination signal H in this embodiment) of the pixel block of interest in the encoding history recording unit 151.

In step S1025, the encoding sequence control unit 110 determines whether the counter Cn has exceeded the threshold as the target code amount Th.

If it is determined that Cn≦Th, the process advances to step S1026 to determine whether the process of the final pixel block of one page is ended. If NO in step S1026, the process from step S1004 is repeated.

If it is determined in step S1025 that Cn>Th, i.e., the generated encoded data amount has exceeded the target code amount during encoding of one page, the process advances to step S1027 to update the encoding parameters i, j, and FLAG (this will be described later in detail). The process returns to step S1002 to start re-input and re-encoding for the first pixel of the page.

If the image of one page is encoded while maintaining Cn≦Th, step S1026 is determined as YES. In this case, the process advances to step S1028 to write the encoded data stored in the first memory 105 in the secondary storage device 7 as a file, and the process is ended.

The process in step S1027 will be described with reference to the flowchart in FIG. 37.

In step S1031, MJP, MLS(H0), and MLS(H1) are calculated by referring to the encoding history recording unit 151.

Next, a value MX as the maximum value of MJP, MLS (H0), and MLS(H1) is obtained.

$$MX = \max(MJP, MLS(H0), \text{ and } MLS(H1))$$

In step S1033, the encoding sequence control unit 110 determines whether MLS(H1)=MX, i.e., MLS(H1) is maximum in MJP, MLS(H0), and MLS(H1). If YES in step S1033, the process advances to step S1034 to set FLAG as one of the encoding parameters to "1". Note that once FLAG is set to "1", step S1033 is always determined as NO during encoding of the page of interest, as described above.

If NO in step S1033, the process advances to step S1035 to determine whether MLS(H0)=MX, i.e., MLS(H0) is maximum in MJP, MLS(H0), and MLS(H1). If YES in step S1035, the process advances to step S1037 to increment the variable j by "1" to shift the boundary line 2007 leftward.

If NO in step S1035, i.e., it is determined that MJP is maximum in MJP, MLS(H0), and MLS(H1), the process advances to step S1036 to increment the variable i by "1" to update the quantization matrix $Q_i$ to $Q_{i+1}$.

As described above, according to the sixth embodiment, first, a 16×16 pixel block is losslessly encoded. On the other hand, an 8×8 pixel block is generated by converting the resolution of the 16×16 pixel block and lossy-encoded. The code amounts are compared, and one of them is selected. This allows to easily select lossy encoded data for an image in a natural image area and lossless encoded data for a character/line image without providing any special image area determination circuit. It is also possible to decrease the generated encoded data amount.

According to the sixth embodiment, if the code amount has exceeded the target code amount Th, at least one of the encoding parameters i, j, and FLAG, and the image data is re-input and re-encoded. This also allows to generate encoded data in the target code amount Th or less.

If the difference before and after resolution conversion of each pixel block is large, and the number of colors contained in the pixel block is almost two, only one of lossless encoding and lossy encoding is selected throughout the page. Hence, the edge of an image such as a character/line image can maintain almost the same state so that an output result without any sense of incompatibility can be obtained.

Seventh Embodiment

In the sixth embodiment, when the encoded data amount (the value of the first counter 111) stored in the first memory 105 has exceeded the target code amount Th, the lossless encoded data amounts MLS(H0) and MLS(H1) and lossy encoded data amount MJP in the encoded data are compared. The encoding parameters i, j, and FLAG of the next scanning are decided in accordance with the comparison result. In the seventh embodiment, an example of more accurate decision of encoding parameters i and j will be described.

The encoding parameters FLAG is decided in the same procedure as in the sixth embodiment. For the descriptive convenience, a case wherein FLAG=1 will be described.

A first memory 105 stores lossy encoded data when FLAG=1, or when FLAG=0, and Ly<$f_{i,j}$(Lx). At this time, MLS(H1) is always "0" so that MLS=MLS(H1) is satisfied. Hence, MJP and MLS will be mentioned in the following description.

Prior to the description, assume that when $f_{i,j}(\ )$ changes to $f_{i+1,j}(\ )$, a statistical decrement $R((i,j), (i+1,j))$ of the lossy encoded data length with respect to the pixel block is obtained. When $f_{i,j}(\ )$ is used, the average lossy encoded data length of the pixel block is defined as $C(f_{i,j}(\ ))$. The decrement $R((i,j),(i+1,j))$ at this time is given by $$R((i,j), (i+1,j))=C(f_{i+1,j}(\ ))/C(f_{i,j}(\ ))$$

Similarly, assume that when $f_{i,j}(\ )$ changes to $f_{i,j+1}(\ )$, a statistical decrement $R((i,j), (i,j+1))$ of the lossy encoded data length is obtained. Also, assume that when $f_{i,j}(\ )$ changes to $f_{i+1,j+1}(\ )$, a statistical decrement $R((i,j),(i+1,j+1))$ of the lossy encoded data length is obtained in advance.

Assume that the encoded data amount stored in the first memory 105 has exceeded a target code amount Th during encoding under the boundary condition $f_{i,j}(\ )$. In this case, an encoding sequence control unit 110 of the seventh embodiment selects one of $f_{i+1,j}(\ )$, $f_{i,j+1}(\ )$, and $f_{i+1,j+1}(\ )$. That is, the encoding parameters i and j are decided.

The apparatus arrangement is the same as in FIG. 22. An encoding processing unit 6 also has the same arrangement as in FIG. 34. Different points are the process contents of the encoding sequence control unit 110 and the structure of data stored in an encoding history recording unit 151.

FIG. 40 shows an example of the data structure in the encoding history recording unit 151 according to the seventh embodiment. FIG. 40 is different from FIG. 39 in that the sixth to 11th fields are added. The first to fifth fields are the same as in FIG. 39.

In storing encoded data of one pixel block in the first memory 105, the encoding sequence control unit 110 of the seventh embodiment executes the following process.

1. The encoding sequence control unit 110 obtains values Ly', Ly", and Ly'" by multiplying lossy encoded data Ly of a pixel block of interest by the decrements $R((i,j),(i+1,j))$, $R((i,j),(i,j+1))$, and $R((i,j),(i+1,j+1))$ and stores the values Ly', Ly", and Ly'" in the sixth, eighth, and 10th fields as predicted encoded data lengths.
2. The encoding sequence control unit 110 stores predicted selection signals S', S", and S'" in the seventh, ninth, and 11th fields.

The processes 1 and 2 are done in step S1024 in FIG. 36.

To obtain the selection signals S', S", and S'", a pseudo selection signal S is generated by using the arrangement shown in FIG. 2. A lossless encoded data amount Lx does not change because it does not depend on the number of times of scanning.

The data stored in the encoding history recording unit 151 by the encoding sequence control unit 110 of the seventh embodiment are obtained in the following way.
Ly'=Ly×R((i,j),(i+1,j))
  When Ly'<Lx, then S'=0
  When Ly'≧Lx, then S'=1
Ly"=Ly×R((i,j), (i,j+1)
  When Ly"<Lx, then S"=0
  When Ly"≧Lx, then S"=1
Ly'"=Ly×R((i,j),(i+1,j+1))
  When Ly'"<Lx, then S'"=0
  When Ly'"≧Lx, then S'"=1

The example shown in FIG. 40 indicates that the value of the first counter 111 has exceeded the target code amount when the kth pixel block is encoded.

When the first to kth pixel blocks are encoded, the lossless encoded data amount is given by MLS, and the lossy encoded data amount is given by MJP. The value of the first counter 111 is given by Value of first counter 111=MLS+MJP    (2)

Assume that encoding of one page is interrupted halfway, and the (k+1)th and subsequent images are input in accordance with the same procedure as that until the kth image. A predicted total encoded data amount Mtotal of one page upon ending encoding of all pixel blocks of the page is given by Mtotal=(MLS+MJP)×Nmax/k A predicted encoded data amount Mtotal' of one page under the boundary condition $f_{i+1,j}(\ )$ is given by Mtotal'=(MLS'+MJP')×Nmax/k    (3)

where MLS' is the sum of lossless encoded data lengths Lx( ) when the predicted selection signal S'=1, and MJP' is the sum of lossy encoded data lengths Ly'( ) when the predicted selection signal S'=0.

Similarly, a predicted encoded data amount Mtotal" under the boundary condition $f_{i,j+1}(\ )$ and a predicted encoded data amount Mtotal'" under the boundary condition $f_{i+1,j+1}(\ )$ can also be obtained.

In the seventh embodiment, one of the obtained predicted encoded data amounts Mtotal', Mtotal", and Mtotal'", which has the minimum absolute value of the difference from the target code amount Th is selected. The variables i and j at this time are decided as the encoding parameters of the next scanning/encoding.

If the table shown in FIG. 40 is already formed, it is possible to almost instantaneously calculate MLS' and MJP'. However, to increase the calculation speed, MLS' and MJP' need to be updated upon obtaining the predicted value Ky' or predicted selection signal S'.

In the seventh embodiment, when the actual encoded data amount obtained by setting the encoding parameters i=a and j=b has exceeded the target code amount Th, the encoding parameters of the re-scanning/re-encoding are selected from the three sets "i=a+1, j=b", "i=a, j=b+1", and "i=a+1, j=b+1". However, the encoding parameters may be selected from the two sets "i=a+1, j=b" and "i=a, j=b+1", as in the sixth embodiment.

Figure 41:
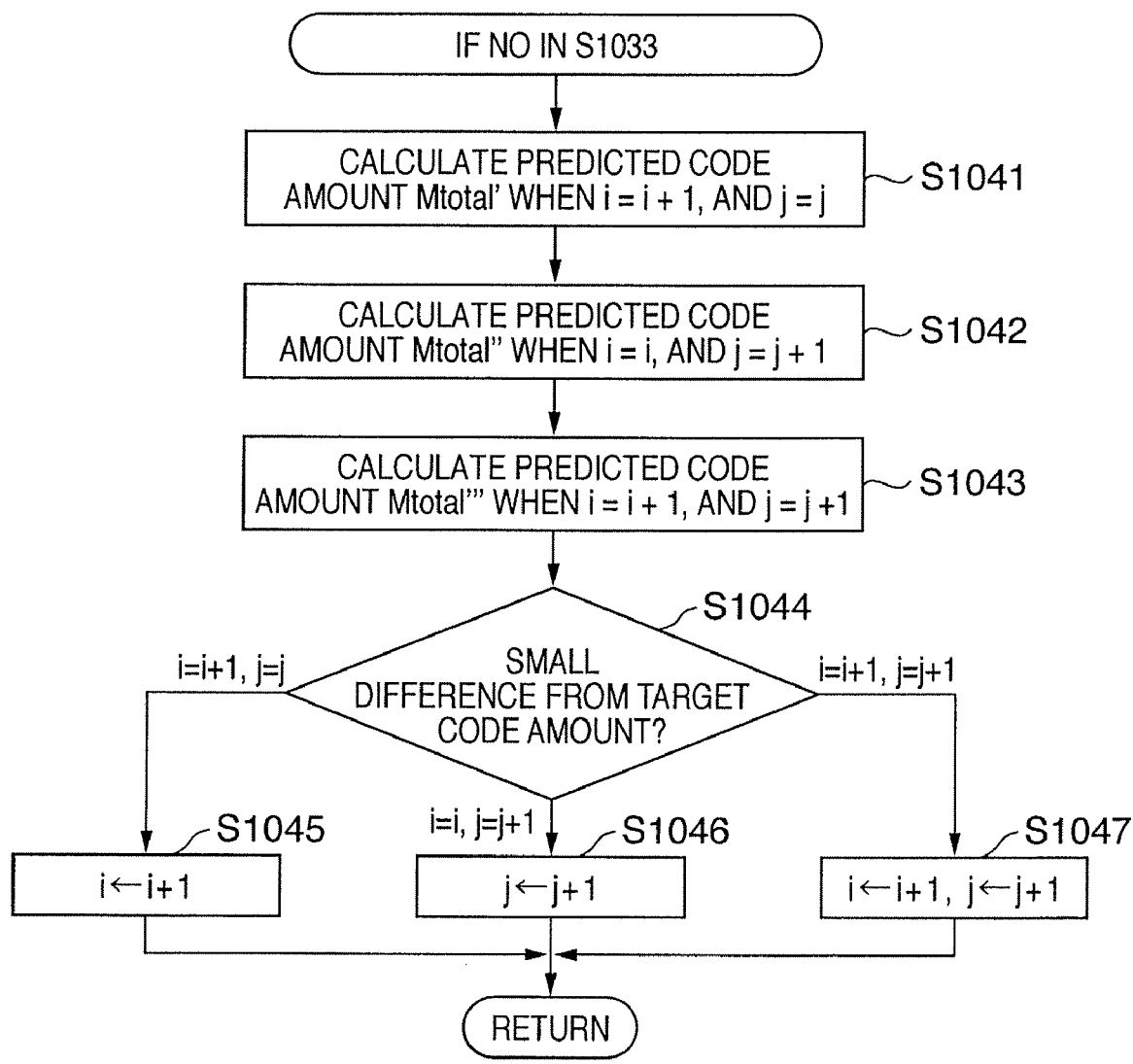
FIG. 41 is a flowchart showing an encoding parameter change process procedure according to the seventh embodiment.

The encoding sequence control unit 110 of the seventh embodiment decides the encoding parameters in accordance with the flowchart in FIG. 41 in place of steps S1035 to S1037 after NO in step S1033 in FIG. 37.

In steps S1041 to S1043, Mtotal', Mtotal", and Mtotal'" are calculated in the above-described manner. In step S1044, one of Mtotal', Mtotal", and Mtotal'", which has the minimum absolute value of the difference from the target code amount Th, is determined.

If Mtotal' has the minimum absolute value of the difference from the target code amount Th, only the variable i is incremented by "1" without changing the variable j (step S1045). If Mtotal" has the minimum absolute value of the difference from the target code amount Th, only the variable j is incremented by "1" without changing the variable i (step S1046). If Mtotal'" has the minimum absolute value of the difference from the target code amount Th, both the variables i and j are incremented by "1".

As described above, according to the seventh embodiment, it is possible to more accurately decide the encoding parameters i and j than in the sixth embodiment. Consequently, it is also possible to decrease the number of times of scanning, as compared to the sixth embodiment.

When the second re-scanning/re-encoding starts, the encoding history recording unit 151 stores predicted information for the third re-scanning/re-encoding.

Eighth Embodiment

In the seventh embodiment, the predicted encoded data amounts Mtotal', Mtotal", and Mtotal'" of one page are obtained, and re-encoding is executed by using encoding parameters corresponding to the data amount closest to the target code amount. In the eighth embodiment, an example will be described in which the encoding parameters are decided depending on the encoding target image. The apparatus arrangement is the same as in the sixth embodiment.

An encoding parameter FLAG is decided in the same way as in the sixth embodiment. For the descriptive convenience, a case wherein FLAG=1 will be described. As described in the seventh embodiment, a relationship MLS=MLS(H1) holds. MJP and MLS will be described below.

The structure of data stored in an encoding history recording unit 151 is the same as in the seventh embodiment. The predicted code amounts and predicted selection signals of lossy encoded data amount Ly are obtained in correspondence with all encoding parameters i and j.

FIGS. 25 to 27 show the boundary lines of boundary conditions $f_{i,j}(\ )$ which are specified by the variables i (also serving as a variable to decide a quantization matrix $Q_i$) and j stored in an LUT 120. FIGS. 25 to 27 illustrate an example of nine boundary lines which are two-dimensionally arrayed. However, the number of boundary lines is not limited to this. Fundamentally, the vertical coordinate position of a point A (FIG. 18) shifts downward as the variable i increases (line 2502 in FIG. 25) and shifts leftward as the variable j increases (line 2502 in FIG. 25). FIGS. 25 to 27 are the same except the order indicated by P0 to P8. The priority order information in FIGS. 25 to 27 is stored in an encoding sequence control unit 110.

As described in the seventh embodiment, when the data amount has exceeded a target code amount Th during encoding using encoding parameters i=a, and j=b, the lossless encoded data amount is given by MLS, and the lossy encoded data amount is given by MJP.

MLS and MJP of the eighth embodiment and FIGS. 25 to 27 will be described below. In the following explanation, a coefficient α is a positive value smaller than 1. For example, α=0.6. For the descriptive convenience, assume that the current encoding parameters are i=0, and j=0.

[When MLS<MJP×α]

In this case, the lossy encoded data amount MJP is much larger than the lossless encoded data amount MLS. That is, in the encoding target image data, the occupied area of a natural image is large, whereas the occupied area of a character/line image is small. In re-scanning/re-encoding, it is preferable to preferentially increase the variable i. Hence, the encoding parameters i and j to be used for re-scanning/re-encoding are decided in accordance with the priority order P0, P1, P2, . . . in FIG. 25.

[When MLS×α≧MJP]

In this case, the lossless encoded data amount MLS is much larger than the lossy encoded data amount MJP. That is, in the encoding target image data, the occupied area of a character/line image is large, whereas the occupied area of a natural image is small. This can be regarded as a document with a normal text description. In re-scanning/re-encoding, it is preferable to preferentially increase the variable j. Hence, the encoding parameters i and j to be used for re-scanning/re-encoding are decided in accordance with the priority order P0, P1, P2, . . . in FIG. 26.

[When MLS×α<MJP≦MLS/α]

In this case, the lossless encoded data amount MLS almost equals the lossy encoded data amount MJP. That is, the encoding target image data contains both a character/line image and a natural image whose occupation ratios are almost the same. In re-scanning/re-encoding, it is preferable to increase both the variables i and j at almost the same weighting. Hence, the encoding parameters i and j to be used for re-scanning/re-encoding are decided in accordance with the priority order P0, P1, P2, . . . in FIG. 27.

A process will be described here, which is executed when the encoded data amount (the value of the first counter 111) has exceeded the target code amount Th during encoding using the encoding parameters i=0 and j=0, and "MLS<MJP×α" holds between MLS and MJP.

In this case, the predicted code amount of one page is obtained in accordance with the priority order shown in FIG. 25. The predicted code amount can be obtained by equation (3) in the seventh embodiment.

In the eighth embodiment, the encoding parameters i and j are represented by priority orders Pz (z=0, 1, 2. . . ). The lossless encoded data amount and lossy encoded data amount decided by the priority order Pz when the data amount has exceeded the target code amount Th are defined as MLSz and MJPz, respectively. In this case, a predicted total encoded data amount Mpz when one page is encoded by using encoding parameters represented by the priority order Pz is given by $$Mpz = (MLSz + MJPz) \times N\max/k \quad (4)$$

As described above, the predicted encoded data amount Mpz is nothing but a predicted value and does not always match the encoded data amount obtained by actual scanning/encoding using the encoding parameters. Hence, an allowable value β (positive value) is added to modify equation (4) to $$Mpz \leq (MLSz + MJPz) \times N\max/k + \beta \quad (5)$$

In the eighth embodiment, 1, 2, . . . are sequentially given to z of the priority orders shown in FIG. 25. The variable z that satisfies equation (5) first is obtained. Re-scanning/re-encoding is executed by using encoding parameters represented by the variable z. For example, when z=4, re-scanning/re-encoding is executed by using the encoding parameters i=1, and j=1. If the encoded data amount has exceeded the target code amount Th again, the encoding parameters are decided from the priority order P5. Note that when the encoded data amount has exceeded the target code amount Th for the first time, and the priority orders in FIGS. 25 to 27 are decided, the priority orders are not changed. That is, during encoding of an image of one page, the priority orders in FIGS. 25 to 27 are not selected every time.

The above-described process of the encoding sequence control unit 110 according to the eighth embodiment will be summarized below.

In step S1024 in FIG. 36, the predicted lossy encoded data amounts and the predicted selection signals are stored in correspondence with all possible combinations of the encoding parameters i and j. In the eighth embodiment, only the process after NO in step S1033 in FIG. 37 changes, as in the seventh embodiment.

Figure 42:
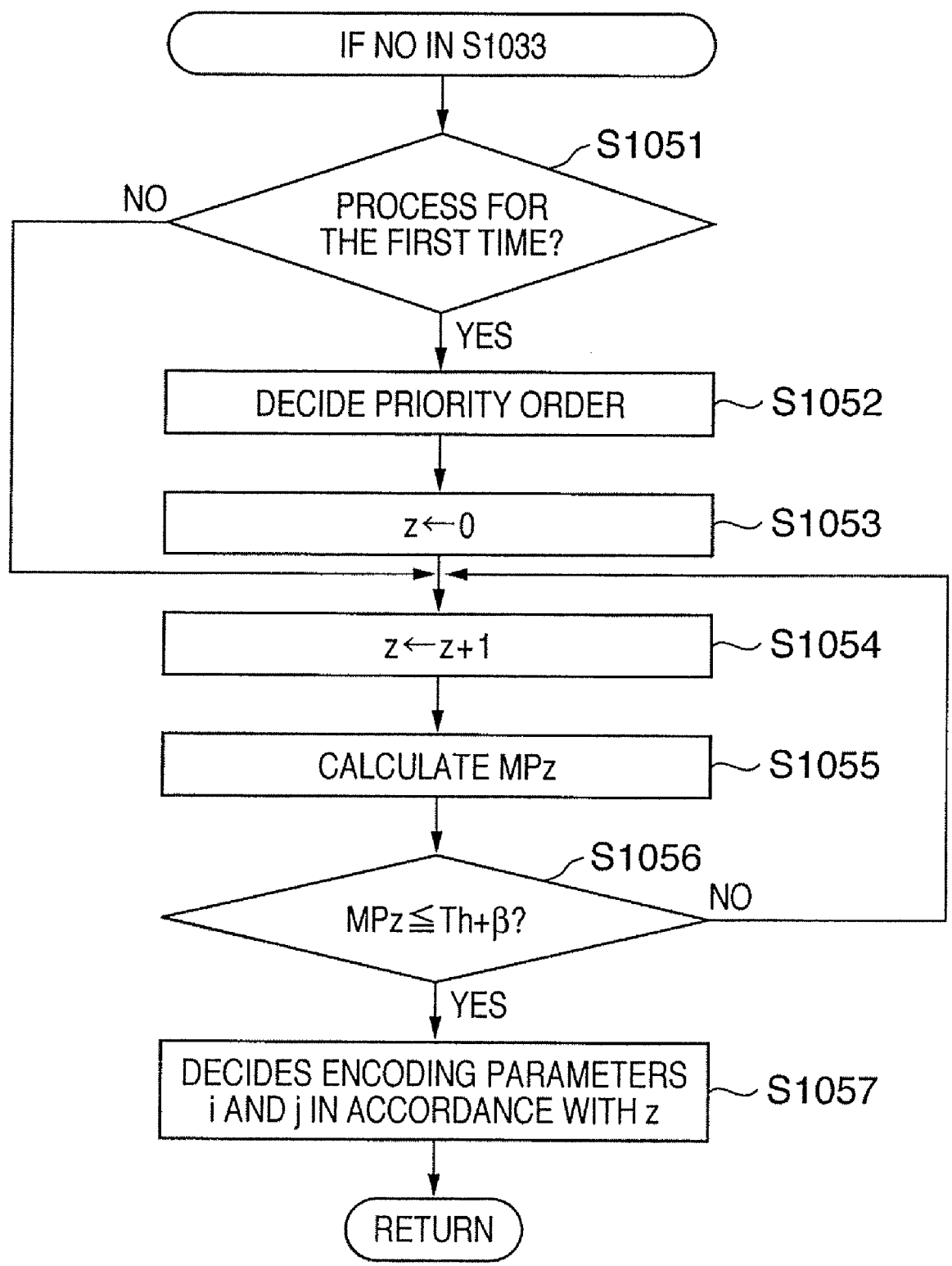
FIG. 42 is a flowchart showing an encoding parameter change process procedure according to the eighth embodiment.

In the eighth embodiment, if No in step S1033 in FIG. 37, the subsequent process is executed in accordance with the flowchart in FIG. 42.

In step S1051, it is determined whether this process is executed for the first time. This determination can be done by determining whether all the encoding parameters i, j, and FLAG are "0".

If it is determined in step S1051 that "this process is executed for the first time", the process advances to step S1052 to determine the relationship between the lossless encoded data amount MLS and the lossy encoded data amount MJP of the current encoded data and decide the priority order.

When MLS<MJP×α, the priority order is decided to preferentially decrease the code amount of lossy encoding. In this embodiment, the priority order in FIG. 25 is decided.

When MLS×α≧MJP, the priority order is decided to preferentially decrease the code amount of lossless encoding. In this embodiment, the priority order in FIG. 26 is decided.

When MLS×α<MJP≦MLS/α, the priority order is decided to decrease both the code amount of lossless encoding and that of lossy encoding. In this embodiment, the priority order in FIG. 27 is decided.

In step S1053, the initial value "0" is substituted into the variable z representing the number of priority order.

The process advances to step S1054 to increment the variable z by "1". Hence, when the process in steps S1052 and S1053 is executed, z=1 in step S1054. If the data amount has exceeded the target code amount Th for the second time, the process in steps S1052 and S1053 is not executed. Hence, the value z in the previous scanning/encoding is further incremented by "1".

In step S1055, a predicted encoded data amount MPz of one page represented by the variable z is calculated by referring to the data in the encoding history recording unit 151. In step S1056, it is determined whether the condition [MPz≦Th+β] is satisfied. If NO in step S1056, the process returns to step S1054 to update the variable z and repeat the same process.

If YES in step S1056, the process advances to step S1057 to decide the variables i and j represented by the variable z at that point of time as the encoding parameters of re-scanning/re-encoding, and the process is ended.

The above-described eighth embodiment will be summarized below.

1. When the encoded data amount (the value of the first counter 111) has exceeded the target code amount Th during encoding using the encoding parameters i=0, j=0, and FLAG=0, the lossless encoded data amount MLS is compared with the lossy encoded data amount MJP. This allows to determine the property of the input image.
2. The priority order to obtain the encoding parameters i and j is decided on the basis of the determined property of the input image.
3. The predicted encoded data amount approximate to the target code amount Th is obtained in accordance with the decided priority order. When re-scanning/re-encoding is actually started by using the encoding parameters i and j, encoded data close to the target code amount Th can efficiently be obtained.

In the eighth embodiment, the three patterns are shown in FIGS. 25 to 27 as the priority order patterns to decide the encoding parameters. However, the two patterns in FIGS. 25 and 26 may be used by determining "TMLS<MJP". Alternatively, four or more patterns may be used by finely defining the conditions.

As described above, according to the eighth embodiment, the parameters to reduce the code amount to the target code amount Th or less can efficiently be decided on the basis of the property of an encoding target image, in addition the functions and effects of the sixth and seventh embodiments.

A condition "i≧a, and j≧b" may be added to obtain the encoding parameters i and j next to i=a and j=b for the next scanning/encoding.

Ninth Embodiment

The ninth embodiment will be described. The ninth embodiment further advances the eighth embodiment. Details will be described below.

In the eighth embodiment, the coefficient β of inequality (5)

$$Mpz \leq (MLSz + MJPz) \times Nmax/k + \beta$$

is a positive value.

As can easily be seen from inequality (5), the larger the coefficient β is, the higher the probability to satisfy the condition is. Assume that the priority order shown in FIG. 25 is decided. If the value β is sufficiently large, the condition is immediately satisfied by the priority order P1, and re-scanning/re-encoding starts by using the encoding parameters i=1 and j=0.

In actual image data encoding, if the code amount decreases to a target code amount Th or less when the encoding parameters corresponding to a priority order P4 are used, scanning/encoding is executed five times in total on the basis of P0, P1, P2, P3, and P4. That is, when the coefficient β is set to a large value, it is possible to generate encoded data to obtain the maximum image quality with a code amount equal to or smaller than the target code amount Th, although the number of times of scanning/encoding increases at a high probability.

On the other hand, when the coefficient β is set to a small value and can take even, e.g., a negative value, the condition is satisfied at P1 or P2 close to the priority order P0 at a low probability. The condition is satisfied only when a priority order far from the priority order P0 is set. That is, when the coefficient β is set to a small value, the number of times of scanning/encoding can be decreased, although the quality of the decoded image may be low more than necessity.

An example of nine boundary lines (boundary conditions) has been described above. However, the above-described case can be understood more easily by increasing the number of boundary lines. FIG. 33 shows an example. An arrow 2500 indicates the progress of scanning/encoding when the coefficient β is large. If the coefficient β is sufficiently large, scanning/encoding is executed seven times. However, the encoding parameters i and j closest to the target code amount Th can be decided at the target code amount Th or less. When the coefficient β is small (has a negative value), an arrow 2501 indicates that scanning/encoding is executed three times, i.e., a small number of repetitive times, although the image data is compressed more than necessity, as compared to the arrow 2500.

As is apparent from this examination, the value of the coefficient β functions as a parameter that affects the number of times of scanning/encoding or the image quality of the encoded data of the final target code amount.

In the ninth embodiment, the coefficient β is changed so that it can take both positive and negative values. The user can set the value through an operation unit 2 (FIG. 22), as needed. From the user's viewpoint, the value is designated as an encoding rate (or image quality) setting parameter.

For the descriptive convenience, the ninth embodiment assumes that the user can set an encoding rate coefficient ν in three steps: −1, 0 (default), and +1. A value obtained by multiplying a coefficient γ depending on the size (document size) of input image data by the set encoding rate coefficient ν is defined as the coefficient β. That is, β=γ×ν.

The number of settable steps is not limited to three. It may be two or four or more. The operation unit 2 operated by the user displays, e.g., a slider bar to select one of the three steps. However, any other selection mechanism may be employed.

In the ninth embodiment, basically, the coefficient β in step S1056 in FIG. 41 of the eighth embodiment is decided. The actual encoding process is apparent from the above description. The process procedure of a control unit 1 in response to an operation instruction from the operation unit 2 is the same as the process procedure (FIG. 32) of the fourth embodiment already described above. This will be described below.

In step S51, input from the operation unit 2 is detected. In step S52, it is determined whether the input is an instruction related to the encoding rate. In step S54, it is determined whether the input is a copy start instruction. If it is determined that the input is the encoding rate instruction, the process advances to step S53 to decide the coefficient v in accordance with the instruction (the default is v=0). If it is determined that the input is an instruction other than the encoding rate instruction and copy start instruction, the process advances to step S55 to execute an appropriate process.

If it is determined that a copy start instruction is input, the process advances to step S56 to convey one of document sheets set on the ADF of a document reading unit 3 onto the document reading surface (platen glass). At this time, the coefficient γ is decided by detecting the document size by using a known technique (step S57).

The process advances to step S58 to multiply the coefficient γ by the coefficient v to calculate the coefficient β. The coefficient β is set in an encoding sequence control unit 110. At this time, the target code amount Th is also set in the encoding sequence control unit 110.

When the settings are done, the process advances to step S59 to cause the document reading unit 3 to start scanning the document and the encoding sequence control unit 110 to start encoding. In step S60, the process waits until the encoded data of one page is stored (the process waits for encoding completion notification from the encoding sequence control unit 110).

When encoding of one page is ended, the process advances to step S61 to cause a secondary storage device 7 to store the encoded data of one page stored in a first memory 105. In step S62, decoding/printing starts. The decoding/printing process is independent of the process illustrated in FIG. 32. The process advances to step S63 to determine on the basis of a signal from a sensor (not shown) whether an uncopied document remains on the document reading unit 3. If YES in step S63, the process from step S56 is repeated.

As described above, according to the ninth embodiment, the user can set the encoding rate or output image quality, in addition the functions and effects of the eighth embodiment.

In the ninth embodiment, a copy process has been exemplified. Instead, this embodiment may be applied to a process of receiving print data from an external device and printing.

The sixth to ninth embodiments of the present invention have been described above.

In the sixth to ninth embodiments, the encoding target is input in each 16×16 pixel block and encoded. The present invention is not limited to this size. Any other size can be employed if it is possible to compare the amounts of two kinds of encoded data generated in the same image area by using two (or more) different encoding techniques.

In the first to ninth embodiments, JPEG as lossy encoding and JPEG-LS as lossless encoding are used as two kinds of encoding techniques. However, the lossless and lossy encoding techniques are not limited to those.

JPEG is a lossy encoding scheme suitable for a natural image. On the other hand, JPEG-LS is a lossless encoding scheme suitable for a character/line image opposite to a natural image. The encoding schemes and the properties of encoding target images are different. For this reason, the present invention advantageously functions by employing such schemes capable of compensating for each other.

In the embodiments, image data as an encoding target is obtained by a scanning or rendering process. Image data may be read out from a storage medium (e.g., CD-ROM) that stores original image data and compression-coded.

In the embodiments, a result obtained by plotting the data lengths of lossless and lossy encoded data is shown in FIG. 18. However, if it is assumed that the character/line image in the compression-coding target image data is relatively clear, the character/line image area $T_2$ that has undergone anti-aliasing in FIG. 18 may be excluded from the encoding target.

In the embodiments, the present invention is applied to the copying machine in FIG. 22. However, the present invention is also applicable to encoding executed by a general-purpose information processing apparatus such as a personal computer connected to an image input apparatus such as an image scanner. In this case, programs corresponding to the flowcharts described in the embodiments are executed. Hence, the present invention also incorporates the computer program. The computer program becomes executable when a computer-readable storage medium such as a CD-ROM is set in the computer and copied or installed in the system. The code amount also incorporates the computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-056897, filed Mar. 2, 2006, No. 2006-056900, filed Mar. 2, 2006, and No. 2006-056901, filed Mar. 2, 2006, which are hereby incorporated by reference herein in their entirety.

What is claimed is:

1. An image encoding apparatus for encoding each tile of an image, comprising:
    at least one processor configured to function as:
        a lossless encoding unit for losslessly encoding a tile of interest and outputting lossless encoded data;
        a lossy encoding unit for lossy-encoding a tile of interest and outputting lossy encoded data;
        a selection unit for selectively outputting one of the encoded data by comparing a code length of the lossless encoded data of the tile of interest with a code length of the lossy encoded data, and holding a total lossless encoded data amount MLS of the selectively outputted lossless encoded data and a total lossy encoded data amount MJP of the selectively outputted lossy encoded data; and
        a decision unit for, when a total encoded data amount of the image has exceeded a target amount, deciding a re-encoding method for re-starting encoding of the image by comparing MLS with MJP.

2. The apparatus according to claim 1, wherein said selection unit executes a weighted comparison of MLS and MJP to make it easy to select the lossless encoded data.

3. The apparatus according to claim 1, wherein in re-encoding when the total encoded data amount has exceeded the target amount, and MLS is not less than MJP, said selection unit executes a weighted comparison of MLS and MJP to make it hard to select the lossless encoded data.

4. The apparatus according to claim 1, wherein in re-encoding when the total encoded data amount has exceeded the target amount, and MLS is not less than MJP, said lossy encoding unit executes lossy encoding at a compression ratio higher than that of a previous time.

5. The apparatus according to claim 4, wherein said lossy encoding unit changes the compression ratio by changing a quantization parameter.

6. The apparatus according to claim 1, wherein decision unit decides a re-encoding method by executing a weighted comparison of MLS and MJP.

7. An image encoding method of encoding each tile of an image, comprising steps of:
- losslessly encoding a tile of interest and outputting lossless encoded data;
- lossy-encoding a tile of interest and outputting lossy encoded data;
- selectively outputting one of the encoded data by comparing a code length of the lossless encoded data of the tile of interest with a code length of the lossy encoded data, and holding a total lossless encoded data amount MLS of the selectively outputted lossless encoded data and a total lossy encoded data amount MJP of the selectively outputted lossy encoded data; and
- deciding a re-encoding method, when a total encoded data amount of the image has exceeded a target amount, for re-starting encoding of the image by comparing MLS with MJP.

8. The method according to claim 7, wherein in the selecting step, a weighted comparison of MLS and MJP is executed to make it easy to select the lossless encoded data.

9. The method according to claim 7, wherein in re-encoding when the total encoded data amount has exceeded the target amount, and MLS is not less than MJP, in the selecting step, a weighted comparison of MLS and MJP is executed to make it hard to select the lossless encoded data.

10. The method according to claim 7, wherein in re-encoding when the total encoded data amount has exceeded the target amount, and MLS is not less than MJP, in the lossy encoding step, lossy encoding is executed at a compression ratio higher than that of a previous time.

11. The method according to claim 10, wherein in the lossy encoding step, the compression ratio is changed by changing a quantization parameter.

12. A non-transitory computer-readable medium storing a computer program for controlling an information processing apparatus, which when executed by a processor causes said processor to perform the steps of an image encoding method according to claim 7.

* * * * *